United States Patent
Miyazaki et al.

(10) Patent No.: US 7,481,500 B2
(45) Date of Patent: Jan. 27, 2009

(54) HYDRAULIC-PRESSURE CONTROL APPARATUS AND OPERATION-CHARACTERISTIC OBTAINING APPARATUS

(75) Inventors: Tetsuya Miyazaki, Toyota (JP); Masaaki Komazawa, Nishikamo-gun (JP); Yoshito Tanaka, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 227 days.

(21) Appl. No.: 11/322,562

(22) Filed: Jan. 3, 2006

(65) Prior Publication Data

US 2006/0158032 A1    Jul. 20, 2006

(30) Foreign Application Priority Data

Jan. 20, 2005    (JP)    ............................. 2005-012736

(51) Int. Cl.
     *B60T 8/88*      (2006.01)
(52) U.S. Cl. ............... 303/122.1; 303/119.1; 303/113.1
(58) Field of Classification Search ............... 303/113.1, 303/116.1, 116.2, 119.1, 119.2, 122, 122.1, 303/122.09, 122.13, 122.14; 251/129.02, 251/129.15

See application file for complete search history.

(56) References Cited

U.S. PATENT DOCUMENTS

| | | | |
|---|---|---|---|
| 5,221,125 A * | 6/1993 | Okochi et al. ............. | 303/119.2 |
| 5,829,335 A | 11/1998 | Ewald et al. | |
| 5,878,765 A | 3/1999 | Lange | |
| 6,007,163 A * | 12/1999 | Sawada ................... | 303/122.09 |
| 6,913,326 B1 * | 7/2005 | Ohkubo et al. ........... | 303/116.1 |
| 2003/0098613 A1 | 5/2003 | Bohm et al. | |
| 2006/0113836 A1 * | 6/2006 | Nakamura ............. | 303/122.04 |

FOREIGN PATENT DOCUMENTS

| | | |
|---|---|---|
| DE | 4315626 C1 | 7/1994 |
| DE | 19540441 | 4/1997 |
| DE | 101 06 464 A1 | 1/2002 |
| JP | 2001-294140 | 10/2001 |

OTHER PUBLICATIONS

German Language Translation of German Office Action, Appln. No. 10 2006 002 701.9-14 dated Apr. 23, 2007.

* cited by examiner

*Primary Examiner*—Thomas J Williams
(74) *Attorney, Agent, or Firm*—Kenyon & Kenyon LLP

(57) ABSTRACT

An operation-characteristic obtaining apparatus including an operation-characteristic obtaining portion which obtains, as an operation characteristic of an electromagnetic control valve which includes a coil and which is opened and closed according to at least a relationship between (a) an acting force corresponding to a difference of respective pressures of a working liquid on either side of the electromagnetic control valve and (b) an electromagnetic drive force corresponding to an electric current supplied to the coil, a relationship between (c) a valve switching current as an electric current that is supplied to the coil of the electromagnetic control valve at a time when the electromagnetic control valve is switched between a closed state thereof and an opened state thereof and (d) a difference at the time of the respective pressures on either side of the electromagnetic control valve; and a leakage detecting portion which detects, when the operation-characteristic obtaining portion obtains the operation characteristic of the electromagnetic control valve, whether the electromagnetic control valve has a leakage of the working liquid.

21 Claims, 25 Drawing Sheets

PRESSURE-INCREASE LINER VALVES 80~83
PRESSURE-DECREASE LINER VALVES 90,91

VALVE OPENING
ELECTRIC CURRENT

PRESSURE-DECREASE LINER VALVES

TO MASTER RESERVOIR 62

TO BLAKE CYLINDER CORRESPONDING TO REAR WHEEL

VALVE-OPENING ELECTRIC CURRENT $I_{open}$ $\Delta P$  PMa

FIG.13 FRONT WHEELS

REAR WHEELS

HYDRAULIC-PRESSURE CONTROL APPARATUS AND OPERATION-CHARACTERISTIC OBTAINING APPARATUS

The present application is based on Japanese Patent Application No. 2005-012736 filed on Jan. 20, 2005, the contents of which are incorporated herein by reference.

BACKGROUND OF THE INVENTION

1. Field of the Invention

The present invention relates to a hydraulic-pressure control apparatus that controls a hydraulic pressure used to operate a hydraulic brake of a vehicle, and an operation-characteristic obtaining apparatus that obtains an operation characteristic of an electromagnetic control valve.

2. Discussion of Related Art

Japanese Patent Application Publication No. 2001-294140 discloses the technique of correcting, based on a responsiveness of an electromagnetic control valve, an operation characteristic thereof that is used to control an electric current supplied thereto. More specifically described, if a time duration from a time when a certain electric current is supplied to a coil of the electromagnetic control valve to a time when the control valve is actually switched to an opened state thereof, is longer than a reference time, then the operation characteristic of the control valve is so corrected as to increase the electric current (i.e., the valve opening current); and if the time duration is shorter than the reference time, then the operation characteristic is so corrected as to decrease the valve opening current.

SUMMARY OF THE INVENTION

It is therefore an object of the present invention to obtain a more accurate operation characteristic of an electromagnetic control valve.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (21) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the preferred embodiments of the invention, and that in additional claimable modes, one or more elements or one or more technical features may be added to, or deleted from, any of the following specific modes.

(1) An operation-characteristic obtaining apparatus, comprising:

an operation-characteristic obtaining portion which obtains, as an operation characteristic of an electromagnetic control valve which includes a coil and which is opened and closed according to at least a relationship between (a) an acting force corresponding to a difference of respective pressures of a working liquid on either side of the electromagnetic control valve and (b) an electromagnetic drive force corresponding to an electric current supplied to the coil, a relationship between (c) a valve switching current as an electric current that is supplied to the coil of the electromagnetic control valve at a time when the electromagnetic control valve is switched between a closed state thereof and an opened state thereof and (d) a difference at said time of the respective pressures on either side of the electromagnetic control valve; and a leakage detecting portion which detects, when the operation-characteristic obtaining portion obtains the operation characteristic of the electromagnetic control valve, whether the electromagnetic control valve has a leakage of the working liquid.

The present operation-characteristic obtaining apparatus includes the leakage detecting portion which detects, when the operation-characteristic obtaining portion obtains the operation characteristic of the electromagnetic control valve, whether the control valve has the leakage of the working liquid. The result detected by the leakage detecting portion can be taken into account when the operation-characteristic obtaining portion obtains the operation characteristic of the control valve, and accordingly the thus obtained operation characteristic can be nearer to a true operation characteristic as compared with the case where the result detected by the leakage detecting portion is not taken into account.

According to the operation characteristic obtained by the present operation-characteristic obtaining apparatus, the electric current supplied to the coil of the electromagnetic control valve is controlled to control at least one of the respective liquid or hydraulic pressures on either side of the control valve, i.e., the higher and lower hydraulic pressures. The operation characteristic of the control valve is the relationship between the valve switching current as the electric current that is supplied to the coil of the control valve at the time when the control valve is switched between its closed state and its opened state and the difference at that time of the respective hydraulic pressures on either side of the control valve (hereinafter, simply referred to as the "pressure difference" or the "pressure difference across the control valve", where appropriate). The valve switching current may be an electric current at the time when the control valve is switched from its closed state to its opened state, or an electric current at the time when the control valve is switched from its opened state to its closed state.

When the operation characteristic of the electromagnetic control valve is obtained, the leakage detecting portion detects or judges whether the control valve has a leakage of the working liquid. If the control valve has the leakage, then it may be erroneously judged that the control valve has been switched from its closed state to its opened state, though the control valve may not have actually been switched to its opened state. In this case, the operation characteristic of the control valve obtained by the operation-characteristic obtaining apparatus may not be sufficiently accurate, i.e., may not be sufficiently near to the true operation characteristic. In contrast, if the operation-characteristic obtaining apparatus obtains an operation characteristic of the control valve while taking the result detected by the leakage detecting portion into account, then the obtaining apparatus can obtain a more accurate operation characteristic nearer to the true operation characteristic, as compared with the case where the result detected by the leakage detecting portion is not taken into account. In this case, an electric-current control device (see the following mode (2)) can control, based on the more accurate operation characteristic, the electric current supplied to the coil of the control valve, and thereby control, with higher accuracy, at least one of the respective hydraulic pressures on either side of the control valve.

For example, if the leakage is detected, then the operation-characteristic obtaining apparatus may not obtain an operation characteristic of the control valve, may modify the obtained operation characteristic, or may discard the obtained operation characteristic.

In addition, as will be described in connection with the following mode (3), in the case where the operation-characteristic obtaining apparatus obtains a set of data including a valve switching current and a pressure difference, that set of data may not be used to determine an operation characteristic of the control valve, e.g., may be discarded or, if the set of data is temporarily stored, the stored set of data may be deleted. Alternatively, at least one of the valve switching current and the pressure difference constituting the set of data may be corrected. Moreover, when the leakage is detected, the data obtaining portion may not obtain a set of data. In the last case, a set of data that may be adversely influenced by the leakage is prevented from being obtained. Alternatively, a leakage solving or stopping control may be performed to stop the leakage. If a set of data is obtained after the leakage stopping control, the thus obtained set of data is free of the adverse influence of the leakage.

(2) A hydraulic-pressure control apparatus comprising the operation-characteristic obtaining apparatus according to the mode (1);

the electromagnetic control valve the operation characteristic of which is obtained by the operation-characteristic obtaining apparatus; and an electric-current control device which controls, based on the operation characteristic obtained by the operation-characteristic obtaining device, the electric current supplied to the coil of the electromagnetic control valve, so as to control at least one of the respective pressures on either side of the electromagnetic control valve.

(3) The hydraulic-pressure control apparatus according to the mode (2), wherein the operation-characteristic obtaining apparatus further comprises a data obtaining portion which controls the electric current supplied to the coil of the electromagnetic control valve, so that the electromagnetic control valve is switched between the closed state thereof and the opened state thereof, according to each of a plurality of different valve switching currents and a corresponding one of a plurality of differences of the respective pressures on either side of the electromagnetic control valve, and which thereby obtains a plurality of sets of data each set of which includes a corresponding one of the plurality of valve switching currents and a corresponding one of the plurality of pressure differences, wherein the operation-characteristic obtaining portion obtains, based on the sets of data obtained by the data obtaining portion, the operation characteristic of the electromagnetic control valve.

The data obtaining portion may include at least one of (a) a pressure detecting portion that detects at least one of the respective hydraulic pressures (i.e., high and low hydraulic pressures) on either side of the electromagnetic control valve, and (b) a flow detecting portion that detects a flow of the working liquid on at least one side of the control valve. Therefore, when the electric current supplied to the coil of the control valve is controlled or changed, the data obtaining portion can detect a change of the pressure of the working liquid, or a change of the flow of the working liquid, and accordingly can judge, based on the detected change of the liquid pressure or the detected change of the liquid flow, whether the control valve has been switched between its closed and opened states. When the data obtaining portion judges that the control valve has been switched between its closed and opened states, the data obtaining portion detects a pressure difference across the control valve at that time, and reads or obtains an electric current (i.e., a valve switching current) supplied to the coil at that time. Thus, the data obtaining portion obtains a set of data including the valve switching current and the pressure difference. The pressure difference across the control valve is obtained by subtracting the low pressure from the high pressure. However, one of the high and low pressures on either side of the electromagnetic control valve may be substantially constant, i.e., may have a known pressure. In this particular case, the pressure difference can be determined by detecting the other of the high and low pressures. The data obtaining portion obtains a plurality of sets of data each including a valve switching current and a pressure difference, and the operation-characteristic obtaining portion obtains, based on the sets of data obtained by the data obtaining portion, the operation characteristic of the control valve. Though an operation characteristic can be determined based on two sets of data that differ from each other, it is preferable to use three or more different sets of data.

The electric current supplied to the coil of the electromagnetic control valve may be controlled to switch the control valve from its closed state to its opened state, or vice versa. The electric current may be slowly increased, or slowly decreased.

For example, in the above-indicated state in which the electric current supplied to the coil of the electromagnetic control valve is controlled, if a slope of change of the hydraulic pressure detected by the pressure detecting portion has changed by more than a reference amount (e.g., if the slope has changed from about zero to a value higher than the reference value, or if the slope has changed from a value higher than the reference value to about zero), it can be judged that the control valve has been changed between its closed and opened states. Alternatively, if the flow detecting portion has detected a start, or an end, of flow of the working liquid, the same judgment as indicated above can be made.

In the present specification, concerning the obtaining of the operation characteristic and the detection of the leakage, the change of pressure of the working liquid and the change of flow of the same indicate a same phenomenon, because in a closed space (i.e., a space isolated from the atmosphere), the pressure of the working liquid is changed by the flow of the same.

(4) The hydraulic-pressure control apparatus according to the mode (3), wherein the leakage detecting portion comprises a data-obtaining-related leakage detecting portion which detects, each time the data obtaining portion obtains one set of data of the sets of data, whether the electromagnetic control valve has the leakage of the working liquid.

The data-obtaining-related leakage detecting portion may detect whether the electromagnetic control valve has the leakage of the working liquid, either before or after the data obtaining portion obtains one set of data.

If the leakage is detected before one set of data is obtained, then the data obtaining portion may not obtain that set of data. In this case, if a leakage stopping control is performed and thereafter a set of data is obtained, then it is possible to prevent obtaining of a set of data that may be adversely influenced by the leakage. Alternatively, it is possible to change a threshold value to be used in judging whether the control valve has been switched between its closed and opened states. In this case, a set of data can be obtained while the leakage is taken into account. Moreover, it is possible to correct at least one of a valve switching current and a pressure difference constituting a set of data obtained by the data obtaining portion and determine, based on the sets of data including the corrected set of data, an operation characteristic of the control valve.

Meanwhile, if the leakage is detected after one set of data is obtained, that is, if it can be thought that the leakage must have been present when one set of data is obtained, then the set of data may be discarded, or at least one of a valve switching current and a pressure difference constituting the set of data may be corrected.

(5) The hydraulic-pressure control apparatus according to the mode (3) or the mode (4), wherein the operation-characteristic obtaining portion comprises a leakage-free-data-using operation-characteristic obtaining portion which, when the data obtaining portion obtains one set of data of the sets of data and the leakage detecting portion detects that the electromagnetic control valve has the leakage of the working liquid, discards said one set of data, and which obtains, based on the sets of data each set of which is obtained by the data obtaining portion when the leakage detecting portion does not detect the leakage of the working liquid, the operation characteristic of the electromagnetic control valve.

According to this mode, if the leakage is detected when one set of data is obtained, then the obtained set of data is discarded. Thus, no sets of data that are obtained when a leakage is detected are used in determining the operation characteristic of the electromagnetic control valve. Therefore, the operation characteristic of the control valve can be determined based on only the sets of data each set of which is obtained when a leakage is not detected, and accordingly the thus determined operation characteristic can be sufficiently near to the true operation characteristic.

(6) The hydraulic-pressure control apparatus according to any of the modes (3) through (5), wherein the operation-characteristic obtaining portion comprises a corrected-data-using operation-characteristic obtaining portion which corrects, when the data obtaining portion obtains one set of data of the sets of data and the leakage detecting portion detects that the electromagnetic control valve has the leakage of the working liquid, at least one of the valve switching current and the pressure difference of said one set of data, and which thereby obtains, based on the sets of data including the corrected set of data, the operation characteristic of the electromagnetic control valve.

For example, if a foreign matter is bitten by the electromagnetic control valve, a certain amount of the working liquid may flow through the control valve, when the control valve should be in its closed state. Thus, though the control valve has not actually been switched from its closed state to its opened state yet, it may erroneously be judged that the control valve has been switched to its opened state. Likewise, though the control valve must have been switched from its opened state to its closed state, it may erroneously be judged that the control valve has not been switched to its closed state yet. In those cases, if a set of data is obtained when the control valve is switched from its closed state to its opened state, then the switching of the control valve to its opened state is detected at an earlier timing than a normal timing; and if a set of data is obtained when the control valve is switched from its opened state to its closed state, then the switching of the control valve to its closed state is detected at a later timing than a normal timing. In view of those errors, at least one of the valve switching current and the pressure difference constituting the obtained set of data can be corrected to a current or a difference at a true timing when the control valve is actually opened, or actually closed.

(7) The hydraulic-pressure control apparatus according to any of the modes (2) through (6), wherein the operation-characteristic obtaining apparatus further comprises an operation-characteristic correcting portion which corrects, when the leakage detecting portion detects that the electromagnetic control valve has the leakage of the working liquid, the operation characteristic of the electromagnetic control valve.

According to this mode, the operation characteristic of the electromagnetic control valve is corrected to an operation characteristic nearer to the true operation characteristic.

(8) The hydraulic-pressure control apparatus according to any of the modes (2) through (7), wherein the electric-current control device includes a leakage stopping portion which controls, when the leakage detecting portion detects that the electromagnetic control valve has the leakage of the working liquid, the electric current supplied to the coil of the electromagnetic control valve so as to stop the leakage of the working liquid.

(9) The hydraulic-pressure control apparatus according to the mode (8), wherein the leakage stopping portion comprises an opening-degree increasing portion which controls the electric current supplied to the coil of the electromagnetic control valve, such that a degree of opening of the electromagnetic control valve is greater than a reference degree.

Assuming that the pressure difference across the electromagnetic control valve does not change, a larger amount of the working liquid can flow through the control valve when the degree of opening of the control valve is greater than the reference degree than when the opening degree is not greater than the reference degree, and accordingly a foreign matter that may be bitten by the control valve can be more effectively removed off. In addition, in the case where the control valve is constituted by a seating valve including a valve member and a valve seat, a posture of the valve member relative to the valve seat can be corrected. In the case where the control valve is constituted by a normally closed valve, the normally closed valve is supplied with an electric current greater than a first reference current assuring that the opening degree of the valve is greater than the reference degree; and in the case where the control valve is constituted by a normally opened valve, the normally opened valve is supplied with an electric current smaller than a second reference current assuring that the opening degree of the valve is greater than the reference degree.

The electromagnetic control valve may be supplied with an electric current that maximizes the opening degree of the valve. In this case, the foreign matter can be more reliably removed.

In addition, it is possible to keep, for more than a first reference time duration, the control valve to the opening degree greater than the reference degree. In this case, the foreign matter can be more reliably removed. Moreover, it is possible to keep, for less than a second reference time duration longer than the first reference time duration, the control valve to the opening degree greater than the reference degree. In the last case, an amount of change of the above-described at least one of the hydraulic pressures, caused by the leakage stopping control, can be reduced. Therefore, it is preferred to determine, in view of those facts, a reference time duration in which the control valve is kept to the opening degree greater than the reference degree.

(10) The hydraulic-pressure control apparatus according to any of the modes (2) through (9), wherein the leakage detecting portion detects whether the electromagnetic control valve has the leakage of the working liquid, based on a control of the electric current supplied to the electromagnetic control valve and a corresponding change of said at least one of the respective pressures on either side of the electromagnetic control valve.

Assuming that the electromagnetic control valve does not have the leakage of the working liquid, the above-described at least one of the respective pressures (i.e., the high and low pressures) should change, when the control valve is in its opened state (i.e., when an electric current greater than a valve switching current is supplied to a normally closed valve), at a slope corresponding to a slope at which the electric current supplied to the control valve changes. In addition, when the control valve is in its closed state and the electric current is kept to a reference current, the above-described at least one of the respective pressures is kept to a substantially constant pressure, under a normal condition. More strictly, as will be described in connection with preferred embodiments of the present invention, a hydraulic pressure of a brake cylinder changes due to, e.g., thermal expansion of a caliper of a hydraulic brake, but this pressure change is smaller than a change of the hydraulic pressure caused by the leakage. Thus, it can be thought that the above-described at least one of the respective pressures is kept to the substantially constant pressure.

On the other hand, if the control valve has the leakage, the above-described at least one of the respective pressures may not change at a slope corresponding to a slope at which the electric current supplied to the control valve changes, or may change although the electric current may be kept to the substantially constant pressure.

(11) The hydraulic-pressure control apparatus according to any of the modes (2) through (10), wherein the leakage detecting portion comprises a valve-opened-state-related leakage detecting portion which detects whether the electromagnetic control valve has the leakage of the working liquid, based on a change of said at least one of the respective pressures on either side of the electromagnetic control valve after the electric current supplied to the coil of the electromagnetic control valve is changed to switch the electromagnetic control valve from the closed state thereof to the opened state thereof.

In the present hydraulic-pressure control apparatus, it is preferred to change, according to a predetermined rule, the electric current supplied to the coil. In particular, if the electric current supplied to the coil is changed at a constant slope, the leakage can be more reliably detected. However, it is just needed to know, in advance, how the hydraulic pressure changes as the electric current supplied to the coil changes, when the control valve does not have the leakage.

(12) The hydraulic-pressure control apparatus according to any of the modes (2) through (11), wherein the leakage detecting portion comprises an electric-current-keeping-state-related leakage detecting portion which detects that the electromagnetic control valve has the leakage of the working liquid, when said at least one of the respective pressures on either side of the electromagnetic control valve has changed by more than a reference pressure in a state in which the electric current supplied to the coil of the electromagnetic control valve is kept at a predetermined electric current.

For example, if the above-described at least one of the respective pressures on either side of the electromagnetic control valve has changed by more than the reference pressure within a leakage judging time duration, then it can be judged that the control valve has the leakage.

(13) The hydraulic-pressure control apparatus according to the mode (12), wherein the electric-current-keeping-state-related leakage detecting portion comprises a large-leakage detecting portion which detects a large leakage of the working liquid, and a small-leakage detecting portion which detects a small leakage of the working liquid that is smaller than the large leakage.

The large leakage of the working liquid means that an amount of the working liquid flowing through the electromagnetic control valve is larger than a first reference flow amount; and the small leakage of the working liquid means that an amount of the working liquid flowing through the control valve is smaller than a second reference flow amount smaller than the first reference flow amount. An amount of the working liquid flowing through the control valve per unit time is larger when the flow amount is large than when the flow amount is small, and accordingly an amount of change of the above-described at least one of the respective hydraulic pressures is larger when the flow amount is large.

For example, if an amount of change of the hydraulic pressure within a leakage judging time duration is larger than a leakage judging threshold amount, in a state in which the electric current supplied to the control valve is kept to a certain current (this current may be zero), then it can be judged that the control valve has a leakage of the working liquid. In this case, assuming that a common leakage judging threshold amount is used, the large leakage can be detected in a shorter time duration than the small leakage.

More specifically described, in the state in which the electric current supplied to the control valve is kept to the certain current, a leakage detecting operation can be carried out at least two times, i.e., when a first reference time duration elapses and when a second reference time duration longer than the first reference time duration elapses. If a common leakage judging threshold value is used in the two leakage detecting operations, then the large leakage can be detected in the first reference time duration, i.e., at an early timing, and the small leakage may not be detected in the first reference time duration but can be detected in the second reference time duration. In the case where the leakage judging time duration and the leakage judging threshold value are so determined as to be able to detect the large leakage in the first reference time duration and detect the small leakage in the second reference time duration, the large leakage can be detected quickly and even the small leakage can be detected reliably.

(14) The hydraulic-pressure control apparatus according to any of the modes (2) through (13), wherein the electromagnetic control valve comprises a normally opened, pressure control valve which includes a valve seat and a valve member which can be seated on, and be moved away from, the valve seat, wherein the electromagnetic drive force comprises a pressing force acting on the valve member in a direction to cause the valve member to be seated on the valve seat, and wherein the leakage detecting portion comprises a decreased-pressing-force-related leakage detecting portion which detects whether the electromagnetic control valve has the leakage of the working liquid, in a state in which a decreased pressing force corresponding to a decreased electromagnetic drive force lower than a maximum electromagnetic drive force acts on the valve member.

A leakage of the working liquid, caused by a foreign matter, is more likely to occur when the pressing force to press the valve member against the valve seat is small than when the pressing force is great. Therefore, it is desirable to decrease the pressing force when a leakage detecting operation is carried out.

In addition, in the case where the electric current supplied to the electromagnetic control valve is decreased to switch the control valve from its closed state to its opened state, it needs a shorter time to establish the opened state when the decreasing of the electric current is started with a small current than with a great current.

The maximum electromagnetic drive force is an electromagnetic drive force that is produced by the electromagnetic control valve when a maximum electric current is supplied thereto, and the maximum electric current is the greatest electric current that can be supplied to the control valve according to the physical properties thereof.

Whether the electromagnetic control valve has the leakage is detected or judged in a state in which the control valve is producing an intermediate electromagnetic drive force that is smaller than the above-described maximum electromagnetic drive force and is greater than the smallest electromagnetic drive force that can keep the control valve to its closed state and is defined by the pressure difference across the control valve at a current time. The smallest electromagnetic drive force corresponds to the valve opening current at that time, and hereinafter will be referred to as the "valve-opening electromagnetic drive force, $F_{open}$".

The above-described intermediate electromagnetic drive force may be a force nearer to the valve-opening electromagnetic drive force $F_{open}$ than an average of the maximum force and the smallest force, or than one third, or one fourth, of the difference of the maximum and smallest forces.

Alternatively, the intermediate electromagnetic drive force at which a leakage detecting operation is carried out may be smaller than a force ($F_{open}+F_{max}\cdot\beta$) obtained by adding, to the valve-opening drive force $F_{open}$, a product ($F_{max}\cdot\beta$) of the maximum drive force, $F_{max}$, and a coefficient, $\beta$ ($\beta<1$). Preferably, the coefficient $\beta$ is smaller than 0.2, 0.15, 0.1, 0.07, 0.05, or 0.02.

(15) The hydraulic-pressure control apparatus according to the mode (14), wherein the electric-current control device comprises a maximum-electric-current supply portion which supplies a maximum electric current to the coil of the electromagnetic control valve, and an intermediate-electric-current supply portion which supplies an intermediate electric current lower than the maximum electric current, to the coil of the electromagnetic control valve, and wherein the decreased-pressing-force-related leakage detecting portion comprises an intermediate-electric-current-supply-related leakage detecting portion which detects whether the electromagnetic control valve has the leakage of the working liquid, in a state in which the intermediate-electric-current supply portion supplies the intermediate electric current to the coil of the electromagnetic control valve.

When the maximum-electric-current supply portion supplies the maximum electric current to the electromagnetic control valve, so as to maximize the pressing force to press the valve member against the valve seat, the valve member can be surely pressed on the valve seat. In addition, if a foreign matter is bitten by the valve member and the valve seat, then the foreign matter can be cut off.

Moreover, when the intermediate-electric-current supply portion supplies the intermediate electric current to the control valve, the intermediate-electric-current-supply-related leakage detecting portion detects whether the control valve has the leakage of the working liquid.

For example, a leakage detecting operation may be carried out when the intermediate-electric-current supply portion is supplying the intermediate electric current to the control valve after the maximum-electric-current supply portion supplies the maximum electric current to the control valve for a pre-selected time duration.

(16) The hydraulic-pressure control apparatus according to any of the modes (2) through (15), wherein the electromagnetic control valve comprises a hydraulic-pressure control valve which controls a hydraulic pressure supplied to a hydraulic brake which includes (a) a rotary member which is rotatable with a wheel of a vehicle, (b) a frictional member, and (c) a brake cylinder which presses, owing to the hydraulic pressure, the frictional member against the rotary member so as to brake a rotation of the wheel, and wherein the operation-characteristic obtaining apparatus further comprises a clearance reducing portion which reduces, before obtaining of the operation characteristic, a clearance between the frictional member and the rotary member, by controlling the hydraulic pressure supplied to the brake cylinder, to a pressure higher than a reference pressure.

When the hydraulic pressure supplied to the brake cylinder is controlled to a pressure higher than the reference pressure, the clearance between the frictional member and the rotary member can be reduced. The reference pressure may be so selected as to be able to zero the clearance, but it may be any pressure that can decrease the clearance.

The hydraulic pressure supplied to the brake cylinder, i.e., the brake-cylinder pressure may be controlled such that after it is increased up to a pressure higher than the reference pressure by a certain amount, it is decreased down to the reference pressure, because the frictional member may not be moved, because of, e.g., friction, to the rotary member when the brake-cylinder pressure is directly increased up to the reference pressure.

(17) The hydraulic-pressure control apparatus according to any of the modes (3) through (16), wherein the operation-characteristic obtaining portion comprises a correlation-coefficient-dependent operation-characteristic obtaining portion which obtains, based on the sets of data obtained by the data obtaining portion, the operation characteristic of the electromagnetic control valve, when an absolute value of a correlation coefficient of the sets of data is greater than a reference value.

The correlation coefficient between the respective valve switching currents, and the respective pressure differences, of the sets of data may be positive, or negative, depending upon the sorts of electromagnetic control valves. In either case, a more accurate operation characteristic of the control valve can be obtained when the absolute value of the correlation coefficient is great than when it is small.

(18) A brake apparatus, comprising:

a hydraulic brake which includes (a) a rotary member which is rotatable with a wheel of a vehicle, (b) a frictional member, and (c) a brake cylinder which presses, owing to a hydraulic pressure supplied thereto, the frictional member against the rotary member so as to brake a rotation of the wheel;

the operation-characteristic obtaining apparatus according to the mode (1);

an electromagnetic control valve device comprising a plurality of said electromagnetic control valves the respective operation characteristics of which are obtained by the operation-characteristic obtaining apparatus; and a hydraulic-pressure control device which controls, based on the respective operation characteristics of the electromagnetic control valves, the respective electric currents supplied the respective coils of the electromagnetic control valves, so as to control the hydraulic pressure supplied to the brake cylinder.

The present brake apparatus may employ any of the respective technical features according to the above-described modes (1) through (17).

(19) The brake apparatus according to the mode of (18), wherein the electromagnetic control valves comprise a normally opened, hydraulic-pressure control valve including a valve seat, a valve member which can be seated on, and be moved away from, the valve seat, and a spring which biases the valve member in a direction to cause the valve member to be moved away the valve seat, and wherein the electromagnetic drive force acts on the valve member in a direction to cause the valve member to be seated on the valve seat.

The operation-characteristic obtaining apparatus obtains an operation characteristic of the normally opened, hydraulic-pressure control valve.

(20) The brake apparatus according to the mode (18), wherein the electromagnetic control valves comprise a normally closed, hydraulic-pressure control valve including a valve seat, a valve member which can be seated on, and be moved away from, the valve seat, and a spring which biases the valve member in a direction to cause the valve member to be seated on the valve seat, and wherein the electromagnetic drive force acts on the valve member in a direction to cause the valve member to be moved away from the valve seat.

The operation-characteristic obtaining apparatus obtains an operation characteristic of the normally closed, hydraulic-pressure control valve.

(21) The brake apparatus according to any of the modes (18) through (20), wherein the electromagnetic control valves comprise a pressure-increase control valve which is provided between a power hydraulic-pressure source which produces, by using a power, the hydraulic pressure, and the brake cylinder; and a pressure-decrease control valve which is provided between the brake cylinder and a low-pressure source, and wherein the operation-characteristic obtaining portion comprises a pressure-increase-and-decrease-related operation-characteristic obtaining portion which obtains, in a continuous pressure increasing and decreasing operation, the operation characteristic of the pressure-increase control valve while increasing the hydraulic pressure supplied to the brake cylinder, and obtains the operation characteristic of the pressure-decrease control valve while decreasing the hydraulic pressure supplied to the brake cylinder.

In the present brake apparatus, the operation characteristic of one of the pressure-increase and pressure-decrease control valves is obtained while a corresponding one of increasing and decreasing of the hydraulic pressure supplied to the brake cylinder is caused in a continuous pressure increasing and decreasing operation, and then the operation characteristic of the other of the pressure-increase and pressure-decrease control valves is obtained while the corresponding, other of increasing and decreasing of the hydraulic pressure is caused in the continuous pressure changing operation. Thus, the respective operation characteristics of the pressure-increase and pressure-decrease control valves can be obtained in a shorter time, as compared with the case where a pressure increasing operation and a pressure decreasing operation are carried out at different timings.

The pressure-increase control valve is provided by a normally closed, hydraulic-pressure control valve in many cases; and the pressure-decrease control valve is provided by a normally closed, hydraulic-pressure control valve or a normally opened, hydraulic-pressure control valve.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a hydraulic brake system including a hydraulic-pressure control apparatus as a preferred embodiment of the present invention, by reference to the drawings. The hydraulic-pressure control apparatus includes an operation-characteristic obtaining apparatus to which the present invention is also applied.

Figure 2:
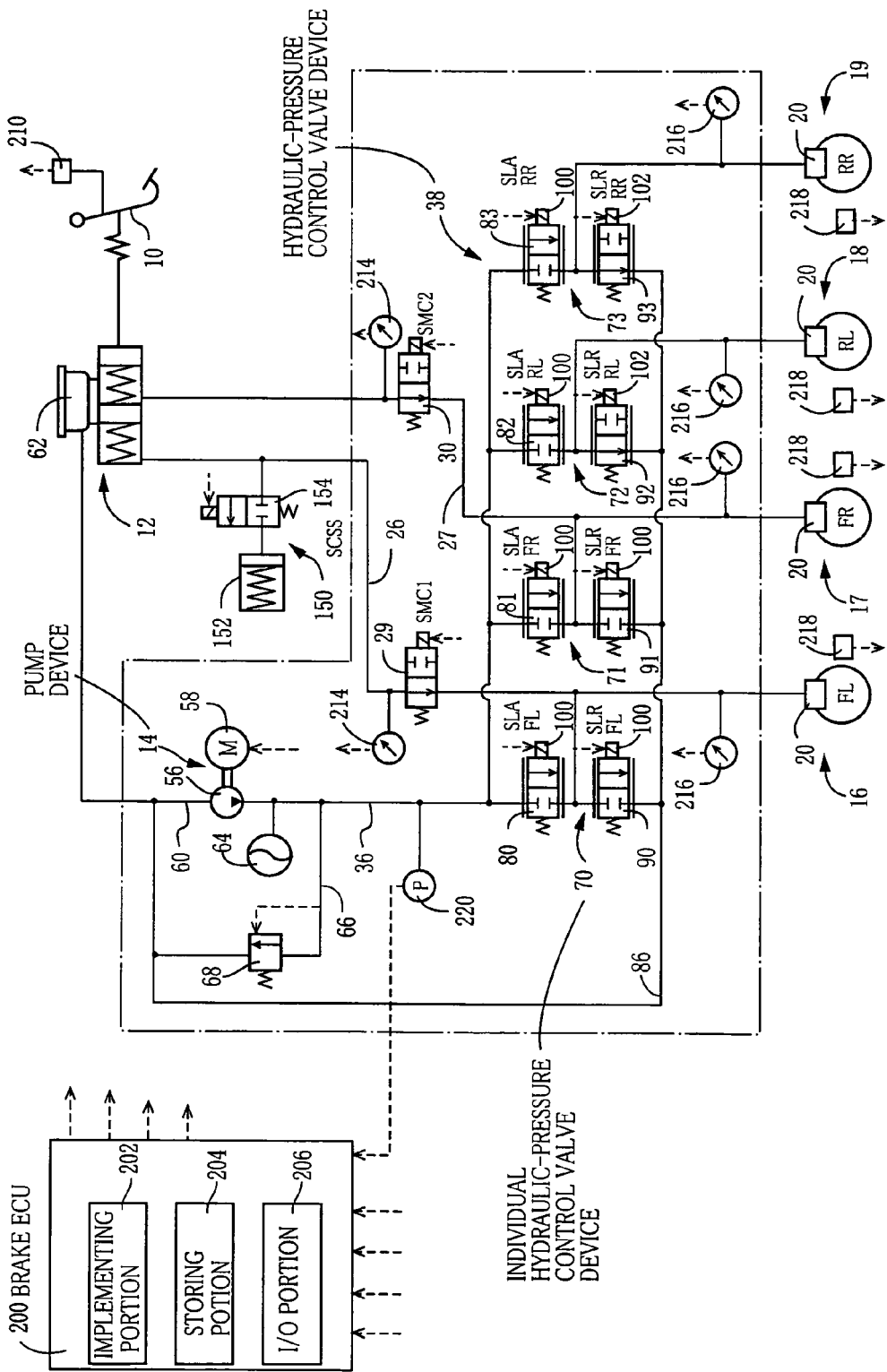
FIG. 2 is a circuit diagram of a hydraulic brake system including the hydraulic-pressure control apparatus.

As shown in FIG. 2, the hydraulic brake system includes a brake pedal 10 as a brake operating member; a master cylinder 12 having two pressurizing chambers; a pump device 14 as a power hydraulic-pressure source that is operated by power, i.e., electric power; and four hydraulic brakes 16, 17, 18, 19 that are provided for four wheels of a vehicle, i.e., a front left wheel FL, a front right wheel FR, a rear left wheel RL, and a rear right wheel RR. In the present embodiment, each of the hydraulic brakes 16 through 19 is constituted by a disc brake.

Figure 3:
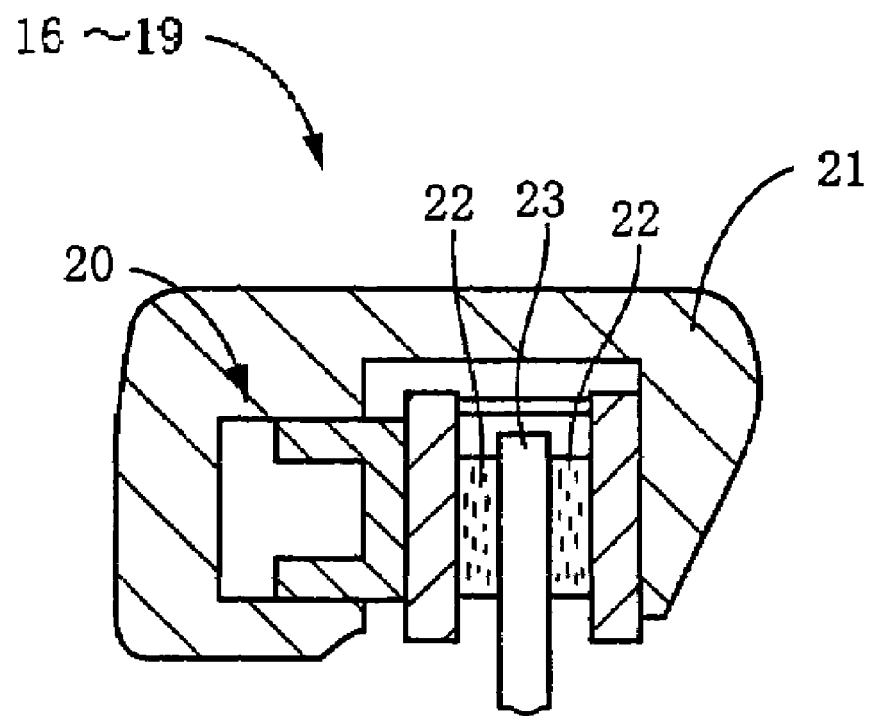
FIG. 3 is a cross-sectional view of a hydraulic brake of the hydraulic brake system.

As shown in FIG. 3, each of the four hydraulic brakes 16 through 19 is operated by a hydraulic pressure of a brake cylinder 20, i.e., a pressure of a working liquid present in the brake cylinder 20. More specifically described, the hydraulic pressure of the brake cylinder 20 presses two pads 22 as frictional members that are held by a caliper 21, such that the pads 22 are movable in an axial direction of the cylinder 20, against a rotor 23 as a rotary member that is rotated together with a corresponding one of the four wheels. Since the pads 22 frictionally engage the rotor 23, the rotation of the corresponding wheel is braked.

The master cylinder 12 has two pressurizing pistons that define, in front thereof, the two pressurizing chambers, respectively, each of which produces a hydraulic pressure corresponding to an operating force of a driver that is applied to the brake pedal 10. The two pressurizing chambers of the master cylinder 12 are connected via respective master passages 26, 27 to the respective brake cylinders 20 of the two hydraulic brakes 16, 17 corresponding to the two front wheels FL, FR. The two master passages 26, 27 have respective master-cylinder shut-off valves 29, 30 each of which is constituted by an electromagnetic open/close valve that is normally opened.

The pump device 14 is connected to the four brake cylinders 20 via respective pump passages 36. In a state in which the two brake cylinders 20 corresponding to the two front wheels FL, FR are shut off from the master cylinder 12 by the two shut-off valves 29, 30, the pump device 14 supplies a hydraulic pressure to each of the four brake cylinders 20 corresponding to the four wheels, so as to operate a corresponding one of the four hydraulic brakes 16 through 19. The respective hydraulic pressures in the four brake cylinders 20 are controlled by a hydraulic-pressure control valve device 38.

The pump device 14 includes a pump 56, and a pump motor 58 that drives the pump 56. A suction side of the pump 56 is connected via a suction passage 60 to a master reservoir 62, and an output side of the same 56 is connected to an accumulator 64. The pump 56 pumps up the working liquid from the reservoir 62, and supplies the thus pressurized working liquid to the accumulator 64, so that the accumulator 64 stores the pressurized working liquid.

The output and suction sides of the pump 56 are connected to each other via a relief passage 66 having a relief valve 68. The relief valve 68 is switched from a closed state thereof to an opened state thereof when a hydraulic pressure on the side of the accumulator 64, i.e., a high-pressure side of the valve 68 exceeds a reference pressure.

The hydraulic-pressure control valve device 38 includes four individual hydraulic-pressure control valve devices 70, 71, 72, 73 corresponding to the four brake cylinders 20, respectively. The four individual hydraulic-pressure control valve devices 70 through 73 include respective pressure-increase linear valves 80, 81, 82, 83 each as an electromagnetic pressure-increase control valve that are provided in the four pump passages 36, respectively; and respective pressure-decrease linear valves 90, 91, 92, 93 each as an electromagnetic pressure-decrease control valve that are provided in four pressure-decrease passages 86, respectively, that are provided between the four brake cylinders 20 and the reservoir 62. The four pressure-increase linear valves 80 through 83 can cooperate with the four pressure-decrease linear valves 90 through 93, respectively, to control the respective hydraulic pressures in the four brake cylinders 20 corresponding to the four wheels, independent of each other.

Each of the four pressure-increase linear valves 80 through 83 corresponding to the four wheels, and the two pressure-decrease linear valves 90, 91 corresponding to the two front wheels FL, FR includes a coil 100 (FIG. 4), and is constituted by a normally closed valve that is kept to a closed state thereof while an electric current is not supplied to the coil 100; and the two pressure-decrease linear valves 92, 93 corresponding to the two rear wheels RL, RR includes a coil 102 (FIG. 6), and is constituted by a normally opened valve that is kept to an opened state thereof while an electric current is not supplied to the coil 102.

Figure 4:
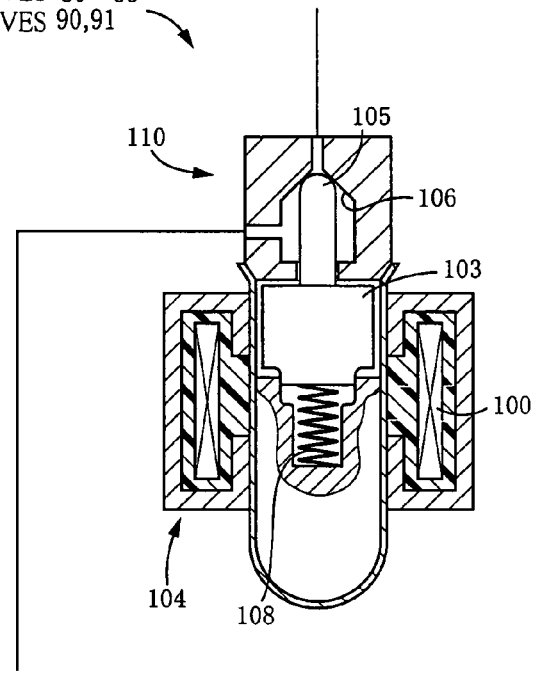
FIG. 4 is a cross-sectional view of the normally closed linear valve of the hydraulic-pressure control apparatus.

FIG. 4 shows a construction of each of the pressure-increase linear valves 80 through 83 and the two pressure-decrease linear valves 90, 91 each of which is a normally closed valve. Each of the linear valves 80 through 83, 90, 91 has a solenoid 104 including the coil 100 and a plunger 103; and a seating valve 110 including a valve member 105, a valve seat 106, and a spring 108 that biases, with a biasing force, Fs, the valve member 105 toward the valve seat 106.

When no electric current is supplied to each linear valve 80 through 83, 90, 91, the each linear valve remains in its closed state in which the valve member 105 is seated on the valve seat 106 by the biasing force Fs of the spring 108. Meanwhile, when an electric current is supplied to each linear valve 80 through 83, 90, 91, an electromagnetic drive force, Fd, corresponding to a magnitude of the electric current is exerted to the plunger 103, in a direction to cause the valve member 105 to be moved away from the valve seat 106. In addition, when there is a difference, ΔP, of respective hydraulic pressures on either side of each linear valve 80 through 83, 90, 91, an acting force, Fp, corresponding to the pressure difference ΔP is applied to the valve member 105 in the direction to cause the valve member 105 to be moved away from the valve seat 106. Thus, a position of the valve member 105 relative to the valve seat 106 is defined by a relationship among the electromagnetic drive force Fd, the acting force Fp, and the biasing force Fs.

More specifically described, each of the four pressure-increase linear valves 80 through 83 is provided in such a manner that the acting force Fp corresponding to the difference ΔP of the respective hydraulic pressures in (a) the pump device 14 and (b) a corresponding one of the four brake cylinders 20 is applied to the valve member 105 of the each linear valve; and each of the two pressure-decrease linear valves 90, 91 is provided in such a manner that the acting force Fp corresponding to the difference ΔP of the respective hydraulic pressures in (c) the reservoir 62 and (d) a corresponding one of the two brake cylinders 20 is applied to the valve member 105 of the each linear valve.

Figure 5:
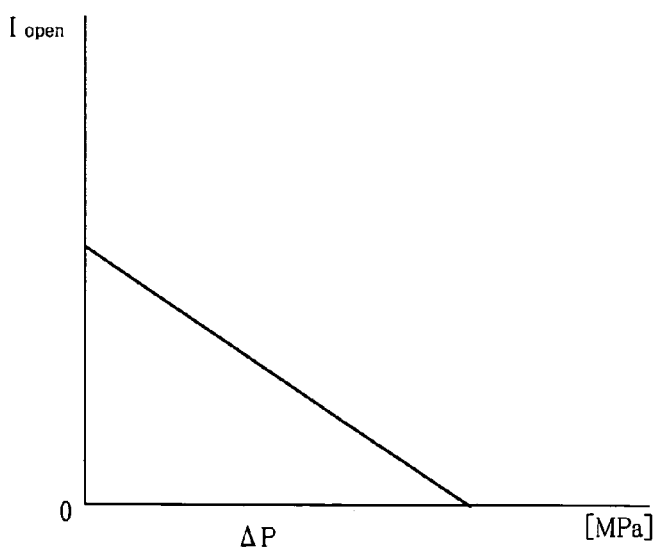
FIG. 5 is a map representing an operation characteristic of the normally closed linear valve.

FIG. 5 shows an operation characteristic of each of the four pressure-increase linear valves 80 through 83 and the two pressure-decrease linear valves 90, 91 each of which is a normally closed valve. As described above, the electromagnetic drive force Fd and the pressure-difference acting force Fp are applied to the valve member 105 in a same direction opposite to a direction in which the spring's biasing force Fs is applied to the valve member 105. Therefore, assuming that the spring's biasing force Fs is substantially constant, the electromagnetic drive force Fd that is needed to keep each linear valve 80 through 83, 90, 91 to its closed state is smaller when the pressure-difference acting force Fp is great than when the acting force Fp is small. In other words, the drive force Fd that is needed to switch the each linear valve 80 through 83, 90, 91 from its closed state to its opened state is smaller when the acting force Fp is great than when the acting force Fp is small. Hereinafter, an electric current corresponding to the electromagnetic drive force Fd needed to switch each linear valve 80 through 83, 90, 91 from its closed state to its opened state will be referred to as the "valve opening electric current, $I_{open}$". In the present embodiment, the operation characteristic of each linear valve 80 through 83, 90, 91 is represented by a relationship between (a) pressure difference ΔP corresponding to pressure-difference acting force Fp, and (b) valve opening electric current $I_{open}$, as shown in FIG. 5.

Figure 6:
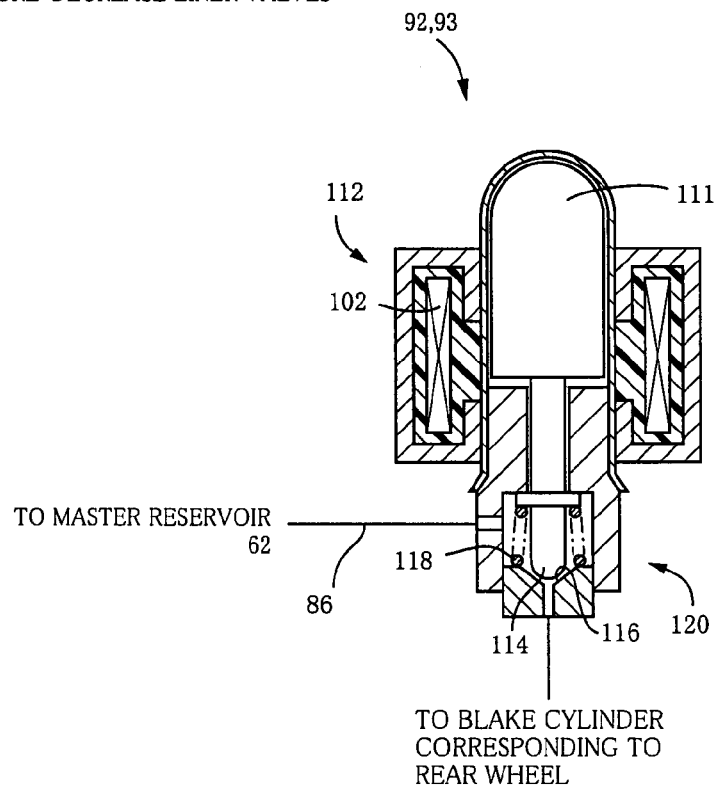
FIG. 6 is a cross-sectional view of a normally opened linear valve as another sort of electromagnetic control valve that is employed by the hydraulic-pressure control apparatus.

FIG. 6 shows a construction of each of the two pressure-decrease linear valves 92, 93 each of which is a normally opened valve. Each of the linear valves 92, 93 has a solenoid 112 including the coil 102 and a plunger 111; and a seating valve 120 including a valve member 114, a valve seat 116, and a spring 118 for biasing, with a biasing force Fs, the valve member 114 toward the valve seat 116.

Each of the two pressure-decrease linear valves 92, 93 is provided in such a manner that a pressure-difference acting force Fp corresponding to a difference ΔP of respective hydraulic pressures in the reservoir 62 and a corresponding one of the two brake cylinders 20 corresponding to the two rear wheels RL, RR is applied to the valve member 114 of the each linear valve. When no electric current is supplied to each linear valve 92, 93, the each linear valve remains in its opened state in which the valve member 114 is kept away from the valve seat 116 by the pressure-difference acting force Fp and the biasing force Fs of the spring 118. Meanwhile, when an electric current is supplied to each linear valve 92, 93, an electromagnetic drive force Fd corresponding to a magnitude of the electric current is exerted to the plunger 111, in a direction to move the valve member 114 toward the valve seat 116, i.e., cause the valve member 114 to be seated on the valve seat 116. Thus, a relative position of the valve member 114 relative to the valve seat 116 is defined by a relationship among the pressure-difference acting force Fp, the spring's biasing force Fs, and the electromagnetic drive force Fd.

Figure 7:
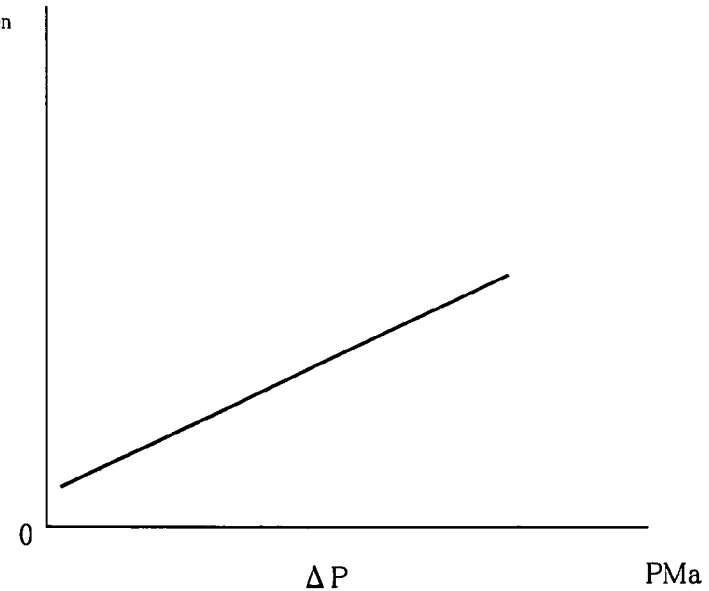
FIG. 7 is a map representing an operation characteristic of the normally opened linear valve.

FIG. 7 shows an operation characteristic of each of the two pressure-decrease linear valves 92, 93 each of which is a normally opened valve. As described above, the spring's biasing force Fs and the pressure-difference acting force Fp are applied to the valve member 114 in a same direction opposite to a direction in which the electromagnetic drive force Fd is applied to the valve member 114. Therefore, assuming that the spring's biasing force Fs is substantially constant, the electromagnetic drive force Fd that is needed to keep each linear valve 92, 93 to its closed state is greater when the pressure-difference acting force Fp is great than when the acting force Fp is small. In other words, the drive force Fd that is needed to switch the each linear valve 92, 93 from its opened state to its closed state is greater when the acting force Fp is great than when the acting force Fp is small. Hereinafter, an electric current corresponding to the electromagnetic drive force Fd needed to switch each linear valve 92, 93 from its opened state to its closed state will be referred to as the "valve closing electric current, $I_{shut}$". The valve closing electric current $I_{shut}$ is greater when the pressure difference ΔP across each linear valve 92, 93 is great than when the pressure difference ΔP is small. As will be described later, when an operation characteristic of each linear valve 92, 93 is obtained, an electric current supplied to the each linear valve when the each linear valve is switched from its closed state to its opened state is obtained. In addition, the valve closing electric current $I_{shut}$ and a valve opening electric current $I_{open}$ can be regarded as being equal to each other. For these reasons, in the present embodiment, the operation characteristic of each normally-opened linear valve 92, 93 is also represented by a relationship between (a) pressure difference ΔP corresponding to pressure-difference acting force Fp, and (b) valve opening electric current $I_{open}$, as shown in FIG. 7. Hereinafter, the valve closing electric current $I_{shut}$ and the valve opening electric current $I_{open}$ are generally referred to as the valve switching current, $I_{switch}$, where appropriate.

The master passage 26 has a stroke simulator device 150 including a stroke simulator 152 and a simulator-related open/close valve 154 that is normally closed. When the simulator-related open/close valve 154 is switched between an opened state thereof and a closed thereof, the stroke simulator 152 is switched between a communication state thereof in which the simulator 152 is communicated with the master cylinder 12, and a shut-off state thereof in which the simulator 152 is shut off from the master cylinder 12. In the present embodiment, when the hydraulic brakes 16 through 19 are operated by the working liquid supplied from the pump device 14, the open/close valve 154 is switched to its opened state; and when the hydraulic brakes 16, 17 are operated by the working liquid supplied from the master cylinder 12, the open/close valve 154 is switched to its closed state.

The hydraulic brake system operates under control of a brake ECU 200 that is essentially constituted by a computer. The brake ECU 200 includes an implementing portion 202, a storing portion 204, and an input and output (I/O) portion 206. The I/O portion 206 is coupled to a pedal-stroke sensor 210; two master-cylinder pressure sensors 214; four brake-cylinder pressure sensors 216; four wheel speed sensors 218; and a pressure-source pressure sensor 220. In addition, the I/O portion 206 is coupled via respective switching circuits, not shown, to the respective coils 100 of the four pressure-increase linear valves 80 through 83 and the two pressure-decrease linear valves 90, 91, the respective coils 102 of the two pressure-decrease linear valves 92, 93, the two master-cylinder shut-off valves 29, 30, and the simulator control valve 154, and is coupled via a driver circuit, not shown, to the pump motor 58.

Figure 8:
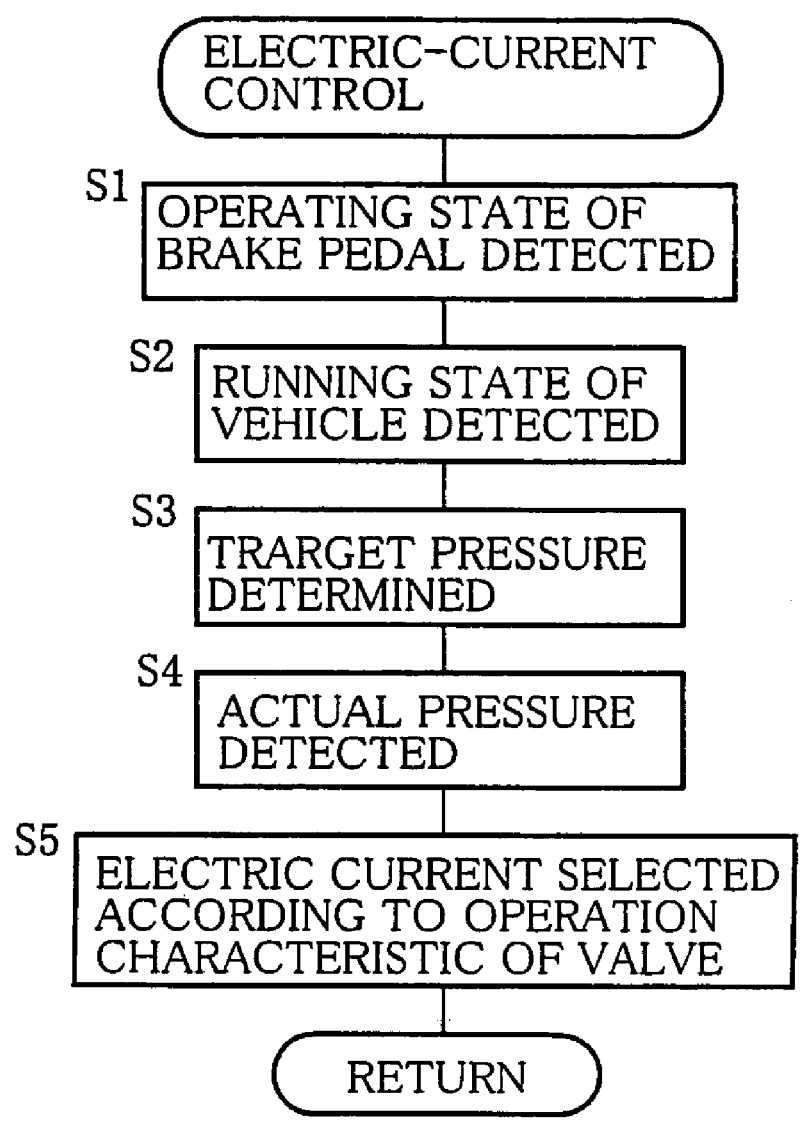
FIG. 8 is a flow chart representing an electric-current control program that is stored by a storing portion of a brake ECU (electronic control unit) of the hydraulic-pressure control apparatus.
Figure 9:
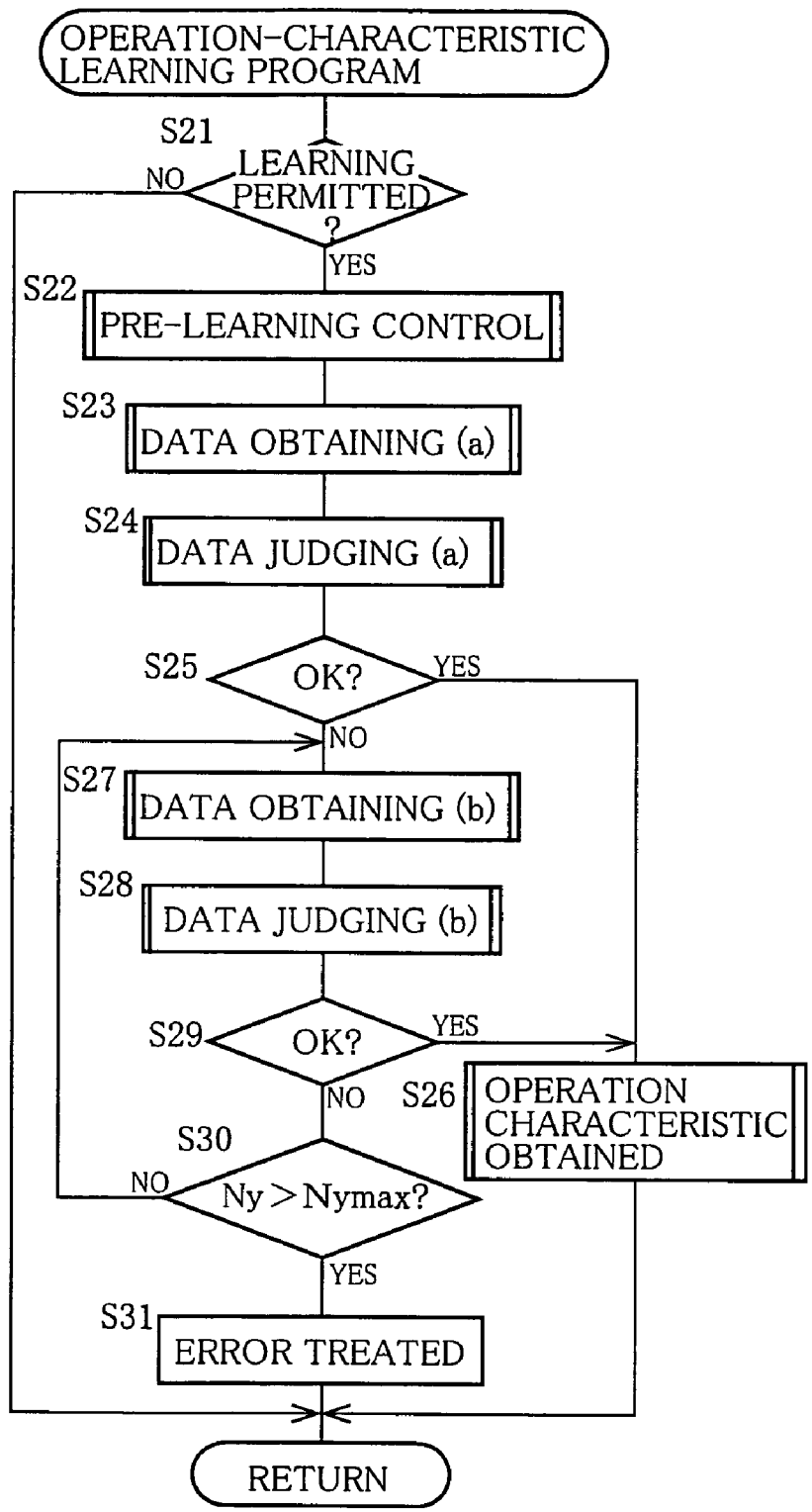
FIG. 9 is a flow chart representing an operation-characteristic learning program that is stored by the storing portion of a brake ECU.

The storing portion 204 stores two operation-characteristic tables represented by respective maps shown in FIGS. 5 and 7; an electric-current supplying program represented by a flow chart shown in FIG. 8; and an operation-characteristic learning program represented by a flow chart shown in FIG. 9.

In the hydraulic brake system constructed as described above, the respective electric currents supplied to the respective coils 100, 102 of the pressure-increase linear valves 80 through 83 and the pressure-decrease linear valves 90 through 93 are controlled so that respective actual hydraulic pressures (hereinafter, simply referred to as the "actual pressures") of the four brake cylinders 20 corresponding to the four wheels approach respective target pressures.

Under a usual or common braking control, respective target pressures corresponding to the four brake cylinders 20 are determined based on a current state of the brake pedal 10 being operated by the driver. More specifically described, a braking force needed by the driver is determined based on at least one of a stroke of operation of the brake pedal 10 and an operating force applied to the pedal 10, and the respective target pressures of the four brake cylinders 20 are so determined as to produce the needed braking force. The respective hydraulic pressures produced in the two pressuring chambers of the master cylinder 12 correspond to the operating force applied to the brake pedal 10. The respective target pressures of the four brake cylinders 20 may be so determined as to be all equal to each other, or may be determined such that the respective target pressures of the two brake cylinders 20 corresponding to the two front wheels FL, FR are equal to each other, the respective target pressures of the two brake cylinders 20 corresponding to the two rear wheels RL, RR are equal to each other, and a ratio of the former target pressure to the latter target pressure is determined according to a front-and-rear braking force distribution line or map.

In addition, under an anti-lock braking control, respective target pressures of the four brake cylinders 20 corresponding to the four wheels are individually determined so that respective slipping states of the wheels being braked are appropriate for a friction coefficient of a road surface; and under a vehicle stability control, respective target pressures of the four brake cylinders 20 are individually determined so that respective lateral-direction slipping states of the wheels are appropriate for a friction coefficient of a road surface.

When there is a need to operate an arbitrary one of the four hydraulic brakes 16 through 19, the electric-current supplying program, shown in FIG. 8, is periodically implemented at a predetermined cycle time.

First, at Step S1, an operation state of the brake pedal 10, such as an operation stroke thereof, is detected by the pedal-stroke sensor 210. Then, at Step S2, a running state of the vehicle, such as respective slipping amounts of the wheels, is detected by the wheel speed sensors 218. Subsequently, at Step S3, respective target pressures of the four brake cylinders 20 corresponding to the four wheels are determined based on the detected operation state of the brake pedal 10 and the detected running state of the vehicle. Then, at Step S4, respective actual pressures of the four brake cylinders 20 are detected by the four brake-cylinder pressure sensors 216. Subsequently, at Step S5, a control-target wheel and a control-target valve are selected, and an electric current to be supplied to the selected control-target valve is determined according to a corresponding one of the operation-characteristic tables stored by the storing portion 206.

Meanwhile, the pump device 14 or the pump motor 58 is so controlled as to cause the pressure of the working liquid in the accumulator 64, detected by the pressure-source pressure sensor 220, to fall within a predetermined pressure range, although a control program therefor is not shown.

In the present embodiment, the operation characteristic of each of the linear valves 80 through 83, 90 through 93 is obtained (i.e., updated) by learning, and the learned operation characteristic is used to control the each linear valve, as compared with a conventional device wherein an operation characteristic predetermined for each linear valve is used. According to the learned operation characteristic, an electric current to be supplied to the coil 100, 102 of the each linear valve 80 through 83, 90 through 93 is controlled. Under this electric-current control, whether the each linear valve 80 through 83, 90 through 93 has been switched from its closed state to its opened state is judged, and a combination of (a) an electric-current value supplied to the coil 100, 102 at a time when the each linear valve 80 through 83, 90 through 93 is switched from its closed state to its opened state and (b) a pressure difference $\Delta P$ across the each linear valve at that time is obtained. Hereinafter, a combination of (a) an electric-current value and (b) a pressure difference $\Delta P$ will be referred to as "a set of data". That an arbitrary one of the linear valves 80 through 83, 90 through 93 is switched from its closed state to its opened state is detected by a corresponding one of the four brake-cylinder pressure sensors 216.

More specifically described, regarding each of the four pressure-increase linear valves 80 through 83, when the hydraulic pressure detected by a corresponding one of the four brake-cylinder pressure sensors 216 is increased by more than a reference pressure, it is judged that the each linear valve has been switched from its closed state to its opened state; and regarding each of the four pressure-decrease linear valves 90 through 93, when the hydraulic pressure detected by a corresponding one of the four brake-cylinder pressure sensors 216 is decreased by more than a reference pressure, it is judged that the each linear valve has been switched from its closed state to its opened state. In addition, a pressure difference $\Delta P$ across each of the four pressure-increase linear valves 80 through 83 is detected as a difference of the hydraulic pressure detected by the pressure-source pressure sensor 220 and the hydraulic pressure detected by a corresponding one of the four brake-cylinder pressure sensors 216. However, the hydraulic pressure detected by the pressure-source pressure sensor 220 may be regarded as being substantially constant. A pressure difference $\Delta P$ across each of the four pressure-decrease linear valves 90 through 93 is detected as the hydraulic pressure detected by a corresponding one of the four brake-cylinder pressure sensors 216, because the pressure of the working liquid in the reservoir 62 is equal to an atmospheric pressure.

Figure 1:
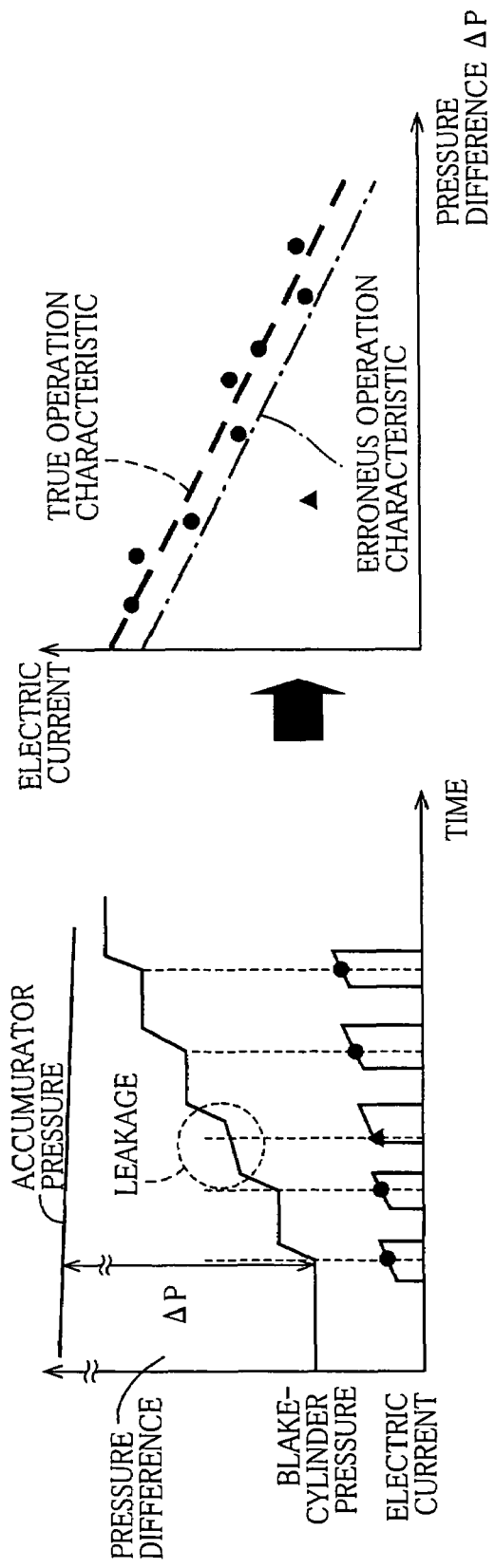
FIG. 1A is a graph showing a manner in which a hydraulic-pressure control apparatus as an embodiment of the present invention obtains an operation characteristic of a normally closed linear valve as a sort of electromagnetic control valve.
FIG. 1B is a graph showing the obtained operation characteristic of the normally closed linear valve.
Figure 19:
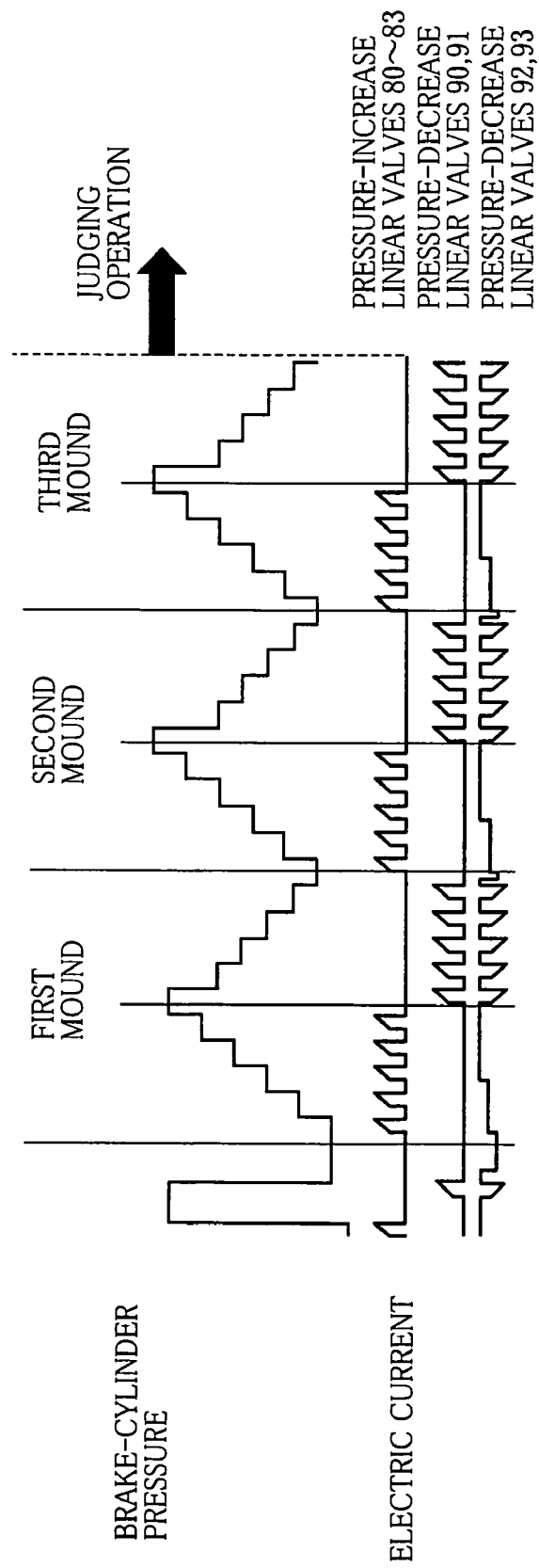
FIG. 19 is a graph showing a manner in which an electric current supplied to each linear valve is controlled to change a corresponding brake-cylinder pressure, when an operation characteristic of the each linear valve is obtained.

An operation-characteristic learning operation is carried out for each one of the four individual hydraulic-pressure control valve devices 70 through 73, independent of the other control valve devices. That is, respective electric currents supplied to the respective coils 100, 102 of the corresponding pressure-increase linear valve 80, 81, 82, 83 and the corresponding pressure-decrease linear valve 90, 91, 92, 93 are so controlled as to change the hydraulic pressure in the corresponding brake cylinder 20 as indicated in a time chart shown in FIG. 19. The pressure-decrease linear valves 90, 91 are each a normally closed valve, whereas the pressure-decrease linear valves 92, 93 are each a normally opened valve. Therefore, respective electric currents supplied to the former valves 90, 91 and respective electric currents supplied to the latter valves 92, 93 are controlled in different manners, as shown in FIG. 19. As shown in FIG. 1, during a single operation-characteristic learning operation, each one of the linear valves 80 through 83, 90 through 93 is switched from its closed state to its opened state, a plurality of times, so as to obtain a plurality of sets of data, respectively, and an operation characteristic of the each linear valve is obtained based on the thus obtained sets of data. In FIG. 1, an example of an operation characteristic of the normally closed valve 80 through 83, 90, 91 is indicated by a broken line.

In the present embodiment, the hydraulic pressure in each brake cylinder 20 (hereinafter, referred to as the "brake-cylinder pressure", where appropriate) is stepwise increased and then stepwise decreased in a single continuous operation, as shown in FIG. 19. On the other hand, the hydraulic pressure in the accumulator 64 (hereinafter, referred to as the "accumulator pressure") is kept to the predetermined pressure range.

The brake-cylinder pressure is increased under control of each pressure-increase linear valve 80 through 83, and is decreased under control of each pressure-decrease linear valve 90 through 93. When an electric current supplied to each one of the pressure-increase linear valves 80 through 83 and an electric current supplied to a corresponding one of the pressure-decrease linear valves 90 through 93 are controlled, the actual brake-cylinder pressure (i.e., the actual hydraulic pressure in a corresponding one of the brake cylinders 20) is changed as indicated by a solid line in FIG. 19. During an operation-characteristic learning operation, the increasing and decreasing of the brake-cylinder pressure is repeated by a predetermined number of times so as to obtain a plurality of sets of data. Whether the thus obtained sets of data are appropriate for use in determining an operation characteristic of each linear valve is judged. If it is judged that the thus obtained sets of data are appropriate, those sets of data are used to determine the operation characteristic; and if not, those sets of data are not used as they are, i.e., no operation characteristic is determined based on those sets of data. As far as the present specification is concerned, one-time increasing and subsequent one-time decreasing of the brake-cylinder pressure will be referred to as the "mound", where appropriate.

Figure 20:
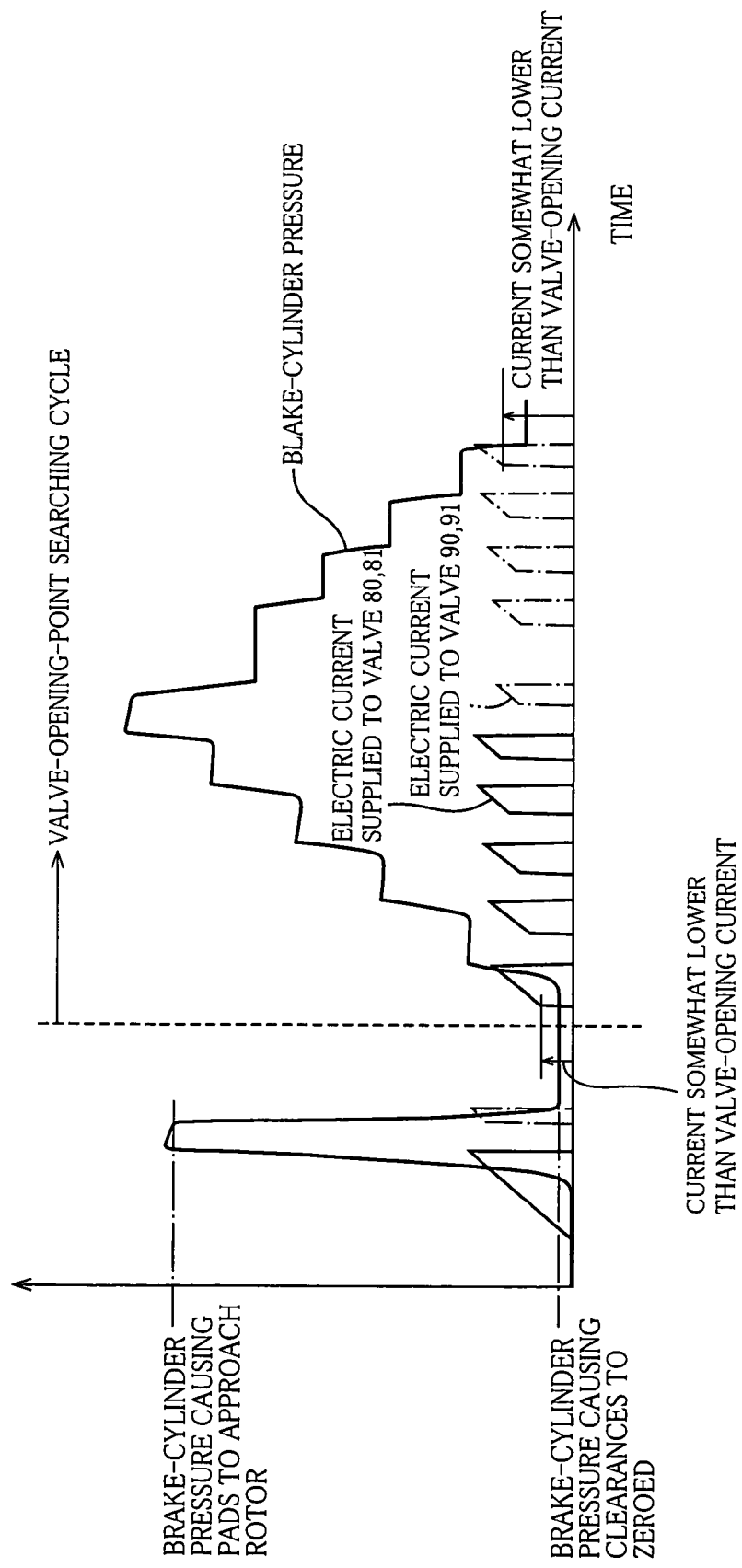
FIG. 20 is a graph showing a manner in which respective electric currents supplied to a pressure-increase linear valve and a pressure-decrease linear valve are controlled to increase, and then decrease, a corresponding brake-cylinder pressure, respectively.

FIG. 20 shows, in the case where an operation-characteristic learning operation is carried out for an arbitrary one of the two individual hydraulic-pressure control valve devices 70, 71 corresponding to the two front wheels FL, FR, a relationship between a time-wise change of the brake-cylinder pressure and respective time-wise changes of an electric current supplied to a corresponding one of the two pressure-increase linear valves 80, 81 and an electric current supplied to a corresponding one of the two pressure-decrease linear valves 90, 91. While the electric current supplied to each one of the two pressure-increase linear valves 80, 81 is continually controlled, no electric current is supplied to a corresponding one of the two pressure-decrease linear valves 90, 91; and while the electric current supplied to each one of the two pressure-decrease linear valves 90, 91 is continually controlled, no electric current is supplied to a corresponding one of the two pressure-increase linear valves 80, 81.

If the electric current supplied to each one of the two pressure-increase linear valves 80, 81 is increased and the actual brake-cylinder pressure reaches a target pressure, then the electric current is decreased down to zero, and then is kept at zero for a reference time duration. This reference time duration corresponds to a second reference time duration, shown in FIG. 21, that is equal to a sum of a first leakage judging time duration and a second leakage judging time duration that will be described later. In the present embodiment, since whether there is a leakage with respect to each linear valve is judged during the second reference time duration, this time duration can be called a leakage judging time duration. In addition, since the electric current supplied to the coil 100 of each linear valve 80, 81 is kept at a constant current (i.e., zero) during the second reference time duration, this time duration can be called an electric-current keeping time duration, and this sate can be called an electric-current keeping state or a leakage judging state.

The electric-current keeping time duration (i.e., the electric-current keeping state) is followed by an electric-current searching state (i.e., an electric-current searching mode). During this mode, the electric current supplied to each pressure-increase linear valve 80, 81 is increased at a pre-selected small slope. When that each one of the pressure-increase linear valves 80, 81 has been switched from its closed state to its opened state as a result of the increasing of the electric current is detected by the corresponding brake-cylinder pressure sensor 216, a pressure difference ΔP across the each linear valve 80, 81 at that time is detected, and a set of data including this pressure difference ΔP and an electric-current value supplied to the each linear valve 80, 81 at that time are stored in the storing portion 204. Thus, the electric-current searching state (i.e., the electric-current searching mode) can be called a valve-opening-time searching state (or a valve-opening-time searching mode).

If the valve-opening-time searching state or mode is established at a certain time, then a pressure difference ΔP across each pressure-increase linear valve 80, 81 at that time and the operation characteristic of the each linear valve 80, 81, currently stored by the storing portion 204, are used to determine a valve opening current, and an electric current smaller than the thus determined valve opening current by a pre-selected electric current is supplied to the each linear valve 80, 81. Subsequently, the electric current supplied to the each linear valve 80, 81 is increased at a pre-selected constant slope. This slope is so pre-selected as to assure that the switching of each one of the pressure-increase linear valves 80, 81 from its closed state to its opened state can be detected by a corresponding one of the brake-cylinder pressure sensors 216.

When each one of the pressure-increase linear valves 80, 81 is switched from its closed state to its opened state, the corresponding target pressure is increased, and subsequently the electric current supplied to the each linear valve 80, 81 is controlled so that the actual pressure of the corresponding brake cylinder 20 approaches the increased target pressure. In the present embodiment, when the actual pressure is controlled to approach the increased target pressure, the electric current supplied to the coil 100 of the each linear valve 80, 81 is increased at a pre-selected small slope comparable with that employed in the electric-current searching mode, because, as will be described later, whether there is a leakage is detected after the switching of the each linear valve 80, 81 from its closed state to its opened state is detected. The target pressure corresponding to the each linear valve 80, 81 is increased by each pre-selected incremental amount, that is, is increased in steps such that those steps have a same incremental amount.

An electric current supplied to each one of the two pressure-decrease linear valves 90, 91 is controlled in the same manner as described above. As indicated by one-dot chain lines in FIG. 20, an electric-current keeping state is followed by an electric-current searching state in which the electric current is increased at a pre-selected slope. When the each linear valve 90, 91 is switched from its closed state to its opened state as a result of increasing of the electric current, the hydraulic pressure in the corresponding brake cylinder 20 is decreased. Therefore, when the hydraulic pressure of the brake cylinder 20 is decreased by more than a reference amount, it is judged that the each linear valve 90, 91 has been switched from its closed state to its opened state, and a set of data including a pressure difference $\Delta P$ across the each linear valve 80, 81 at that time and an electric-current value supplied to the coil 100 of the each linear valve 90, 91 at that time are stored in the storing portion 204.

Leakage detecting operations are carried out concurrently with an operation-characteristic learning operation.

At least one leakage detecting operation is carried out each time one set of data is obtained, i.e., each time one valve opening point is detected. Thus, at least one leakage detecting operation corresponds to one valve opening point. In the present embodiment, two leakage detecting operations are carried out during one electric-current keeping time duration or state, and one leakage detecting operation is carried out during a time duration or state, after the opening of valve, in which an electric current supplied to the valve is increased slowly, i.e., at a low rate.

Figure 21:
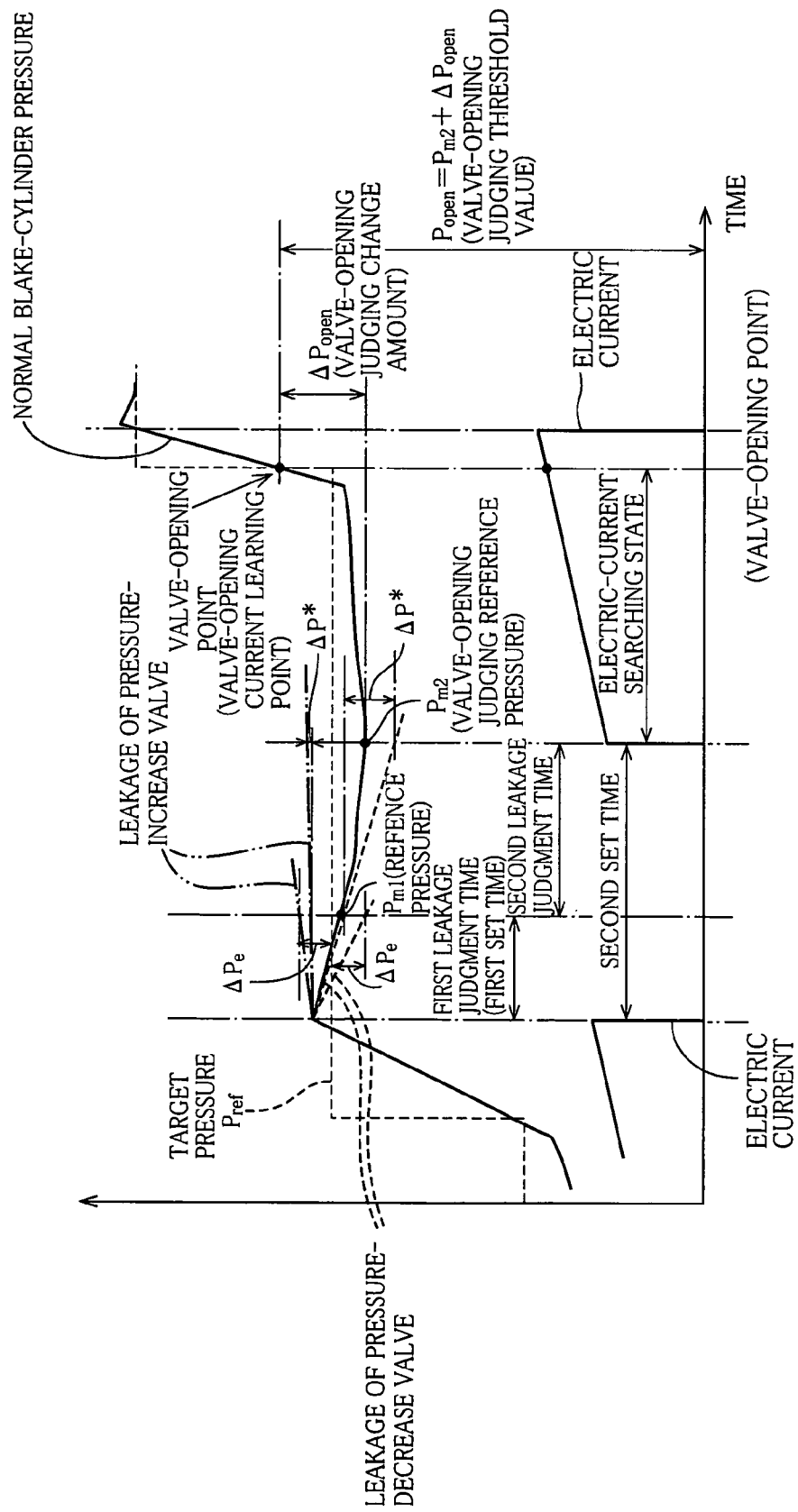
FIG. 21 is a graph showing change of a brake-cylinder pressure after an electric current supplied to a pressure-increase linear valve is zeroed.

As shown in FIG. 21, when the electric current supplied to each one of the pressure-increase linear valves 80, 81 is increased and then decreased to zero, the hydraulic pressure in the corresponding brake cylinder 20 is decreased, as indicated by a solid line, because of, e.g., elastic deformation and/or thermal expansion of the corresponding caliper 21. However, if the one linear valve 80, 81 has a leakage of the working liquid because of, e.g., biting of a foreign matter, the hydraulic pressure in the corresponding brake cylinder 20 is increased, as indicated by two-dot chain lines, or is decreased at a smaller slope as compared with a slope at which the hydraulic pressure, indicated by the solid line, is decreased. On the other hand, if each one of the pressure-decrease linear valve 90, 91 has a leakage of the working liquid because of, e.g., biting of a foreign matter, the hydraulic pressure in the corresponding brake cylinder 20 is decreased, as indicated by broken lines, at a greater slope as compared with the slope of decreasing of the hydraulic pressure, indicated by the solid line.

In the present embodiment, a first reference time duration after the electric current is decreased to zero will be referred to as a first leakage judging time duration; and a time duration that follows the fist reference time duration and falls within the electric-current keeping time duration (i.e., a second reference time duration) after the electric current is decreased to zero will be referred to as a second leakage judging time duration. In the present embodiment, the first leakage judging time duration is shorter than the second leakage judging time duration.

Whether there is a leakage is detected not only when the first leakage judging time duration elapses but also when the second leakage judging time duration elapses. If each one of the pressure-increase linear valves 80, 81 has a large amount of leakage (hereinafter, simply referred to as the "large leakage", where appropriate), the large leakage can be detected when the first leakage judging time duration elapses; and if the one pressure-increase linear valve 80, 81 has a small amount of leakage (hereinafter, simply referred to as the "small leakage", where appropriate), the small leakage may not be detected when the first leakage judging time duration elapses but it can be detected when the second leakage judging time duration elapses. In other words, the first leakage judging time duration is so pre-selected to be able to detect the large leakage; and the second leakage judging time duration is so pre-selected to be able to detect even the small leakage.

In the present embodiment, if a value, $\Delta Pe$, obtained by subtracting a target hydraulic pressure, Pref, from an actual hydraulic pressure, P*, when the first leakage judging time duration elapses is greater than a pressure-increase-valve-related first leakage judging threshold value, $\Delta Pa1$ (i.e., P*−Pref=$\Delta Pe$>$\Delta Pa1$), it is judged that each one of the pressure-increase linear valves 80, 81 has a leakage. The actual pressure P* when the first leakage judging time duration elapses will be used as a leakage judging reference pressure, Pm1, to judge whether there is a leakage when the second leakage judging time duration elapses. Thus, the reference pressure Pm1 is stored in the storing portion 204.

In addition, if a value, $\Delta P$*, obtained by subtracting the reference pressure Pm1 from an actual hydraulic pressure P* when the second leakage judging time duration elapses is greater than a pressure-increase-valve-related second leakage judging threshold value, $\Delta Pa2$ (i.e., P*−Pm1=$\Delta P$*>$\Delta Pa2$), it is judged that each one of the pressure-increase linear valves 80, 81 has a leakage. The actual pressure P* when the second leakage judging time duration elapses is used as a valve-opening judging reference pressure, Pm2, to determine a valve-opening judging threshold value, $P_{open}$. Thus, the valve-opening judging reference pressure Pm2 is stored in the storing portion 204.

Thus, in the electric-current keeping state in which the electric current supplied to each one of the pressure-increase linear valves 80, 81 is kept to zero, whether there is a leakage is judged not only when the first leakage judging time duration elapses but also when the second leakage judging time duration elapses. Since, however, the second leakage judging time duration is longer than the first leakage judging time duration, the two pressure-increase-valve-related leakage judging threshold values $\Delta Pa1$, $\Delta Pa2$ may be equal to each other. Alternatively, the second leakage judging threshold value $\Delta Pa2$ may be smaller than the first leakage judging threshold value $\Delta Pa1$. If the second leakage judging time duration is longer than the first leakage judging time duration, or if the second leakage judging threshold value $\Delta Pa2$ is smaller than the first leakage judging threshold value $\Delta Pa1$, then a smaller leakage can be detected. In the present embodiment, the second leakage judging threshold value $\Delta Pa2$ is a pre-selected value that is greater than, and near to, zero.

Meanwhile, if a value $\Delta Pe$ obtained by subtracting, from a target hydraulic pressure Pref, an actual hydraulic pressure P* when the first leakage judging time duration elapses is greater than a pressure-decrease-valve-related first leakage judging threshold value, $\Delta Pr1$ (i.e., Pref−P*=$\Delta Pe$>$\Delta Pr1$), or if a value $\Delta P$* obtained by subtracting, from the reference pressure Pm1, an actual hydraulic pressure P* when the second leakage judging time duration elapses is greater than a pressure-decrease-valve-related second leakage judging threshold value, $\Delta Pr2$ (i.e., Pm1−P*=$\Delta P$*>$\Delta Pr2$), it is judged that each one of the pressure-increase linear valves 80, 81 has a leakage. Like the two pressure-increase-valve-related leakage judging threshold values $\Delta Pa1$, $\Delta Pa2$, the two pressure-decrease-valve-related leakage judging threshold values $\Delta Pr1$, $\Delta Pr2$ may be equal to each other, or the second leakage judging threshold value $\Delta Pr2$ may be smaller than the first leakage judging threshold value $\Delta Pr1$.

Hereinafter, the leakage judging operation carried out when the first leakage judging time duration elapses will be referred to as the electric-current-keeping-state-related first leakage judging operation; and the leakage judging operation carried out when the second leakage judging time duration elapses will be referred to as the electric-current-keeping-state-related second leakage judging operation.

In the present embodiment, in the electric-current-keeping-state-related first leakage judging operation, whether there is a leakage is judged based on the difference of the actual pressure P* and the target pressure Pref, and in the electric-current-keeping-state-related second leakage judging operation, whether there is a leakage is judged based on the difference of the reference pressure Pm1 and the actual pressure P*. However, in each of the first and second leakage judging operations, whether there is a leakage may be judged based on the difference of a normal or standard hydraulic pressure, indicated by the solid line, and the actual pressure P*.

In the present embodiment, regarding each one of the pressure-increase linear valves 80, 81, the valve-opening judging threshold value $P_{open}$ is determined to be equal to a value obtained by adding, to the valve-opening judging reference pressure Pm2, a valve-opening judging change amount, $\Delta P_{open}$. As shown in FIG. 21, if, in the electric-current searching state, the actual hydraulic pressure P* in the corresponding brake cylinder 20 exceeds the valve-opening judging threshold value $P_{open}$ (i.e., $P^* > P_{open} = Pm2 + \Delta P_{open}$), it is judged that the one pressure-increase linear valve 80, 81 has been switched from its closed state to its opened state.

On the other hand, regarding each one of the pressure-decrease linear valves 90, 91, a valve-opening judging threshold value $P_{open}$ is determined to be equal to a value obtained by subtracting, from the valve-opening judging reference pressure Pm2, a valve-opening judging change amount $\Delta P_{open}$. If, in the electric-current searching state, the actual hydraulic pressure P* in the corresponding brake cylinder 20 lowers to below the valve-opening judging threshold value $P_{open}$ (i.e., $P^* < P_{open} = Pm2 - \Delta P_{open}$), it is judged that the one pressure-decrease linear valve 90, 91 has been switched from its closed state to its opened state.

That each pressure-increase or -decrease linear valve 80, 81, 90, 91 has been switched from its closed state to its opened state may be detected either when the actual pressure P* exceeds, or lowers to below, the valve-opening judging threshold value $P_{open}$, just one time, or after it has been detected a plurality of times. In addition, the valve-opening judging change amount $\Delta P_{open}$ used for each pressure-increase linear valve 80, 81, and the valve-opening judging change amount $\Delta P_{open}$ used for each pressure-decrease linear valve 90, 91 may be equal to, or different from, each other.

Figure 22:
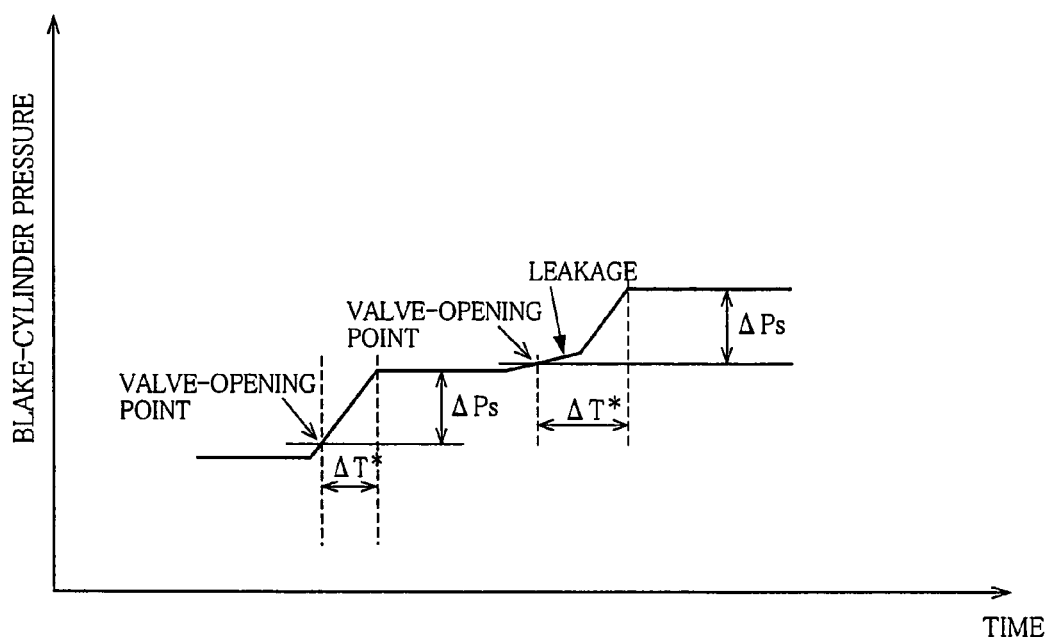
FIG. 22 is a graph showing change of a brake-cylinder pressure when a corresponding linear valve has a leakage of a working liquid.

In addition, after each one of the pressure-increase linear valves 80, 81 has been opened, whether there is a leakage is judged. If each one of the pressure-increase linear valves 80, 81 has a leakage, a slope of increasing of the corresponding brake-cylinder pressure P* decreases, as shown in FIG. 22, even if a slope of increasing of the electric current supplied to the one linear valve 80, 81 may not change. Therefore, in the electric-current searching state in which the electric current supplied to the one linear valve 80, 81 is increased at a constant slope, if an actual time duration, $\Delta T^*$, needed for the brake-cylinder pressure P* to change by a reference pressure, $\Delta Ps$, after that the one linear valve 80, 81 has been opened is detected, is longer than a leakage judging reference time duration, $\Delta Ts$, or if a change amount $\Delta P^*$ of the actual brake-cylinder pressure P* during a reference time duration after that the each linear valve 80, 81 has been opened is detected, is smaller than a leakage judging reference change amount, $\Delta Ps$, then it can be judged that the one linear valve 80, 81 has a leakage. This leakage judging operation will be referred to as the after-valve-opening (or valve-opened-state-related) leakage judging operation.

If each one of the pressure-increase linear valves 80, 81 has no leakage, the corresponding brake-cylinder pressure P* increases, after the opening of the one linear valve 80, 81, at a slope corresponding to the slope of increasing of the electric current supplied to the one linear valve 80, 81. On the other hand, if the one linear valve 80, 81 is biting, e.g., a foreign matter, the one linear valve 80, 81 is opened, because of the foreign matter, before the electric current supplied to the one linear valve 80, 81 is increased up to a true valve-opening electric current $I_{open}$. In this case, however, a degree of opening of the one linear valve 80, 81 is not sufficiently great. Therefore, the brake-cylinder pressure P* is increased at a slope smaller than the slope corresponding to the electric current. Since this increase of the brake-cylinder pressure P* results in decreasing the pressure difference $\Delta P$ across the one linear valve 80, 81, a true opening of the one linear valve 80, 81 is delayed (because an electric current needed for the true opening is increased). After the one linear valve 80, 81 is actually opened, the brake-cylinder pressure P* increases at the same slope as the slope when the one linear valve 80, 81 has no leakage. Therefore, when the one linear valve 80, 81 has a leakage, an average slope of increasing of the brake-cylinder pressure P* after the starting of increasing of the pressure P* decreases, so that a time duration needed for the pressure P* to increase by a reference pressure amount increases.

Regarding each one of the pressure-decrease linear valves 90, 91, too, whether the one linear valve 90, 91 has a leakage is judged based on how the corresponding brake-cylinder pressure P* changes after the opening thereof.

As shown in FIGS. 19 and 20, in the present embodiment, the hydraulic pressure in each one of the respective brake cylinders 20 of the four hydraulic brakes 16 through 19 is controlled to zero or remove clearances that may be present between the two pads 22 and the rotor 23, before the operation-characteristic learning operation is carried out. It is, however, noted that FIG. 20 shows an example of a pre-learning control that is performed for each one of the two hydraulic brakes 16, 17.

In the present embodiment, the brake-cylinder pressure is increased up to a pre-learning first reference pressure and then is decreased down to a pre-learning second reference pressure. The pre-learning second pressure is so pre-selected as to assure that the clearances can be reduced, and may be a pressure when a first-time filling of the brake cylinder 20 ends, or a pressure somewhat higher than the pressure when the first fill ends.

When the brake-cylinder pressure is increased up to the pre-learning first reference pressure, a great pressing force is applied to the pads 22, so that the pads 22 can surely approach the rotor 23. Thereafter, when the electric current supplied to each one of the pressure-increase linear valves 80, 81 is decreased, the clearances between the pads 22 and the rotor 23 can be reliably zeroed.

Figure 23:
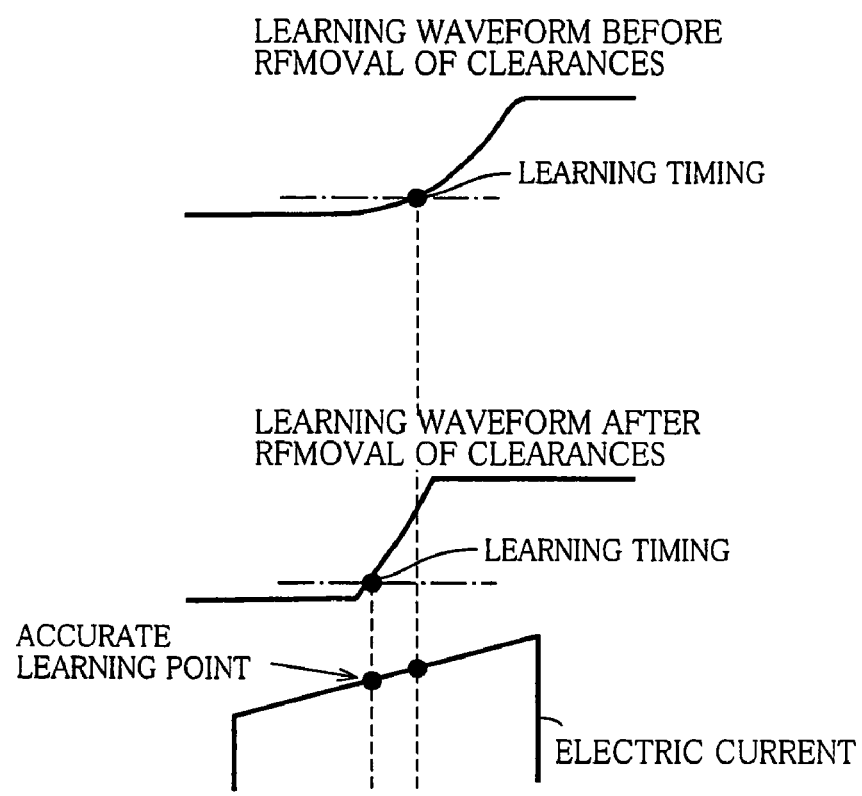
FIG. 23 is a view showing an effect of a pre-learning control.
Figure 24:
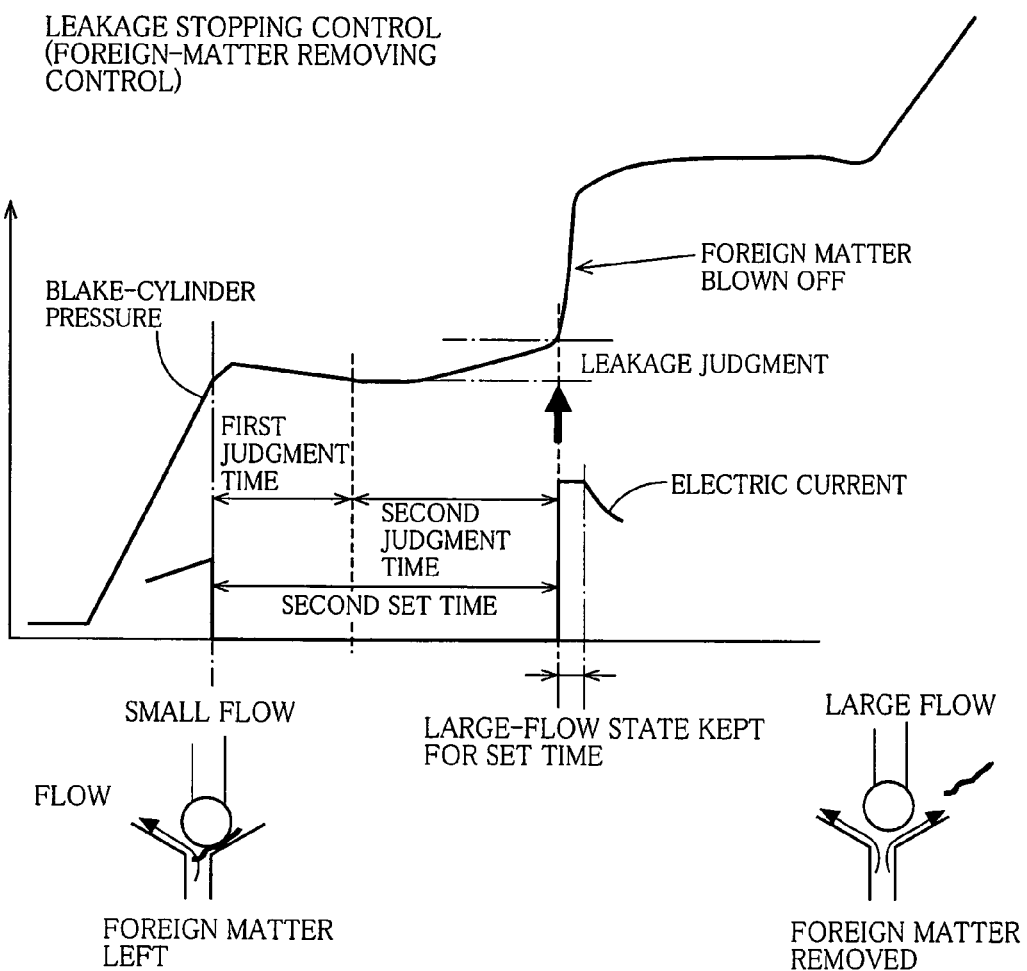
FIG. 24 is a graph showing a manner in which an electric current is supplied to a pressure-increase linear valve under a leakage stopping control, and showing change of a corresponding brake-cylinder pressure.

If the clearances between the pads 22 and the rotor 23 are considerably large, a slope of increasing of the brake-cylinder pressure when supplying of the working liquid to the brake cylinder 20 starts, decreases as shown in FIG. 23. Therefore, even if each one of the pressure-increase linear valves 80, 81 may have no leakage, it may be erroneously judged that the one linear valve 80, 81 has a leakage. In contrast, if the operation-characteristic obtaining operation is carried out after the clearances are reduced, the slope of increasing of the brake-cylinder pressure when the supplying of the working liquid to the brake cylinder 20 starts can be prevented from being decreased.

This clearance-reduction pressure control can be called a pre-learning control or a clearance-reduction control.

When a leakage of each one of the pressure-increase and pressure-decrease linear valves 80, 81, 90, 91 is detected, a leakage solving or stopping control (i.e., a foreign-matter removing control) is performed for the one linear valve. In the case where a leakage of each one of the pressure-increase linear valves 80, 81 is detected, an electric current is supplied to the coil 100 thereof, such that a degree of opening of the one linear valve 80, 81 that corresponds to a distance between the valve member 105 and the valve seat 106 is higher than a reference degree. Thus, a large amount of the working liquid flows through the one linear valve 80, 81 and accordingly the foreign matter can be reliably removed from the one linear valve 80, 81. In addition, a posture of the valve member 105 relative to the valve seat 106 can be corrected to a normal posture. In the present embodiment, such an electric current that maximizes the degree of opening of each one of the pressure-increase linear valves 80, 81, i.e., a maximum electric current that can be supplied to the one linear valve 80, 81 is supplied thereto. The state in which the degree of opening of the one linear valve 80, 81 is maximized is kept for a reference time duration. This reference time duration may be so pre-selected as to assure that the state in which the large amount of the working liquid flows is kept and accordingly the foreign matter can be surely removed, while the corresponding brake-cylinder pressure is not increased so largely. For example, this reference time duration may be so pre-selected as to assure that an amount of increasing of the brake-cylinder pressure is somewhat smaller than that of the target pressure.

In the case where a leakage of each one of the pressure-decrease linear valves 90, 91 is detected, too, a similar leakage stopping control is performed. That is, an electric current that maximizes a degree of opening of the each linear valve 90, 91 that corresponds to a distance between the valve member 105 and the valve seat 106 is supplied to the coil 100 of the one linear valve 90, 91.

As will be described later, when a leakage of each one of the other, two pressure-decrease linear valves 92, 93 is detected, an electric current supplied to the one linear valve 92, 93 is zeroed, so that a degree of opening of the one linear valve 92, 93 that corresponds to a distance between the valve member 114 and the valve seat 116 is maximized.

Next, there will be described a case where an operation-characteristic learning operation is carried out for each one of the two individual hydraulic-pressure control valve devices 72, 73 corresponding to the two rear wheels. An electric current supplied to the coil 102 of each one of the two pressure-increase linear valves 82, 83 is controlled in the same manner as the above-described manner in which the electric current supplied to the coil 100 of each one of the two pressure-increase linear valves 80, 81 is controlled. However, since each one of the two pressure-decrease linear valves 92, 93 is a normally opened valve, an electric current supplied to the coil 102 of the one linear valve 92, 93 is controlled in a manner different from the above-described manner in which the electric current supplied to the coil 100 of each one of the two pressure-decrease linear valves 90, 91 each of which is a normally closed valve is controlled.

Figure 25:
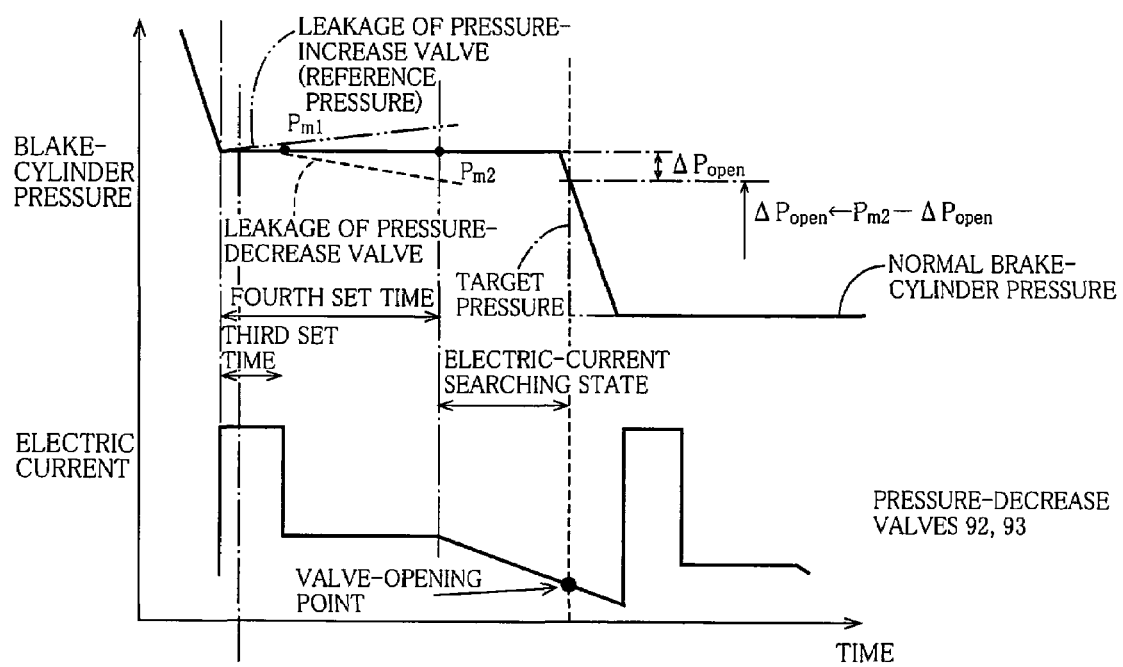
FIG. 25 is a graph corresponding to FIG. 21, and showing a manner in which an electric current supplied to a pressure-decrease linear valve as a normally opened valve is controlled to change a corresponding brake-cylinder pressure, when an operation characteristic of the linear valve is obtained.

The electric current supplied to each one of the pressure-decrease linear valves 92, 93 is controlled as shown in FIG. 25. More specifically described, After the electric current supplied to the one linear valve 92, 93 is decreased and accordingly the corresponding brake-cylinder pressure reaches a target pressure, the electric current is increased to, and is kept at, a predetermined current. During a third reference time duration after the brake-cylinder pressure reaches the target pressure, an electric current that is sufficiently great to keep the current brake-cylinder pressure is supplied to the one linear valve 92, 93. Thus, a foreign matter that may be present between the valve member 114 and the valve seat 116 and that may be formed of a soft material (e.g., an aluminum-based matter) can be cut off. During the third reference time duration, the one linear valve 92, 93 is supplied with an electric current that produces an electromagnetic drive force as a force to press the valve member 114 against the valve seat 116, such that the produced electromagnetic drive force is greater than a reference drive force, for example, the produced electromagnetic drive force may be a maximum electromagnetic drive force.

During a late portion of a fourth reference time duration which portion follows the third reference time duration, an electric current supplied to each one of the pressure-decrease linear valves 92, 93 is decreased and accordingly an electromagnetic drive force Fd having a direction to press the valve member 114 against the valve seat 116 is decreased. Thus, the one linear valve 92, 93 becomes more easily openable by a foreign matter, and a leakage of the one linear valve 92, 93 becomes more easily detectable. During the late portion of the fourth reference time duration, an electric current that is greater by a predetermined amount than a valve opening electric current $I_{open}$ corresponding to a pressure difference $\Delta P$ across the one linear valve 92, 93 at that time, is supplied to the one linear valve 92, 93. In other words, an intermediate electric current that produces an intermediate electromagnetic drive force that is greater by a predetermined amount than the smallest drive force that can keep the one linear valve 92, 93 to its closed state is supplied to the one linear valve 92, 93.

In this case, a leakage judging operation is carried out when the fourth reference time duration elapses.

If an actual hydraulic pressure P* when the fourth reference time duration elapses (i.e., a valve-opening judging reference pressure Pm2) is higher than a leakage judging reference pressure Pm1 (i.e., an actual hydraulic pressure P* when the third reference time duration elapses) by more than a pressure-increase-valve-related leakage judging threshold value $\Delta Pa2$ (i.e., P*−Pm1>$\Delta Pa2$), then it is judged that each one of the pressure-increase linear valves 82, 83 has a leakage; and if the actual hydraulic pressure P* when the fourth reference time duration elapses is lower than the leakage judging reference pressure Pm1 by more than a pressure-decrease-valve-related leakage judging threshold value $\Delta Pr2$ (i.e., Pm1−P*>$\Delta Pr2$), then it is judged that each one of the pressure-decrease linear valves 92, 93 has a leakage. Thus, regarding each one of the pressure-decrease linear valves 92, 93 that is a normally opened valve, a single electric-current-keeping-state-related leakage judging operation is carried out.

When each one of the pressure-increase linear valves 82, 83 is controlled to stepwise increase the hydraulic pressure in the corresponding brake cylinder 20, an electric current supplied to the corresponding pressure-decrease linear valve 92, 93 is also increased. When the operation-characteristic learning operation is carried out, the electric current supplied to each one of the pressure-decrease linear valves 92, 93 can be kept to a current that can keep the one linear valve 92, 93 to its closed state even if the corresponding brake cylinder 20 may have a maximum hydraulic pressure. In this case, however, an excessive amount of electric power is consumed. Hence, in the present embodiment, the electric current supplied to each one of the pressure-decrease linear valves 92, 93 is increased as the hydraulic pressure in the corresponding brake cylinder 20 is increased.

The operation characteristic of each one of the pressure-increase or -decrease linear valves 80 through 83, 90 through 93 is learned according to an operation-characteristic learning program represented by a flow chart shown in FIG. 9. This learning program is periodically implemented by the brake ECU 200 at a predetermined cycle time, with respect to each one of the four individual hydraulic-pressure control valve devices 70 through 73 corresponding to the four wheels of the vehicle, respectively.

First, at Step S21, the ECU 200 judges whether a predetermined operation-characteristic-learning permitting condition has been met. For example, the predetermined learning permitting condition includes a first condition that the present brake system is normally operating, a second condition that the brake system is in a test mode, and a third condition that a vehicle employing the brake system is in a stopped state. If a positive judgment is made at Step S21, then the control of the ECU 200 goes to Step S22 and the following steps.

At Step S22, a pre-learning control is performed and, at Step S23, sets of data are obtained. As shown in FIG. 19, the hydraulic pressure in each of the brake cylinders 20 is repeatedly increased and decreased till a predetermined number of "mounds" are obtained. Thus, a plurality of sets of data each set of which consists of (a) an electric current at a time when each one of the pressure-increase and -decrease linear valves 80 through 83, 90 through 93 is switched from its closed state to its opened state and (b) a pressure difference ΔP across the one linear valve at that time.

At Step S24, the ECU 200 judges whether the sets of data obtained at Step S23 are appropriate. If the obtained sets of data are appropriate, a positive judgment is made at Step S25, and the control of the ECU 200 proceeds with Step S26 to determine an operation characteristic of the one linear valve 80 through 83, 90 through 93, produce a new map representing the determined operation characteristic, and store, in the storing portion 204, the new map in place of the corresponding prior map. Thereafter, an electric current supplied to the one linear valve 80 through 83, 90 through 93 is controlled according to the new map.

On the other hand, if the obtained sets of data are not appropriate, a negative judgment is made at Step S25, and the control proceeds with Step S27 to increase and then decrease the corresponding brake-cylinder pressure, once more, so as to obtain sets of data. Step S27 is followed by Step S28 to judge whether sets of data including the sets of data obtained at Step S23 and the sets of data obtained at Step S28 are appropriate. If those sets of data are appropriate, a positive judgment is made at Step S29, and the control proceeds with Step S26 to determine an operation characteristic of the one linear valve 80 through 83, 90 through 93. On the other hand, if those sets of data are not appropriate, a negative judgment is made at Step S29, and the control proceeds with Step S30 to judge whether a current total number, Ny, of the mounds is greater than a reference number, $Ny_{max}$ (i.e., a maximum or permissible pressure-increase-and-decrease time). Before the current total mound number Ny exceeds the maximum number $Ny_{max}$, i.e., as long as a negative judgment is made at Step S30, increasing and decreasing of the brake-cylinder pressure are repeated at Steps S27 and S28 till the sets of data are judged as being appropriate at Step S29. However, if appropriate sets of data can not be obtained even after the mound number Ny exceeds the maximum number $Ny_{max}$, a positive judgment is made at Step S30, and the control goes to Step S31 to judge that an error has occurred.

Figure 10:
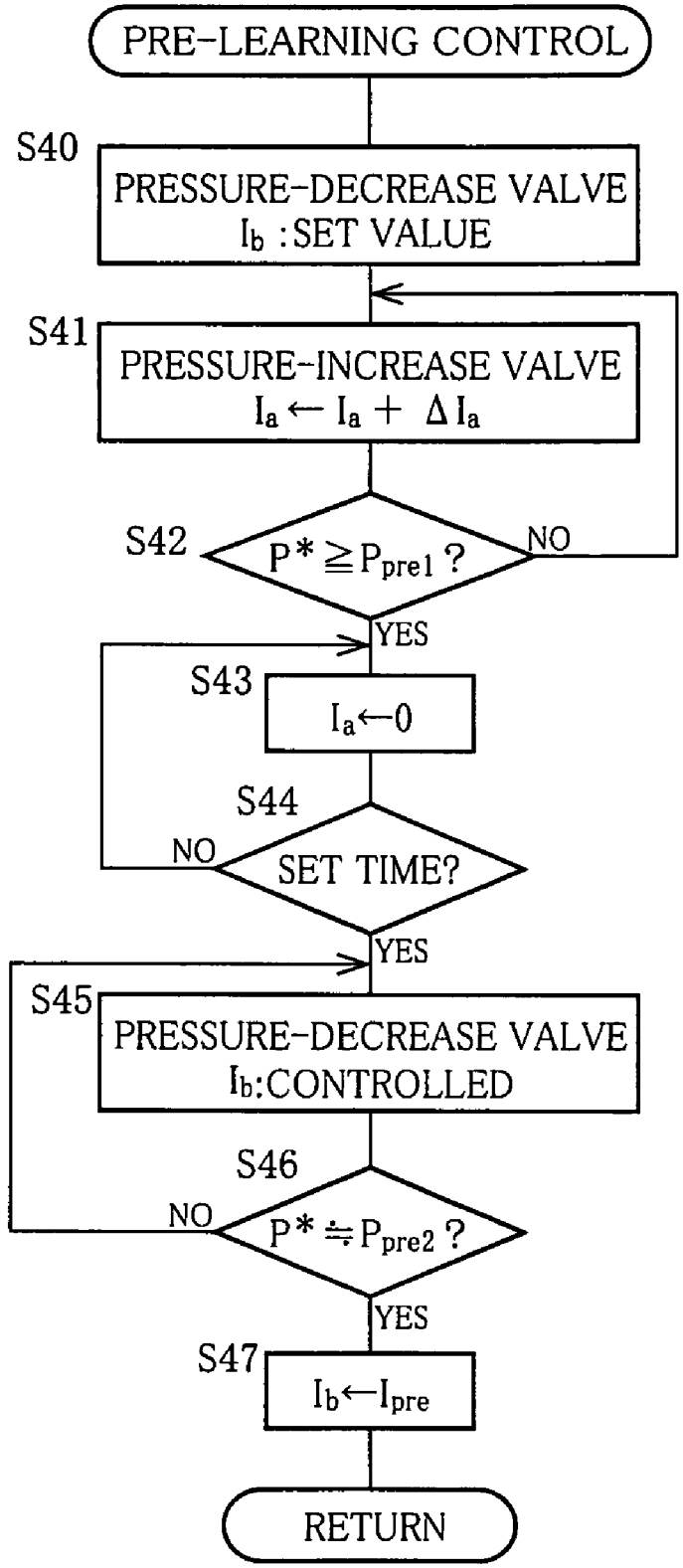
FIG. 10 is a flow chart representing a portion (i.e., a pre-learning control at Step S22) of the operation-characteristic learning program.

The pre-learning control at Step S22 is performed according to a pre-learning control routine represented by a flow chart shown in FIG. 10. This routine is implemented for each one of the four hydraulic brakes 16 through 19 corresponding to the four wheels, respectively.

First, there will be described a case where the pre-learning control is performed for an arbitrary one of the two hydraulic brakes 16, 17 corresponding to the two front wheels. At Step S40, the ECU 200 sets, as an electric current, Ib, supplied to the corresponding pressure-decrease linear valve 90, 91, a value of zero (Ib←0: set value), so that the linear valve is kept to its closed state. Thus, the pressure-decrease linear valve 90, 91 is kept to its closed state while an electric current, Ia, supplied to the corresponding pressure-increase linear valve 80, 81 is changed. At Step S41, the electric current Ia supplied to the pressure-increase linear valve 80, 81 is increased (Ia←Ia+ΔIa). At Step S42, the ECU 20 judges whether the actual hydraulic pressure P* in the corresponding brake cylinder 20 has reached a pre-learning first reference pressure, Ppre1. If the actual pressure P* is equal to, or higher than, the first reference pressure Ppre1, a positive judgment is made at Step S42, and the control goes to Step S43 to zero the electric current Ia supplied to the linear valve 80, 81 (Ia←0), so as to keep the current brake-cylinder pressure P*.

Then, at Step S44, the ECU 200 judges whether the state in which the brake-cylinder pressure P* is equal to, or higher than, the first reference pressure Ppre1 has lasted for more than a reference time duration. If a positive judgment is made at Step S44, the control goes to Step S45 to increase the electric current Ib supplied to the pressure-decrease linear valve 90, 91 (Ib←Ib+ΔIb), so as to decrease the hydraulic pressure in the corresponding brake cylinder 20. When the actual pressure P* is decreased down to around a pre-learning second reference pressure, Ppre2, a positive judgment is made at Step S46, and the control goes to Step S47 to zero the electric current Ib supplied to the linear valve 90, 91 (Ib←0=Ipre). Thus, the brake-cylinder pressure is kept to the second reference pressure Ppre2. In this state, the clearances between the pads 22 and the rotor 23 are substantially zero.

Next, there will be described a case where the pre-learning control is performed for an arbitrary one of the two hydraulic brakes 18, 19 corresponding to the two rear wheels. The ECU 200 operates, at Step S40, for supplying a maximum electric current Ib to the corresponding pressure-decrease linear valve 92, 93 (Ib←Imax: set value), so as to keep the linear valve 92, 93 to its closed state, while the ECU 200 controls, at Steps S41 through S44, an electric current Ia supplied to the corresponding pressure-increase linear valve 80, 81. If a reference time duration elapses after the brake-cylinder pressure has reached the pre-learning first reference pressure Ppre1, the ECU 200 decreases, at Step S45, the electric current supplied to the pressure-decrease linear valve 92, 93 (Ib←Ib−Δb), so as to decrease the brake-cylinder pressure. When the brake-cylinder pressure is decreased down to around the pre-learning second reference pressure Ppre2, a positive judgment is made at Step S46, and the control goes to Step S47 to keep the current electric current Ib supplied to the linear valve 92, 93 (Ib←Ibpre=Ipre). Thus, the brake-cylinder pressure is kept to the second reference pressure Ppre2, and the clearances between the pads 22 and the rotor 23 are kept substantially zero.

In the present embodiment, the pre-learning first reference pressure Ppre1 is pre-selected at a high pressure near to the hydraulic pressure in the accumulator 64. Therefore, the pads 22 can be caused to approach reliably the rotor 23 against, e.g., frictional forces. In addition, when thereafter the brake-cylinder pressure is decreased down to the pre-learning second reference pressure Ppre2, the clearances between the pads 22 and the rotor 23 can be surely zeroed. Moreover, since the pre-learning second reference pressure Ppre2 is pre-selected at the lowest possible pressure that can substantially zero those clearances, a range of change of the brake-cylinder pressure when the operation-characteristic learning operation is carried out can be increased, i.e., widened.

However, the pre-learning first reference pressure Ppre1 may be a lower pressure than that employed in the present embodiment, so long as a pressing force corresponding to the pre-learning first reference pressure Ppre1 can cause the pads 22 to approach the rotor 23 against the frictional forces.

In addition, under the pre-learning control, it is not essentially needed to decrease the brake-cylinder pressure after increasing the same. That is, it is possible to increase the brake-cylinder pressure up to a pressure assuring that the clearances between the pads 22 and the rotor 23 are zeroed, and then hold the brake-cylinder pressure at that pressure. For example, it is possible to increase the brake-cylinder pressure up to a pressure when the first filling ends, or a pressure higher by a predetermined amount than the pressure when the first filling ends, so that the operation-characteristic learning operation is started at that pressure. In particular, in the case where each hydraulic brake 16 through 19 is of a sort including a return spring, e.g., a drum brake, it is desirable that the brake-cylinder pressure be not decreased after being increased.

Moreover, under the pre-learning control, it is not essentially needed to increase the brake-cylinder pressure up to a pressure assuring that the clearances between the pads 22 and the rotor 23 are zeroed. If the brake-cylinder pressure is increased up to such a pressure that reduces the clearances, then the operation characteristic of each linear valve 80 through 83, 90 through 93 can be obtained with higher accuracy.

In addition, when the pre-learning control ends, the electric current supplied to each pressure-decrease linear valve 92, 93 can be controlled such that the electric current is increased once, and then decreased down to such a current that can keep the hydraulic pressure at a pressure assuring that the clearances between the pads 22 and the rotor 23 are substantially zero.

Figure 11:
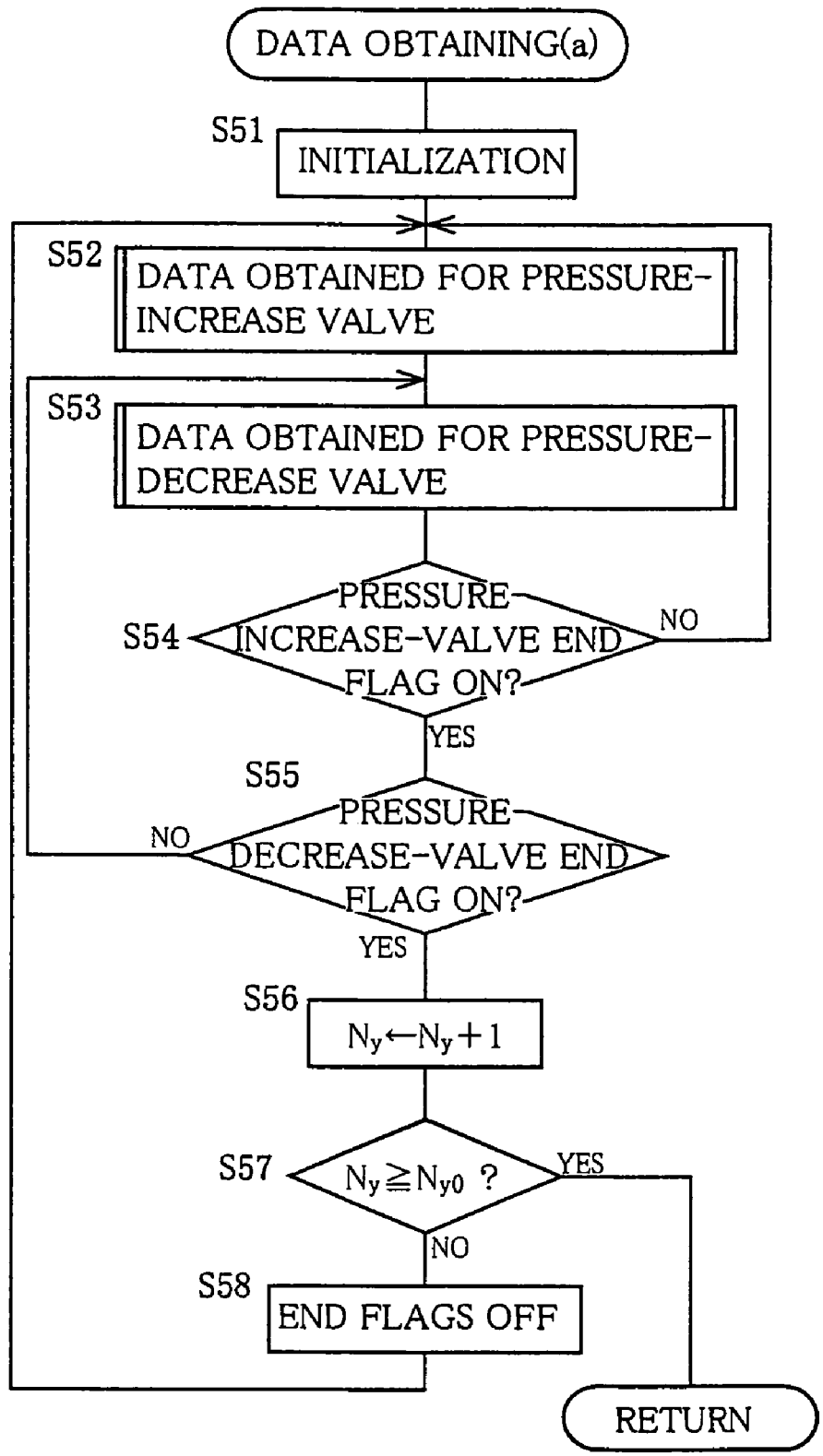
FIG. 11 is a flow chart representing another portion (i.e., a data obtaining operation at Step S23) of the operation-characteristic learning program.

The data obtaining operation at Step S23 is carried out according to a data obtaining routine (A) represented by a flow chart shown in FIG. 11.

First, at Step S51, the ECU 200 initializes all parameters, that is, reset flags, counters, etc. used to obtain sets of data, to respective initial values.

At Step S52, sets of data are obtained with respect to an arbitrary one of the pressure-increase linear valves 80 through 83; and at Step S53, sets of data are obtained with respect to an arbitrary one of the pressure-decrease linear valves 90 through 93. Then, at Step S54, the ECU 200 judges whether a pressure-increase-valve end flag is in an ON state thereof, and at Step S55, the ECU 200 judges whether a pressure-decrease-valve end flag is in an ON state thereof. If a negative judgment is made at Step S54, the control of the ECU 200 goes back to Step S52. If a positive judgment is made at Step S54 and a negative judgment is made at Step S55, the control goes back to Step S53.

The pressure-increase-valve end flag is set to its ON state, when the brake-cylinder pressure is increased up to a predetermined upper limit pressure with respect to each one of the "mounds" shown in FIG. 19; and the pressure-decrease-valve end flag is set to its ON state, when the brake-cylinder pressure is decreased down to a predetermined lower limit pressure with respect to the one mound. Therefore, a positive judgment made at Step S55 means that one mound shown in FIG. 19 is completed.

Then, the control of the ECU 200 goes to Step S56 to add one to a total number, Ny, counted by a counter, and subsequently to Step S57 to judge whether the counted total number Ny is equal to, or greater than, a reference number, Ny0. The counted total number Ny indicates the total number of the completed mound or mounds.

In the present embodiment, sets of data are obtained till the total number Ny of the completed mounds becomes equal to, or greater than, the reference number Ny0. If a negative judgment is made at Step S57, the control goes to Step S58 to reset the two end flags each to an OFF state thereof, and then goes back to Step S52 and the following steps. Steps S52 and S53 are repeated till the counted total number Ny becomes equal to, or greater than, the reference number Ny0.

Each of Step S52 and S53 is carried out in different manners corresponding to the two individual pressure control valve devices 70, 71 corresponding to the two front wheels, and the other, two individual pressure control valve devices 72, 73 corresponding to the two rear wheels. Thus, first, Steps S52 and S53 will be described with respect to the individual pressure control valve devices 70, 71, and then described with respect to the individual pressure control valve devices 72, 73.

First, there will be described a manner in which sets of data are obtained with respect to each of the pressure-increase linear valves 80, 81 and the pressure-decrease linear valves 90, 91 each of which is a normally closed valve.

Figure 12:
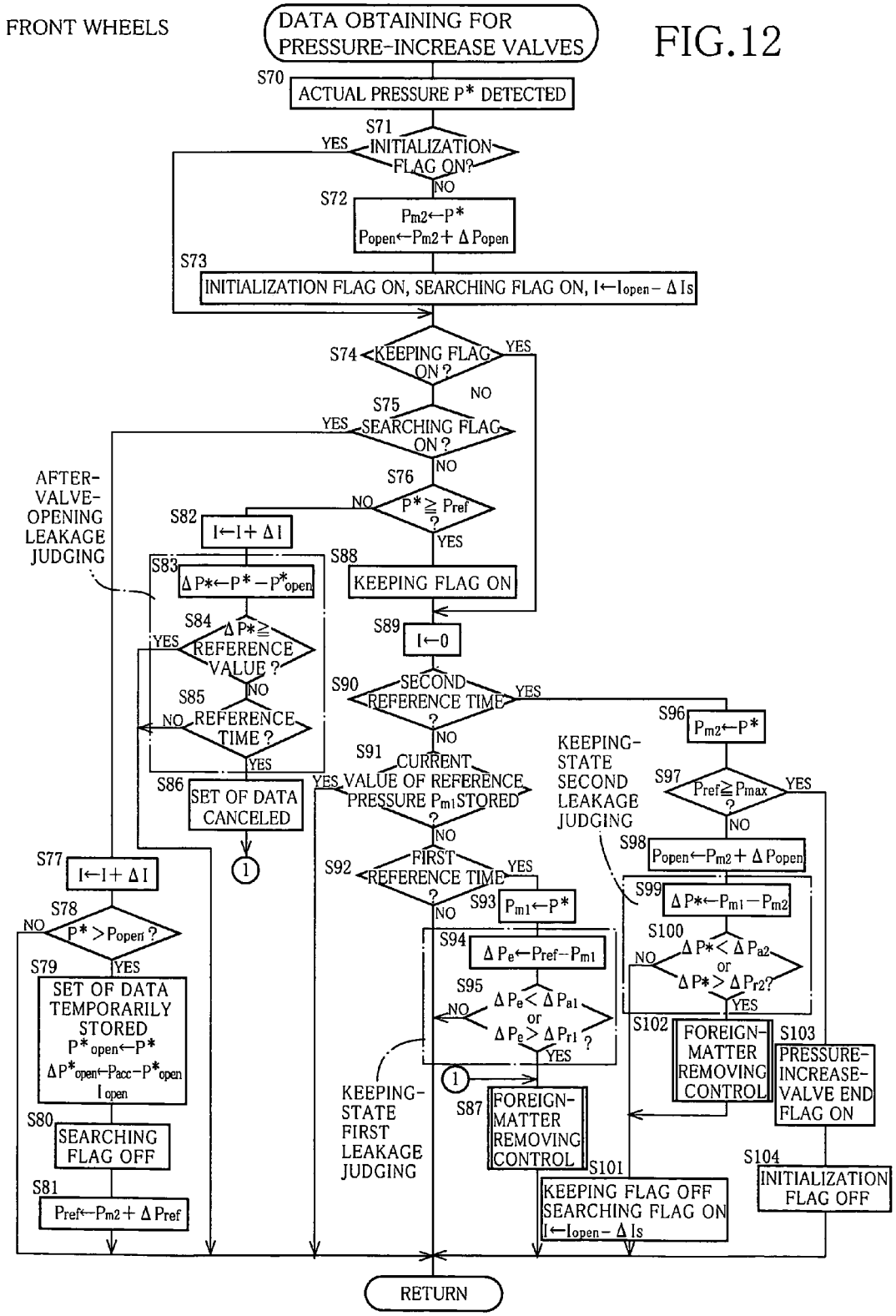
FIG. 12 is a flow chart representing another portion (i.e., Step S52) of the operation-characteristic learning program as applied to pressure-increase linear valves corresponding to front wheels of a vehicle.

In the case where an objective valve from which sets of data are to be obtained is an arbitrary one of the two pressure-increase linear valves 80, 81, the sets of data are obtained according to a flow chart shown in FIG. 12.

First, at Step S70, an actual hydraulic pressure P* in the corresponding brake cylinder 20 is detected. Then, at Step S71, the ECU 200 judges whether an initialization flag is in an ON state thereof. When Step S71 is initially implemented, the initialization flag is in an OFF state thereof, and accordingly a negative judgment is made at Step S71. Hence, the control of the ECU 200 goes to Step S72 to determine the detected actual pressure P* as a valve-opening judging reference pressure Pm2, and additionally determine a valve-opening judging threshold value $P_{open}$ as being equal to the valve-opening judging reference pressure Pm2 plus a valve-opening judging change amount $\Delta P_{open}$ (i.e., Pm2←P*, and $P_{open}$←Pm2+$\Delta P_{open}$). Then, at Step S73, the ECU 200 sets the initialization flag and an electric-current searching flag, each to an ON state thereof. In addition, the ECU 200 controls an electric current I supplied to the one linear valve 80, 81, to a current smaller by a set value ΔIs than a valve-opening current $I_{open}$ corresponding to a pressure difference across the one linear valve 80, 81 at that point of time (i.e., I←$I_{open}$−ΔIs).

Subsequently, at Step S74, the ECU 200 judges whether a keeping flag is in an ON state thereof. If a negative judgment is made at Step S74, the control goes to Step S75 to judges whether the searching flag is in its ON state. If a negative judgment is made at Step S75, the control goes to Step S76 to judge whether the actual pressure is equal to, or higher than, the target pressure Pref.

When Step S74 and the following steps are implemented for the first time, the keeping flag is in an OFF state thereof and the searching flag is in its ON state. Therefore, a positive judgment is made at Step S75, and accordingly the control goes to Step S77 to increase, as shown in FIG. 20, the electric current I supplied to the coil 100 of the pressure-increase linear valve 80, 81. As described above, the electric current I is increased at a constant slope. To this end, an increment amount ΔI is added to the electric current I determined at Step S73 (i.e., I←I+ΔI).

Then, at Step S78, the ECU 200 judges whether the actual pressure P* has exceeded the valve-opening judging threshold value $P_{open}$. While the actual pressure P* is equal to, or lower than, the threshold value $P_{open}$, i.e., as long as a negative judgment is made at Step S78, the control goes back to Step S70 and repeat Steps S71, S74, S75, S77, and S78. Thus, the electric current I supplied to the pressure-increase linear valve 80, 81 is slowly increased. Meanwhile, if a positive judgment is made at Step S78, the control goes to Step S79 to read a pressure difference across the linear valve 80, 81 and an electric current supplied to the same 80, 81, each at that time, and temporarily store a set of data including the read pressure difference and the read electric current in such a manner that the two sorts of data are associated with each other. The pressure difference is obtained by subtracting the hydraulic pressure (i.e., the actual pressure P*) detected by the brake-cylinder pressure sensor 216, from the hydraulic pressure (i.e., an accumulator pressure, Pacc) detected by the pressure-source pressure sensor 220. Then, at Step S80, the searching flag is reset to its OFF state and, at Step S81, the target pressure Pref is updated to a pressure obtained by adding a pre-selected change amount ΔPref to the valve-opening judging reference pressure Pm2 (i.e., Pref←Pm2+ΔPref). Thus, in the present embodiment, the target pressure Pref is stepwise changed.

Since the searching flag has been reset to its OFF state at Step S80, a negative judgment is made at Step S75 in the next control cycle. On the other hand, since the target pressure Pref has been updated at Step S82, the actual pressure P* is lower than the updated target pressure Pref. Therefore, a negative judgment is made at Step S76, and the control goes to Step S82 to increase the electric current I supplied to the linear valve 80, 81, at the same slope as the slope when the searching flag is in its ON state. Then, at Step S83, the ECU 200 calculates an amount of change, ΔP*, of the actual pressure P* after the linear valve 80, 81 is opened (i.e., ΔP*=P*−$P*_{open}$). At Steps S84 and S85, the ECU 200 judges whether the change amount ΔP* has reached or exceeded a reference amount ΔPs, within a reference time duration ΔTs after the linear valve 80, 81 is switched to its opened state. This is an after-valve-opening (i.e., valve-opened-state-related) leakage judging operation. As described above, if the linear valve 80, 81 has a leakage, a slope of changing of the hydraulic pressure in the brake cylinder 20 is decreased. Therefore, unless the change amount ΔP* reaches or exceeds the reference amount ΔPs within the reference time duration ΔTs, it can be judged that the linear valve 80, 81 has a leakage, and a positive judgment is made at Step S85. Hence, the control goes to Step S86 to delete or cancel the set of data temporarily stored at Step S79, and then goes to Step S87 to perform a foreign-matter removing control (i.e., a leakage solving or stopping control) that will be described later.

In the after-valve-opening leakage judging operation, the reference pressure change amount ΔPs may be equal to a difference of the actual pressure P* and the target pressure Pref, and the reference time duration ΔTs may be equal to a time needed for the actual pressure P* to reach the target pressure Pref when the electric current I is slowly increased at the constant slope, as described above.

However, the after-valve-opening leakage judging operation may be modified such that if a time needed for the actual pressure P* to change by more than a reference amount ΔPs is longer than a reference time duration, then it is judged that the linear valve 80, 81 has a leakage If the electric current I supplied to the pressure-increase linear valve 80, 81 is increased and accordingly the actual pressure P* reaches the target pressure Pref, a positive judgment is made at Step S76, and the control of the ECU 200 goes to Step S88 to set the keeping flag to its ON state, and then goes to Step S89 to control the electric current I supplied to the linear valve 80, 81, to zero.

Then, at Step S90, the ECU 200 judges whether a second reference time duration has elapsed after the electric current I is controlled to zero. If a negative judgment is made at Step S90, the control goes to Step S91 to judge whether a current value of the reference pressure Pm1 has been stored. If a negative judgment is made at Step S91, the control goes to Step S92 to judge whether a first reference time duration has elapsed after the electric current I is controlled to zero.

When Steps S90, S91, and S92 are implemented for the first time, a negative judgment is made at each of those steps.

Meanwhile, if a positive judgment is made at Step S92, the control goes to Step S93 to store a current value of the actual pressure P* as the current value of the reference pressure Pm1. Then, at Step S94, the ECU 200 calculates a pressure deviation, ΔPe, by subtracting the current value of the reference pressure Pm1 from the target pressure Pref (i.e., ΔPe=Pref−Pm1). Next, at Step S95, the ECU 200 judges whether the pressure deviation ΔPe is smaller than a pressure-increase-valve-related first leakage judging threshold value ΔPa1 (<0) (i.e., Pref−Pm1<ΔPa1, or Pm1−Pref>−ΔPa1), or whether the pressure deviation ΔPe is greater than a pressure-decrease-valve-related first leakage judging threshold value ΔPr1 (>0) (i.e., Pref−Pm1>ΔPr1). Steps S94 and S95 correspond to an electric-current-keeping-state-related first leakage judging operation.

Thus, at Step S94 and S95, the ECU 200 judges whether Pm1−Pref>−ΔPa1, and whether Pref−Pm1>ΔPr1, respectively. As shown in FIG. 21, if the pressure-increase linear valve 80, 81 has a large leakage, the actual pressure P* (i.e., Pm1) is higher, when the first leakage judging time elapses, than the target pressure Pref by more than an absolute value of the pressure-increase-valve-related first leakage judging threshold value ΔPa1; and if the pressure-decrease linear valve 90, 91 has a large leakage, the actual pressure P* (i.e., Pm1) is lower, when the first leakage judging time elapses, than the target pressure Pref by more than the pressure-decrease-valve-related first leakage judging threshold value ΔPr1. Thus, the electric-current-keeping-state-related first leakage judging operation can be called a large-leakage judging operation.

However, in place of the pressure deviation ΔPe of the actual pressure P* and the target pressure Pref from each other, it is possible to use, in the leakage judging operation, a pressure deviation of the actual pressure P* and the normal or standard pressure (indicated by the solid line in FIG. 21) from each other when the first reference time elapses under the condition that the linear valves 80, 90 (or 81, 91) are normal.

Since the current value of the reference pressure Pm1 has been stored at Step S93, a positive judgment is made at Step S91 in the next control cycle. In this state, Steps S70, S71, S74, S89, S90, and S91 are repeated, while the electric current I supplied to the linear valve 80, 81 is kept to zero.

Meanwhile, if the second reference time duration has elapsed, a positive judgment is made at Step S90, and the control goes to Step S96 to store the actual pressure P* at that time, as a valve-opening judging reference pressure Pm2. Then, at Step S97, the ECU 200 judges whether the target pressure Pref determined at Step S81 is equal to, or higher than, a maximum pressure $P_{max}$ (i.e., an upper limit pressure). The maximum pressure $P_{max}$ may be determined based on, e.g., the accumulator pressure Pacc. The maximum pressure $P_{max}$ may be a default value, or a value determined when Step S97 is implemented.

If a negative judgment is made at Step S97, the control goes to Step S98 to determine a valve-opening judging threshold value $P_{open}$ (i.e., $P_{open} \leftarrow Pm2 + \Delta P_{open}$). Then, at Steps S99 and S100, the ECU 200 carries out an electric-current-keeping-state-related second leakage judging operation. That is, if the actual pressure P* is higher than the reference pressure Pm1 by more than an absolute value of a pressure-increase-valve-related second leakage judging threshold value $\Delta Pa2$ (<0), the ECU 200 judges that the pressure-increase linear valve 80, 81 has a leakage; and if the actual pressure P* is lower than the reference pressure Pm1 by more than a pressure-decrease-valve-related second leakage judging threshold value $\Delta Pr2$, the ECU 200 judges that the pressure-decrease linear valve 90, 91 has a leakage.

More specifically described, if a value $\Delta P^*$ obtained by subtracting, from the actual pressure P*, the reference pressure Pm1 is greater than the absolute value of the pressure-increase-valve-related second leakage judging threshold value $\Delta Pa2$ (<0) (i.e., $P^*-Pm1>-\Delta Pa2$, or $Pm1-P^*<\Delta Pa2$), the ECU 200 judges that the pressure-increase linear valve 80, 81 has a leakage; and if a value $\Delta P^*$ obtained by subtracting the actual pressure P* from the reference pressure Pm1 is greater than the pressure-decrease-valve-related second leakage judging threshold value $\Delta Pr2$ (i.e., $Pm1-P^*>\Delta Pr2$), the ECU 200 judges that the pressure-decrease linear valve 90, 91 has a leakage.

Thus, in the present embodiment, in the state in which the electric current supplied to the pressure-increase linear valve 80, 81 is kept to zero, whether the linear valve 80, 81 has a leakage is judged twice, i.e., at the first time when the first reference time duration (i.e., the first leakage judging time duration) has elapsed and at the second time when the second reference time duration has elapsed (i.e., when the first leakage judging time duration and then the second judging time duration have elapsed). A large leakage can be detected in the electric-current-keeping-state-related first leakage judging operation; and even a small leakage can be detected in the electric-current-keeping-state-related second leakage judging operation. In other words, the first leakage judging time duration, the pressure-increase-valve-related first leakage judging threshold value $\Delta Pa1$, and the pressure-decrease-valve-related first leakage judging threshold value $\Delta Pr1$ are so pre-selected as to be able to detect the large leakage when the first leakage judging time duration elapses; and the second leakage judging time duration, the pressure-increase-valve-related second leakage judging threshold value $\Delta Pa2$, and the pressure-decrease-valve-related second leakage judging threshold value $\Delta Pr2$ are so pre-selected as to be able to detect the small leakage (even though it may not be detected in the electric-current-keeping-state-related first leakage judging operation) when the second leakage judging time duration elapses.

If a negative judgment is made at Step S100, the control goes to Step S101 to reset the keeping flag to its OFF state and set the searching flag to its ON state. In addition, the ECU 200 determines a valve opening current $I_{open}$ based on a pressure difference across the linear valve 80, 81 at a current time, according to the operation characteristic of the linear valve 80, 81, and supplies, to the linear valve 80, 81, an electric current I smaller than the determined valve opening current $I_{open}$ by a pre-selected amount (i.e., $I \leftarrow I_{open} - \Delta Is$).

Thus, when Step S52 is implemented in the next control cycle, a positive judgment is made at Step S75, and the control goes to Step S77 and the following steps. Thus, the electric current supplied to the linear valve 80, 81 is slowly increased, and another set of data is obtained as described above.

On the other hand, if a positive judgment is made at Step S100, the control goes to Step S102 to perform the foreign-matter removing control, and then goes to Step S101 to reset the keeping flag to its OFF state and set the searching flag to its ON state.

Thereafter, as the electric current supplied to the pressure-increase linear valve 80, 81 is controlled as described above, the hydraulic pressure in the brake cylinder 20 is stepwise increased.

When the target pressure reaches or exceeds the maximum pressure $P_{max}$, a positive judgment is made at Step S97, and the control goes to Step S103 to set the pressure-increase-valve end flag to its ON state, and then to Step S104 to reset the initialization flag to its OFF state. Thus, in FIG. 19, an increasing portion of the first "mound" ends, and one or more sets of data corresponding to the pressure-increase linear valve 80, 81 are obtained.

However, at Step S52, it is not essentially needed to carry out all of the after-valve-opening (or valve-opened-state-related) leakage judging operation and the electric-current-keeping-state-related first and second leakage judging operations. That is, at Step S52, it is essentially needed to carry out at least one of the three leakage judging operations. In addition, it is not essentially needed to perform the foreign-matter removing control (i.e., the leakage solving or stopping control) each time a leakage is detected. For example, the leakage stopping control may be performed after the electric-current-keeping-state-related first leakage judging operation, while it is not performed after the electric-current-keeping-state-related second leakage judging operation, or vice versa.

In addition, if a leakage is detected when the electric-current searching state ends, then the valve-opening judging threshold value $P_{open}$ may be increased. Moreover, if a leakage is detected in the electric-current keeping state, then the valve-opening judging threshold value $P_{open}$ may be increased without performing the leakage stopping control.

Figure 13:
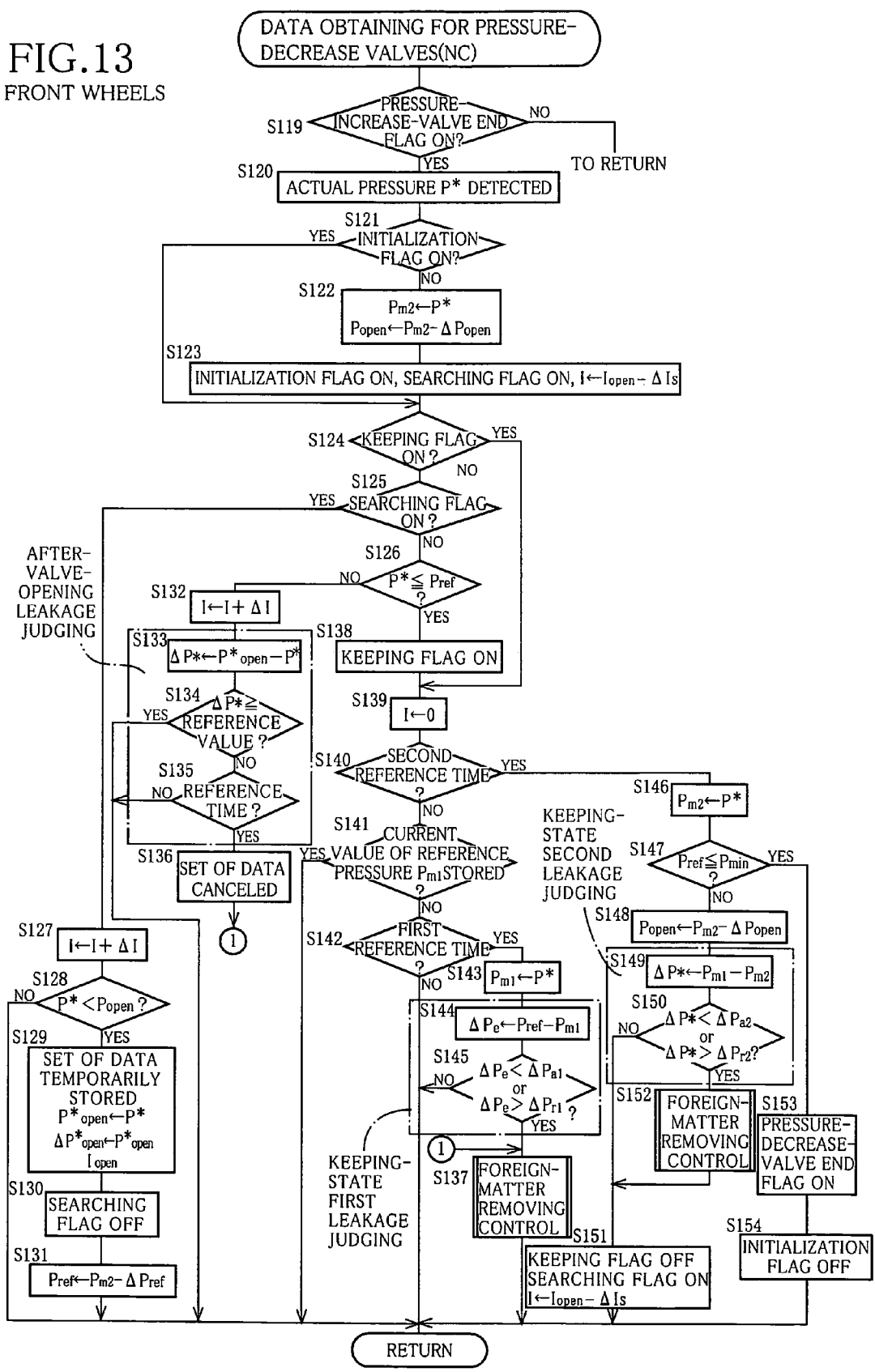
FIG. 13 is a flow chart representing another portion (i.e., Step S53) of the operation-characteristic learning program as applied to pressure-decrease linear valves corresponding to the front wheels.

Next, in the case where an objective valve from which sets of data are to be obtained at Step S53 is an arbitrary one of the two pressure-decrease linear valves 90, 91, the sets of data are obtained according to a flow chart shown in FIG. 13.

First, at Step S119, the ECU 200 judges whether the pressure-increase-valve end flag is in its ON state. If a negative judgment is made at Step S119, the ECU 200 does not implement Step S120 or the following steps.

On the other hand, if a positive judgment is made at Step S119, the control goes to Step S200 to detect an actual hydraulic pressure P* in the brake cylinder 20, and then goes to Steps S121, S122, and S123 to carry out an initialization operation. Since the objective valve is one of the pressure-decrease linear valves 90, 91, the ECU 200 determines, at Step S122, a valve-opening judging threshold value $P_{open}$ by subtracting, from the detected actual pressure P* (i.e., the valve-opening judging reference pressure Pm2), a valve-opening judging change amount $\Delta P_{open}$ (i.e., $P_{open} \leftarrow Pm2 - \Delta P_{open}$).

Occasionally, if the keeping flag is in its OFF state and the searching flag is in its ON state, a negative judgment is made at Step S124 and a positive judgment is made at Step S125, so that the control goes to Step S127 to increase slowly the electric current I supplied to the linear valve 90, 91. When the actual pressure P* is decreased down to below the valve-opening judging threshold value $P_{open}$, that is, if a positive judgment is made at Step S128, the control goes to Step S129 to store temporarily a set of data, then to Step S130 to reset the searching flag to its OFF state, and then to Step S131 to determine a target pressure Pref. Since a pressure difference $\Delta P^*_{open}$ across the pressure-decrease linear valves 90, 91 is equal to the actual pressure $P^*_{open}$, the actual pressure $P^*_{open}$ and the electric current $I_{open}$ supplied to the linear valve 90, 91 at that time are stored as the set of data at Step S129. In addition, the target pressure Pref is determined as being smaller than the valve-opening judging reference pressure Pm2 by a pre-set change amount $\Delta$Pref (i.e., Pref=Pm2−$\Delta$Pref).

At Step S126, the ECU 200 judges whether the actual pressure P* is equal to, or lower than, the target pressure Pref. If a negative judgment is made at Step S126, the control goes to Step S132 to increase the electric current I at a constant slope $\Delta I$. Then, at Steps S133, S134, and S135, the ECU 200 carries out an after-valve-opening (i.e., valve-opened-state-related) leakage judging operation. If an amount $\Delta P^*$ of decreasing (determined at Step S133) of the current actual pressure P* from the actual pressure $P^*_{open}$ at the time of opening of the linear valve 90, 91 does not reach or exceed a reference amount $\Delta$Ps within a reference time duration $\Delta$Ts, that is, if a negative judgment is made at Step S134 and a positive judgment is made at Step S135, the control goes to Step S136 to cancel the set of data temporarily stored at Step S129, and then to Step S137 to perform the foreign-matter removing control.

If the electric current I supplied to the pressure-decrease linear valves 90, 91 is increased at Step S132 and the actual pressure P* is decreased down to below the target pressure Pref, a positive judgment is made at Step S126, and the control goes to Step S138 to set the keeping flag to its ON state, and then to Step S139 to zero the electric current I supplied to the linear valves 90, 91. Then, like in the case of the pressure-increase linear valves 80, 81, an electric-current-keeping-state-related first leakage judging operation is carried out at Steps S144 and S145; and an electric-current-keeping-state-related second leakage judging operation is carried out at Steps S149 and S150. Steps S140, S141, S142, S143, and S146 are similar to Steps S90, S91, S92, S93, and S96, respectively. At Step S97, the ECU 200 judges whether the target pressure Pref determined at Step S131 is equal to, or lower than, a minimum pressure $P_{min}$; and at Step S98, the ECU 200 determines a valve-opening judging threshold value $P_{open}$ (i.e., $P_{open}$←Pm2−$\Delta P_{open}$).

If a leakage is detected at Step S52 (i.e., Steps S94 and S95, or Steps S99 and S100), then the foreign-matter removing control is performed at Step S87 or S102. In this case, therefore, a probability that a leakage is detected again at Steps S144 and S145, or Steps S149 and S150 is considerably low.

Thus, Steps S133 through S135, Steps S144 and S145, and/or Steps S149 and S150 are not essentially needed. In other words, if whether there is a leakage is judged with respect to an arbitrary one of the pressure-increase linear valve 80, 81 (82, 83) and the pressure-decrease linear valve 90, 91 (92, 93) of each individual hydraulic-pressure control valve device 70, 71 (72, 73), when a set of data is obtained from the one linear valve, then it is not essentially needed to judge whether there is a leakage with respect to the other of the pressure-increase linear valve 80, 81 (82, 83) and the pressure-decrease linear valve 90, 91 (92, 93), when a set of data is obtained from the other linear valve, because, when the set of data is obtained from the one linear valve, whether there is a leakage is judged with respect to not only the one linear valve but also the other linear valve.

Meanwhile, if a positive judgment is made at Step S147, the control goes to Step S153 to set the pressure-decrease-valve end flag to its ON state. Steps S137, S151, S152, S154 are similar to Steps S87, S101, S102, and S104, respectively. Thus, a decreasing portion of the first "mound" shown in FIG. 19 ends. The minimum pressure $P_{min}$ may be equal to (a) an atmospheric pressure, (b) a brake-cylinder pressure when the first filling ends, or (c) a pressure higher than the pressure (a) or (b) by a pre-set amount.

Thereafter, a plurality of sets of data are repeatedly obtained from each one of the pressure-increase linear valve 80, 81 and the pressure-decrease linear valve 90, 91, till the total number Ny of the mounds reaches the pre-set number Ny0, i.e., a positive judgment is made at Step S57. Then, the control goes to Step S24 to judge whether the sets of data obtained at Step S23 are appropriate.

Next, there will be described a manner in which sets of data are obtained with respect to each of the two individual hydraulic-pressure control valve devices 72, 73 corresponding to the two rear wheels, i.e., the pressure-increase linear valves 82, 83 each of which is a normally closed valve, and the pressure-decrease linear valves 92, 93 each of which is a normally opened valve.

Figure 14:
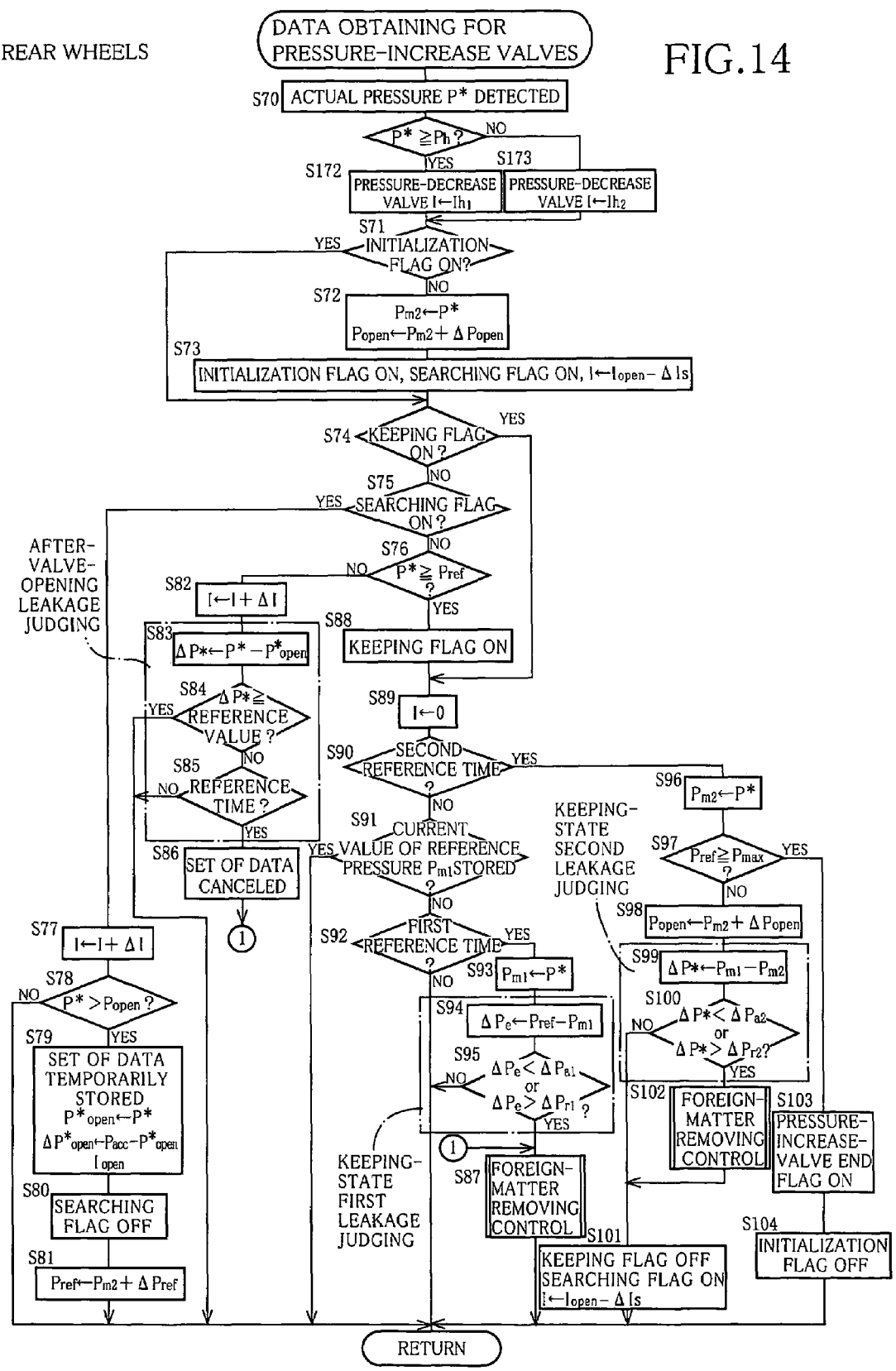
FIG. 14 is a flow chart corresponding to FIG. 12, and representing Step S52 of the operation-characteristic learning program as applied to pressure-increase linear valves corresponding to rear wheels of the vehicle.

In the case where an objective valve from which sets of data are to be obtained at Step S52 is an arbitrary one of the two pressure-increase linear valves 82, 83, the sets of data are obtained according to a flow chart shown in FIG. 14. Steps S70 through S104 of FIG. 14 are similar to Steps S70 through S104 of FIG. 12, and accordingly those steps are not described any more. At Step S171, the ECU 200 judges whether the actual pressure P* is equal to, or higher than, a pre-set pressure, Ph. If a positive judgment is made at Step S171, the control goes to Step S172 to supply a greater electric current, I=Ih$_1$, to the coil 102 of the pressure-decrease linear valve 92, 93; and if a negative judgment is made at Step S171, the control goes to Step S173 to supply a smaller electric current, I=Ih$_2$ (<Ih$_1$), to the coil 102 of the linear valve 92, 93. Since each of the pressure-decrease linear valves 92, 93 is a normally opened valve, the greater electric current Ih$_1$ is needed to keep the linear valve 92, 93 to its closed state, when the pressure difference across the each linear valve 92, 93 is increased as the hydraulic pressure in the corresponding brake cylinder 20 is increased under the control of the corresponding pressure-increase linear valve 82, 83.

In the present embodiment, the electric current I supplied to each one of the pressure-decrease linear valves 92, 93 is changed in the two steps, i.e., the greater and smaller currents Ih$_1$, Ih$_2$. However, the electric current I may be changed in three or more steps, or may be continuously changed corresponding to the actual pressure P*, i.e., the pressure difference across the one linear valve 92, 93. In each case, an amount of consumption of electric power can be reduced as compared with the case where the electric current I is kept to a current corresponding to the highest brake-cylinder pressure that can be taken by the corresponding brake cylinder 20.

Figure 15:
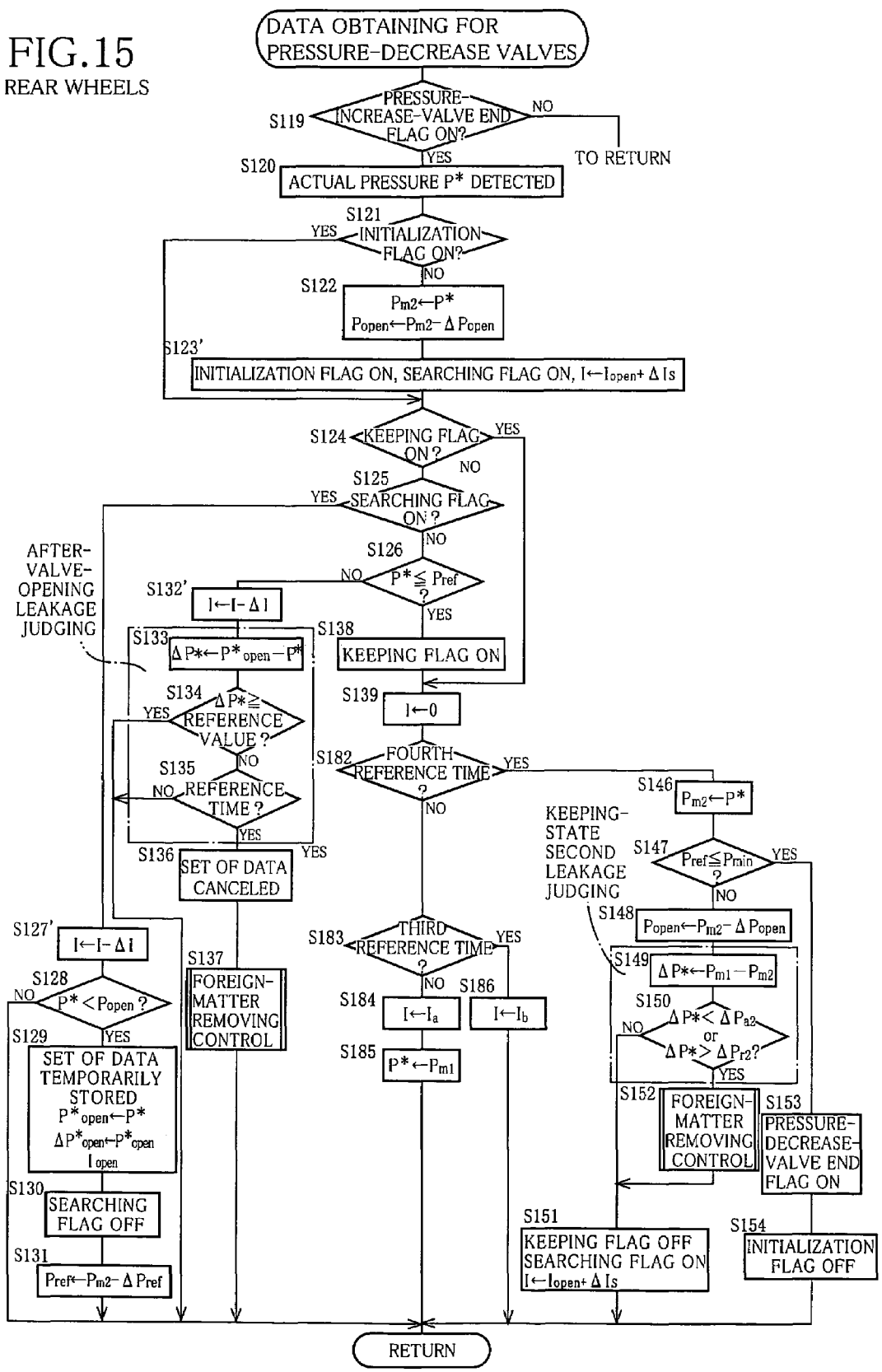
FIG. 15 is a flow chart corresponding to FIG. 13, and representing Step S53 of the operation-characteristic learning program as applied to pressure-decrease linear valves corresponding to the rear wheels.

In the case where an objective valve from which sets of data are to be obtained at Step S53 is an arbitrary one of the two pressure-decrease linear valves 92, 93, the sets of data are obtained according to a flow chart shown in FIG. 15. Almost all steps of FIG. 15 are similar to the corresponding steps of FIG. 13, and accordingly those steps are not described any more. However, since each one of the two pressure-decrease linear valves 92, 93 is a normally opened valve and differs from the normally closed, pressure-decrease linear valves 90, 91, the flow chart of FIG. 15 includes some different steps than those of the flow chart of FIG. 13, and those different steps will be described below. In short, Steps S123, S127, and S132 of FIG. 13 are modified into Steps S123', S127', and S132', respectively; Steps S139 through S145 of FIG. 13 are omitted; and Steps S182 through S185 are newly added.

At Step S123', the ECU 200 supplies, to the pressure-decrease linear valve 92, 93, an electric current I greater by a pre-set amount $\Delta$Is than a valve opening current $I_{open}$ corresponding to the pressure difference at a current time (i.e., I←$I_{open}$+$\Delta$Is).

In addition, if, in the electric-current searching state, the actual pressure P* is higher than the target pressure Pref, the electric current I supplied to the coil 102 of the pressure-decrease linear valve 92, 93 is slowly decreased at Step S127' or S132'. When the actual pressure P* is decreased down to below the valve-opening judging threshold value $P_{open}$, the ECU 200 judged that the linear valve 92, 93 has been switched to its opened state.

Moreover, when the keeping flag is in its ON state, the electric current I supplied to the coil 102 of the pressure-decrease linear valve 92, 93 is increased to inhibit the working liquid from flowing from the brake cylinder 20 to the reservoir 72. More specifically described, before the third reference time duration elapses after the keeping flag is set to its ON state at Step S138, that is, if a negative judgment is made at each of Steps S182 and S183, the control goes to Step S184 to supply a greater electric current, I=Ia, to the coil 102 so as to press, with a greater pressing force, the valve member 114 against the valve seat 115. Meanwhile, after the third reference time duration elapses, that is, if a positive judgment is made at Step S183, the control goes to Step S186 to supply a smaller electric current, I=Ib (<Ia), to the coil 102 so as to apply a smaller pressing force to the valve member 114. In the state in which the valve member 114 is pressed with the smaller pressing force, a leakage of the working liquid is more easily detected. A reference pressure Pm1 is obtained at Step S185 following Step S184.

In the present embodiment, within the third reference time duration, a maximum electric current (i.e., Ia=$I_{max}$) is supplied to the coil 102; and after the third reference time duration, an electric current greater than the valve opening current $I_{open}$ by a pre-set amount, $\Delta$Id, is supplied to the coil 102 (i.e., Ib=$I_{open}$+$\Delta$Id). It is preferred that the pre-set amount $\Delta$Id be not greater than 0.2×$I_{max}$, 0.15×$I_{max}$, 0.1×$I_{max}$, 0.07×$I_{max}$, 0.05×$I_{max}$, or 0.02×$I_{max}$.

As shown in FIG. 25, in the third reference time duration, the valve member 114 is strongly pressed against the valve seat 115, so that a foreign matter that may be present between the valve member 114 and the valve seat 115 can be cut off. In addition, since thereafter the electric current is decreased to apply the smaller pressing force to the valve member 114, a leakage can be more easily detected. Moreover, since a valve-opening electric current $I_{open}$ is searched by decreasing the electric current I from not the current Ia but the current Ib smaller than the current Ia, the valve-opening electric current $I_{open}$ can be searched or found in a shorter time.

In each case, the electric current Ib that is supplied after the third reference time duration elapses can be selected at a current assuring that a leakage can be detected and switching of the pressure-decrease linear valve 92, 93 to its opened state can be detected at an early timing.

Figure 16:
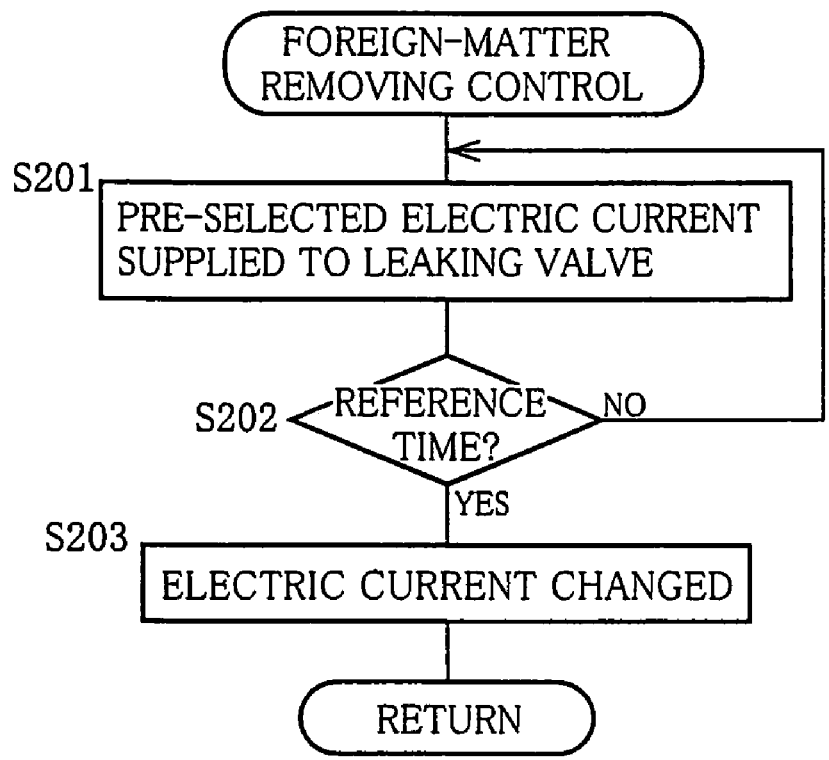
FIG. 16 is a flow chart representing another portion (i.e., a foreign-matter removing control at each of Steps S87, S102, S137, and S152) of the operation-characteristic learning program.

Next, the leakage solving or stopping control (i.e., the foreign-matter removing control) performed at each of Steps S87, S102, S137, and S152 will be described by reference to a flow chart shown in FIG. 16. First, at Step S201, a pre-selected electric current is supplied to an objective valve that has been judged as having a leakage of the working liquid. If the objective valve is a normally closed valve, the maximum electric current is supplied to the valve; and if the objective valve is a normally opened valve, no electric current is supplied to the valve. That is, the electric current supplied to the objective valve is controlled so that the valve is fully opened. At Step S202, the ECU 200 judges whether a reference time duration has elapsed. If a positive judgment is made at Step S202, the control goes to Step S203 to change the electric current I to an appropriate electric current. Thus, the linear valve that has been judged as having the leakage is kept, for the reference time duration, to the state in which the linear valve is fully opened, and accordingly the working liquid flows at a high rate through the linear valve. Consequently the foreign matter can be reliably removed, and the posture or position of the valve member relative to the valve seat can be corrected. The above-indicated appropriate electric current may be equal to one of (a) the electric current when the leakage stopping control is started, (b) an electric current that can keep the brake-cylinder pressure to a pressure smaller than the target pressure, and (c) an electric current that can keep the brake-cylinder pressure to a pre-set pressure.

In the leakage stopping control, it is possible to control concurrently the respective electric currents supplied to the pressure-increase and pressure-decrease linear valves corresponding to each one of the four brake cylinders 20.

More specifically described, in the case where the leakage stopping control is performed for each one of the pressure-increase linear valves 80 through 83, the brake-cylinder pressure is increased because the one linear valve is fully opened; and in the case where the leakage stopping control is performed for each one of the pressure-decrease linear valves 90 through 93, the brake-cylinder pressure is decreased because the one linear valve is fully opened. Therefore, when the leakage stopping control is performed on one of the pressure-increase and pressure-decrease linear valves, the electric current supplied to the other linear valve is so controlled as not to change the brake-cylinder pressure.

In addition, there are some cases where when a foreign matter is removed in each of the pressure-increase linear valves 80 through 83, the working liquid can flow at a higher rate when the corresponding pressure-decrease linear valve 90 through 93 is in its opened state than when the pressure-decrease linear valve is in its closed state. Likewise, there are some cases where when a foreign matter is removed in each of the pressure-decrease linear valves, the working liquid can flow at a higher rate when the corresponding pressure-increase linear valve is in its opened state than when the pressure-increase linear valve is in its closed state.

Figure 17:
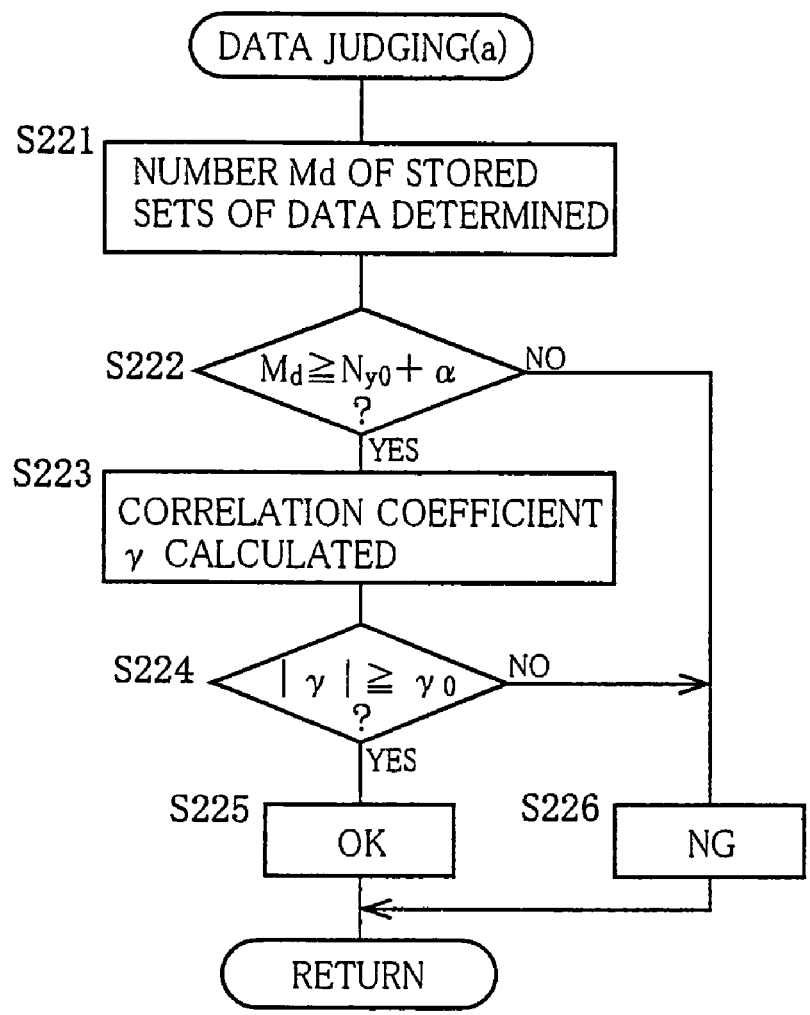
FIG. 17 is a flow chart representing another portion (i.e., a data judging operation (A) at Step S24) of the operation-characteristic learning program.

The data judging operation (A) at Step S24 of FIG. 9 is carried out according to a flow chart shown in FIG. 17. This operation or routine is implemented for each one of the linear valves 80 through 83, 90 through 93, independent of the other linear valves. First, at S221, the ECU 200 obtains or determines a total number, Md, of the sets of data stored by the storing portion 204 (the canceled set or sets of data is or are not counted). Then, at Step S222, the ECU 200 judges whether the total number Md of the sets of data is equal to, or greater than, a number obtained by adding a pre-selected natural number, $\alpha$, to the pre-set number Ny0 of the mounds (i.e., Md≧Ny0+$\alpha$). If the data-set number Md is equal to the mound number Ny0, it is possible that those sets of data be identical with each other (i.e., the respective pressure differences be equal to each other and the respective electric currents be equal to each other). This possibility is avoided by adding the natural number $\alpha$. For example, in the case where the natural number $\alpha$ is pre-selected at one (i.e., $\alpha$=1), at least two sets of data are obtained. Regarding the example shown in FIG. 19, the mound number Ny0 is equal to 3. However, the mound number Ny0 may be a different number.

If a positive judgment is made at Step S222, the control goes to Step S223 to calculate a correlation coefficient, γ, of the sets of data, and then to Step S224 to judge whether an absolute value of the calculated correlation coefficient γ is equal to, or greater than, a reference value, γ0. In the case of a normally opened valve, the correlation coefficient γ is positive; and in the case of a normally closed valve, the correlation coefficient γ is negative. It is desirable that an operation characteristic of each linear valve 80 through 83, 90 through 93 be determined based on sets of data an absolute value of a correlation coefficient γ of which is sufficiently great, that is, a degree of correlation of which is high.

The correlation coefficient γ of the sets of data is obtained according to the following expression:

$$\gamma = \{(\Sigma X(i) \cdot Y(i))/Md\} / \{\sqrt{(\Sigma X(i)^2)} \cdot \sqrt{(\Sigma Y(i)^2)}\}$$

$$X(i) = \Delta P^*_{open}(i) - <\Delta P^*_{open}>$$

$$<\Delta P^*_{open}> = (\Sigma \Delta P^*_{open}(i))/Md$$

$$Y(i) = I_{open}(i) - <I_{open}>$$

$$<I_{open}> = (\Sigma \Delta I_{open}(i))/Md$$

where Md: total number of the sets of data;
$\Delta P^*_{open}(i)$: individual pressure difference across linear valve;
$I_{open}(i)$: individual valve opening current;
$<\Delta P^*_{open}>$: average pressure difference across linear valve;
$<I_{open}>$: average valve opening current.

If a positive judgment is made at Step S224, the control goes to Step S225 to judge that the obtained sets of data are appropriate ("OK"). On the other hand, if a negative judgment is made at Step S224, the control goes to Step S226 to judge that the obtained sets of data are not appropriate ("N G").

Step S225 is followed by Step S26 to determine an operation characteristic of the linear valve. For example, the ECU 200 determines, based on the sets of data, a straight line, i.e., a slope, K, and an intercept, $I_{offset}$, of the straight line representing the operation characteristic.

For example, the slope K and the intercept $I_{offset}$ can be calculated according to the following expressions:

$$K = [\Sigma(\Delta P^*_{open}(i) \cdot I_{open}(i)) - \{(\Sigma \Delta P^*_{open}(i) \cdot \Sigma I_{open}(i))/Md\}]/\{\Sigma \Delta P^*_{open}(i)^2 - (\Sigma \Delta P^*_{open}(i))^2/Md\}$$

$$I_{offset} = \{\Sigma I_{open}(i) + K \cdot (-\Sigma \Delta P^*_{open}(i))\}/Md$$

If the sets of data are judged as being not appropriate, i.e., if a negative judgment is made at Step S25, the control goes to Step S27 of FIG. 9 to carry out another data obtaining operation (B). This data obtaining operation is identical with the data obtaining operation (A), carried out at Step S23, wherein the pre-selected total number Ny0 of the mounds, used at Step S57 of FIG. 11, is equal to one (i.e., Ny0=1). Therefore, if the pressure-increase-valve end flag and the pressure-decrease-valve end flag are each set to the ON state at Steps S54 and S55, respectively, and the number Ny counted by the counter becomes equal to one at Step S56, then a positive judgment is made at Step S57.

Figure 18:
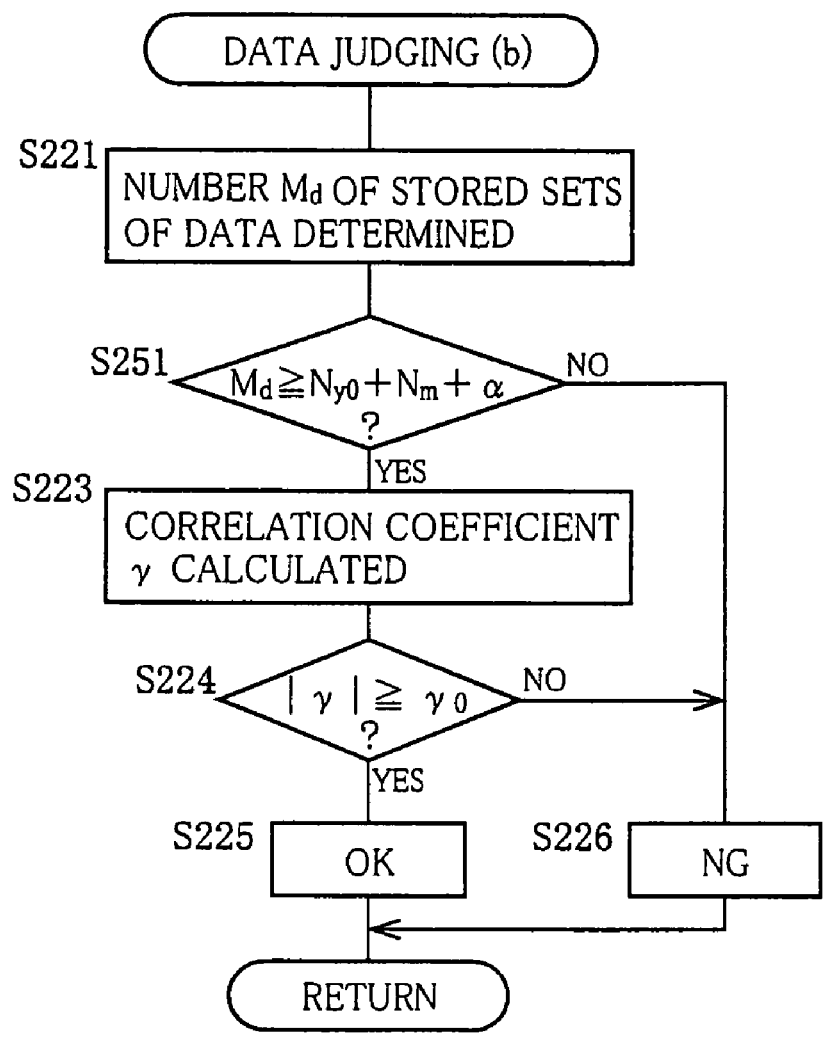
FIG. 18 is a flow chart representing another portion (i.e., a data judging operation (B) at Step S28) of the operation-characteristic learning program.

At Step S28 of FIG. 9, the ECU 200 carries out another data judging operation (B), according to a flow chart shown in FIG. 18. At Step S221, the ECU 200 determines a total number Md of the sets of data, by adding a number of the sets of data obtained at Step S27, to the number of the sets of data obtained at Step S23. Meanwhile, a total number of the mounds is determined by adding a number, Nm, of the mounds produced at Step S27, to the number Ny0 of the mounts produced at Step S23. Therefore, at Step S251, the ECU 200 judges whether the total number Md of the obtained sets of data is equal to, or greater than, a number (Ny0+Nm+α) obtained by adding the natural number α to the total number (Ny0+Nm) of the mounds. If Step S27 is implemented once, then the number Nm is equal to one (Nm=1); and if Step S27 is implemented certain times, then the number Nm is equal to a number of those times. At Step S223, the ECU 200 calculates a correlation coefficient γ of the obtained sets of data (in many cases, the total number Md is increased). The following steps, i.e., S224, S225, and S226 are carried out in the same manner as described above.

In the present embodiment, first, sets of data are obtained till a number of mounds is increased up to the pre-set number Ny0. However, if the obtained sets of data are judged as being not appropriate, then the brake-cylinder pressure is increased and then decreased, once more, that is, the total number of the mounds is increased by one, and the total number of the obtained sets of data is increased, so that whether the increased number of the sets of data are appropriate is judged. If it is judged again that the increased number of the sets of data are not appropriate, then another mound is produced and the following steps are implemented as described above. That is, if the obtained sets of data are judged as being not appropriate, then the brake-cylinder pressure is increased and then decreased, once more, so as to increase the total number of the sets of data and, each time the increasing and decreasing of the brake-cylinder pressure are carried out one time, that is, each time the total number of the mounds is increased by one, whether the sets of data are appropriate is judged. Thus, a more accurate operation characteristic of the linear valve can be determined based on the least number of sets of data.

Thus, in the present embodiment, each time a set of data is obtained and temporarily stored, one or more leakage judging operations are carried out and, if a leakage is judged or detected, the temporarily stored set of data is cancelled. Therefore, as shown in FIG. 1, an accurate operation characteristic of each linear valve 80 through 83, 90 through 93 that is near to a true operation characteristic can be obtained, and accordingly the each linear valve can be controlled with improved accuracy based on the accurate operation characteristic thereof.

In addition, if a leakage is detected before a set of data is obtained, a leakage stopping control is performed. Thus, it is possible to avoid obtaining one or more useless sets of data and thereby shorten a time duration needed to obtain appropriate sets of data that can be used to determine an operation characteristic of each linear valve 80 through 83, 90 through 93. Moreover, if a leakage is detected when a set of data is obtained, that is, if an erroneous set of data is obtained, then the erroneous set of data is canceled. Thus, it is possible to avoid determining an erroneous operation characteristic of each linear valve based on inappropriate sets of data including the erroneous set of data.

In addition, before a set of data is obtained from each linear valve 80 through 83, 90 through 93, the hydraulic pressure in the corresponding brake cylinder 20 is increased up to a reference pressure, so as to reduce the clearances present between the pads 22 and the rotor 23. Thus, when a first set of data is obtained from the each linear valve as the brake-cylinder pressure is increased, it is possible to avoid judging erroneously that the each linear valve has a leakage of the working liquid. In other words, the first set of data can be obtained with accuracy. This feature is advantageous, in particular, when the worn pads 22 are replaced with new ones.

Moreover, a correlation coefficient γ of the obtained sets of data is determined and, if an absolute value of the correlation coefficient γ is greater than a reference value, it is judged that the sets of data are appropriate, and an operation characteristic of each linear valve 80 through 83, 90 through 93 is determined based on the appropriate sets of data. Therefore, the thus determined operation characteristic is near to a true operation characteristic of the each linear valve.

As is apparent from the foregoing description of the present embodiment, a portion of the storing portion 204 of the brake ECU 200 that stores the operation-characteristic learning program represented by the flow chart of FIG. 9, and a portion of the ECU 200 that implements the learning program cooperate with each other to constitute an operation-characteristic obtaining portion or apparatus; and portions of the ECU 200 that store and implement the electric-current control program represented by the flow chart of FIG. 8 constitute an electric-current control device.

In addition, portions of the ECU 200 that store and implement Steps S83 through S85 (Steps S133 through S135), Steps S94 and S95 (Steps S144 and S145), and Steps S99 and S100 (Steps S149 and S150) constitute a leakage detecting portion of the operation-characteristic obtaining apparatus. Portions of the ECU 200 that store and implement Steps S83 through S85 (Steps S133 through S135) constitute a valve-opened-state-related leakage detecting portion of the leakage detecting portion; portions of the ECU 200 that store and implement Steps S94 and S95 (Steps S144 and S145) and Steps S99 and S100 (Steps S149 and S150) constitute an electric-current-keeping-state-related leakage detecting portion of the leakage detecting portion; and portions of the ECU 200 that store and implement Step S186 of FIG. 15 and Steps S149 and S150 constitute a decreased-pressing-force-related leakage detecting portion of the leakage detecting portion.

Moreover, portions of the ECU 200 that store and implement Step S79 (Step S129) of FIGS. 12 through 15 constitute a data-set obtaining portion; portions of the ECU 200 that store and implement Step S86 (Step S136) and Step S26 of FIG. 9 constitute a leakage-free-data-using operation-characteristic obtaining portion; and portions of the ECU 200 that store and implement Step S87 (Step S137) of FIGS. 12 through 15 constitute an opening-degree increasing portion.

In addition, portions of the ECU 200 that store and implement Step S22 of FIG. 9 constitute a clearance reducing portion; and portions of the ECU 200 that store and implement Steps S24, S26, and S28 constitute a correlation-coefficient-dependent operation-characteristic obtaining portion.

In the illustrated embodiment, the operation characteristic of each linear valve 80 through 83, 90 through 93 is obtained in the state in which the each linear valve is assembled with the hydraulic brake system. However, the operation characteristic of the each linear valve may be obtained before it is assembled with the brake system, that is, in the process of producing the brake system. In either case, since respective operation characteristics of the individual linear valves are actually obtained or updated, the brake-cylinder pressures can be controlled with higher accuracy as compared with the case where default operation characteristics of the individual linear valves are used.

Figure 26:
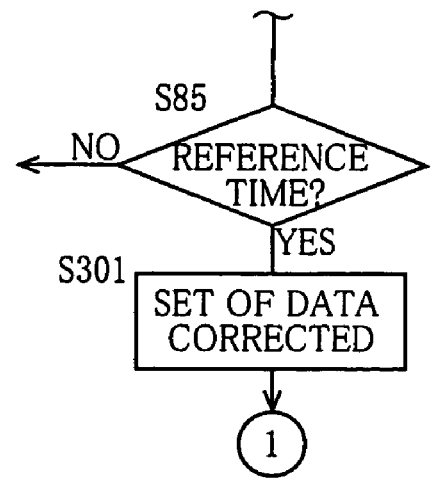
FIG. 26 is a flow chart corresponding to FIGS. 12 and 14, and representing a portion of another operation-characteristic learning program as applied to pressure-increase linear valves corresponding to front and rear wheels of a vehicle.
Figure 27:
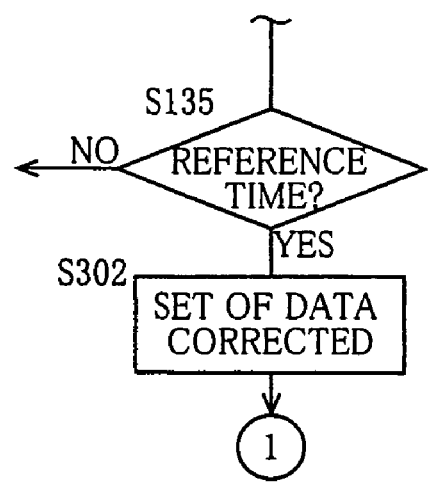
FIG. 27 is a flow chart corresponding to FIG. 13, and representing a portion of the operation-characteristic learning program as applied to pressure-decrease linear valves corresponding to the front wheels.
Figure 28:
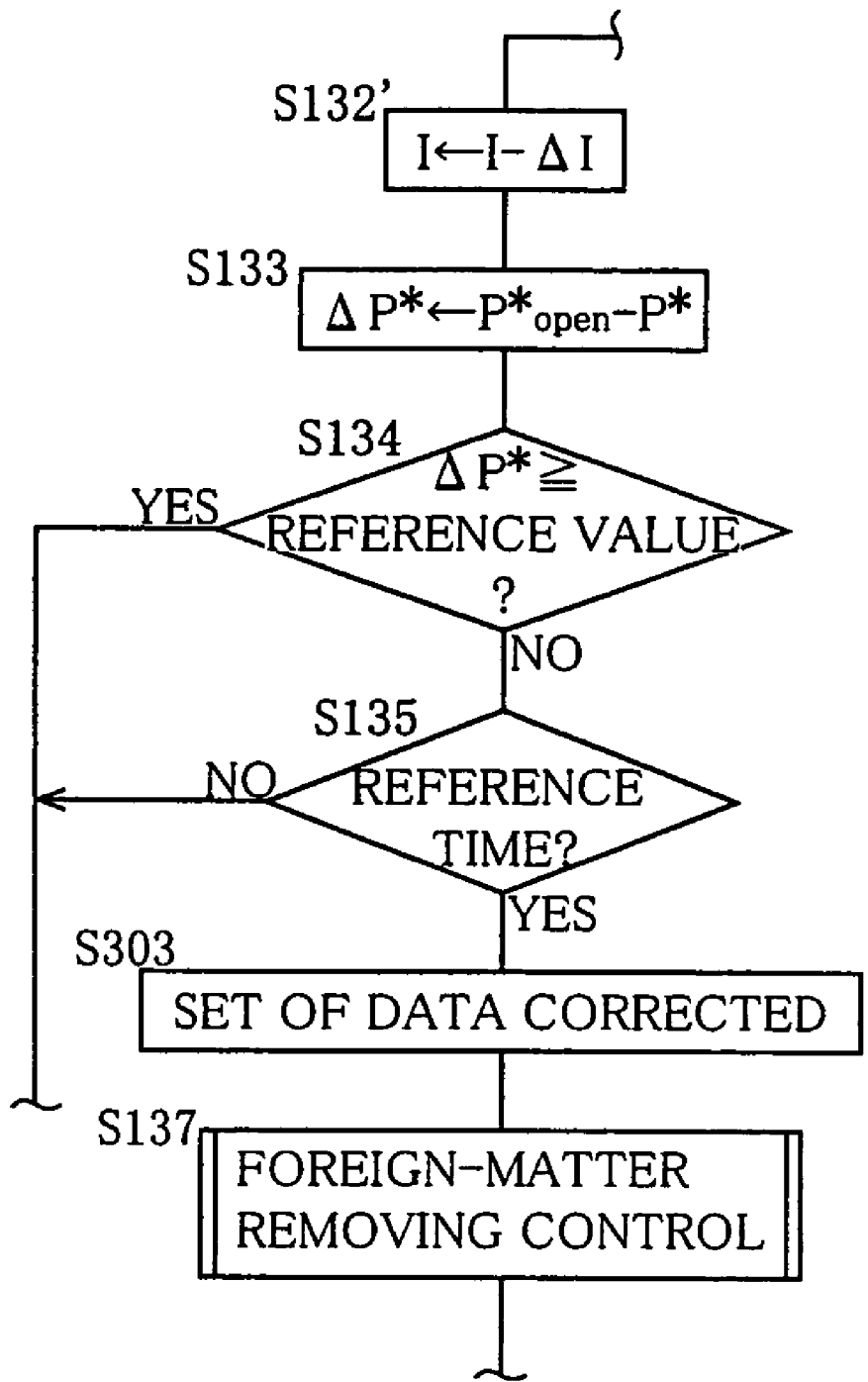
FIG. 28 is a flow chart corresponding to FIG. 15, and representing a portion of the operation-characteristic learning program as applied to pressure-decrease linear valves corresponding to the rear wheels.

In addition, if a leakage is detected when a set of data is obtained, at least one of a pressure difference and a valve opening current that cooperate with each other to constitute the set of data may be corrected, and an operation characteristic of each linear valve 80 through 83, 90 through 93 may be determined based on the sets of data including the thus corrected set of data. In the illustrated embodiment, if a leakage is detected when a set of data is obtained, the set of data is canceled at Step S86 or S136. However, in a modified embodiment shown in FIGS. 26, 27, and 28, the set of data is corrected at Step S301, S302, or S303. For example, in the case where an objective valve whose operation characteristic is to be obtained is an arbitrary one of the normally closed valves 80 through 83, 90, 91, if a leakage is detected when a set of data is obtained, the set of data is corrected at Step S301 of FIG. 26, or at Step S302 of FIG. 27. For example, a valve opening current of the set of data is increased by a pre-set amount, and/or a pressure difference of the set of data is decreased by a pre-set amount. In addition, in the case where an objective valve whose operation characteristic is to be obtained is an arbitrary one of the normally opened valves 92, 93, if a leakage is detected when a set of data is obtained, the set of data is corrected at Step S303 of FIG. 28. For example, a valve opening current of the set of data is decreased by a pre-set amount, and/or a pressure difference of the set of data is decreased by a pre-set amount. Since the operation characteristic of each linear valve 80 through 83, 90 through 93 is determined based on the sets of data including the thus corrected set or sets of data, the determined operation characteristic of each linear valve is nearer to its true operation characteristic.

Alternatively, an operation characteristic of each linear valve that is determined based on sets of data including one or more erroneous sets of data may be corrected. In the illustrated embodiment, if a leakage is detected when a set of data is obtained, the set of data is canceled at Step S86 or S136. However, in another modified embodiment, the set of data is not canceled at Step S86 or S136. Thus, Steps S86 and S136 are omitted. In this modified embodiment, the brake ECU 200 may judge, at Step S28, that the sets of data are not appropriate, because an absolute value of a correlation coefficient of the sets of data is small and accordingly a negative judgment ("NG") is made at Step S226, or nonetheless may judge, at Step S28, that the sets of data are appropriate, because the absolute value of the correlation coefficient is sufficiently great and accordingly a positive judgment ("OK") is made at Step S225. In the latter case, at Step S26, the ECU 200 corrects an operation characteristic of each linear valve, determined based on sets of data including one or more erroneous sets of data. For example, if a leakage is detected and a set of data is largely deviated from a straight line representing the thus determined operation characteristic, as shown in FIG. 1, an intercept $I_{offset}$ of the straight line is changed by a pre-set amount.

The obtained operation characteristic of each linear valve 80 through 83, 90 through 93 may be used in a feed-back control of the electric current supplied to the each linear valve, or a feed-forward control of the electric current supplied to the same.

In addition, in the illustrated embodiment, the brake-cylinder pressure is controlled such that the target pressure Pref is changed when each linear valve 80 through 83, 90 through 93 is switched from its closed state to its opened state. However, the target pressure Pref may be changed when the each linear valve is switched to the electric-current searching state or mode. That is, the manner in which the electric current supplied to the each linear valve is controlled is not limited to that described in the present embodiment.

In addition, in the illustrated embodiment, the hydraulic brakes 16 through 19 are each a disc brake. However, the principle of the present invention may be applied to electromagnetic control valves that are used with drum brakes.

It is to be understood that the present invention may be embodied with other changes and improvements, such as those described in SUMMARY OF THE INVENTION, that may occur to a person skilled in the art, without departing from the spirit and scope of the invention defined in the appended claims.

What is claimed is:

1. An operation-characteristic obtaining apparatus, comprising:

an operation-characteristic obtaining portion which obtains, as an operation characteristic of an electromagnetic control valve which includes a coil and which is opened and closed according to at least a relationship between (a) an acting force corresponding to a difference of respective pressures of a working liquid on either side of the electromagnetic control valve and (b) an electromagnetic drive force corresponding to an electric current supplied to the coil, a relationship between (c) a valve switching current as an electric current that is supplied to the coil of the electromagnetic control valve at a time when the electromagnetic control valve is switched between a closed state thereof and an opened state thereof and (d) a difference at said time of the respective pressures on either side of the electromagnetic control valve; and a leakage detecting portion which detects, when the operation-characteristic obtaining portion obtains the operation characteristic of the electromagnetic control valve, whether the electromagnetic control valve has a leakage of the working liquid.

2. A hydraulic-pressure control apparatus comprising
the operation-characteristic obtaining apparatus according to claim 1;
the electromagnetic control valve the operation characteristic of which is obtained by the operation-characteristic obtaining apparatus; and
an electric-current control device which controls, based on the operation characteristic obtained by the operation-characteristic obtaining device, the electric current supplied to the coil of the electromagnetic control valve, so as to control at least one of the respective pressures on either side of the electromagnetic control valve.

3. The hydraulic-pressure control apparatus according to claim 2, wherein the operation-characteristic obtaining apparatus further comprises a data obtaining portion which controls the electric current supplied to the coil of the electromagnetic control valve, so that the electromagnetic control valve is switched between the closed state thereof and the opened state thereof, according to each of a plurality of different valve switching currents and a corresponding one of a plurality of differences of the respective pressures on either side of the electromagnetic control valve, and which thereby obtains a plurality of sets of data each set of which includes a corresponding one of the plurality of valve switching currents and a corresponding one of the plurality of pressure differences, wherein the operation-characteristic obtaining portion obtains, based on the sets of data obtained by the data obtaining portion, the operation characteristic of the electromagnetic control valve.

4. The hydraulic-pressure control apparatus according to claim 3, wherein the leakage detecting portion comprises a data-obtaining-related leakage detecting portion which detects, each time the data obtaining portion obtains one set of data of the sets of data, whether the electromagnetic control valve has the leakage of the working liquid.

5. The hydraulic-pressure control apparatus according to claim 3, wherein the operation-characteristic obtaining portion comprises a leakage-free-data-using operation-characteristic obtaining portion which, when the data obtaining portion obtains one set of data of the sets of data and the leakage detecting portion detects that the electromagnetic control valve has the leakage of the working liquid, discards said one set of data, and which obtains, based on the sets of data each set of which is obtained by the data obtaining portion when the leakage detecting portion does not detect the leakage of the working liquid, the operation characteristic of the electromagnetic control valve.

6. The hydraulic-pressure control apparatus according to claim 3, wherein the operation-characteristic obtaining portion comprises a corrected-data-using operation-characteristic obtaining portion which corrects, when the data obtaining portion obtains one set of data of the sets of data and the leakage detecting portion detects that the electromagnetic control valve has the leakage of the working liquid, at least one of the valve switching current and the pressure difference of said one set of data, and which thereby obtains, based on the sets of data including the corrected set of data, the operation characteristic of the electromagnetic control valve.

7. The hydraulic-pressure control apparatus according to claim 2, wherein the operation-characteristic obtaining apparatus further comprises an operation-characteristic correcting portion which corrects, when the leakage detecting portion detects that the electromagnetic control valve has the leakage of the working liquid, the operation characteristic of the electromagnetic control valve.

8. The hydraulic-pressure control apparatus according to claim 2, wherein the electric-current control device includes a leakage stopping portion which controls, when the leakage detecting portion detects that the electromagnetic control valve has the leakage of the working liquid, the electric current supplied to the coil of the electromagnetic control valve so as to stop the leakage of the working liquid.

9. The hydraulic-pressure control apparatus according to claim 8, wherein the leakage stopping portion comprises an opening-degree increasing portion which controls the electric current supplied to the coil of the electromagnetic control valve, such that a degree of opening of the electromagnetic control valve is greater than a reference degree.

10. The hydraulic-pressure control apparatus according to claim 2, wherein the leakage detecting portion detects whether the electromagnetic control valve has the leakage of the working liquid, based on a control of the electric current supplied to the electromagnetic control valve and a corresponding change of said at least one of the respective pressures on either side of the electromagnetic control valve.

11. The hydraulic-pressure control apparatus according to claim 2, wherein the leakage detecting portion comprises a valve-opened-state-related leakage detecting portion which detects whether the electromagnetic control valve has the leakage of the working liquid, based on a change of said at least one of the respective pressures on either side of the electromagnetic control valve after the electric current supplied to the coil of the electromagnetic control valve is changed to switch the electromagnetic control valve from the closed state thereof to the opened state thereof.

12. The hydraulic-pressure control apparatus according to claim 2, wherein the leakage detecting portion comprises an electric-current-keeping-state-related leakage detecting portion which detects that the electromagnetic control valve has the leakage of the working liquid, when said at least one of the respective pressures on either side of the electromagnetic control valve has changed by more than a reference pressure in a state in which the electric current supplied to the coil of the electromagnetic control valve is kept at a predetermined electric current.

13. The hydraulic-pressure control apparatus according to claim 12, wherein the electric-current-keeping-state-related leakage detecting portion comprises a large-leakage detecting portion which detects a large leakage of the working liquid, and a small-leakage detecting portion which detects a small leakage of the working liquid that is smaller than the large leakage.

14. The hydraulic-pressure control apparatus according to claim 2, wherein the electromagnetic control valve comprises a normally opened, pressure control valve which includes a valve seat and a valve member which can be seated on, and be moved away from, the valve seat, wherein the electromagnetic drive force comprises a pressing force acting on the valve member in a direction to cause the valve member to be seated on the valve seat, and wherein the leakage detecting portion comprises a decreased-pressing-force-related leakage detecting portion which detects whether the electromagnetic control valve has the leakage of the working liquid, in a state in which a decreased pressing force corresponding to a decreased electromagnetic drive force lower than a maximum electromagnetic drive force acts on the valve member.

15. The hydraulic-pressure control apparatus according to claim 14, wherein the electric-current control device comprises a maximum-electric-current supply portion which supplies a maximum electric current to the coil of the electromagnetic control valve, and an intermediate-electric-current supply portion which supplies an intermediate electric current lower than the maximum electric current, to the coil of the electromagnetic control valve, and wherein the decreased-pressing-force-related leakage detecting portion comprises an intermediate-electric-current-supply-related leakage detecting portion which detects whether the electromagnetic control valve has the leakage of the working liquid, in a state in which the intermediate-electric-current supply portion supplies the intermediate electric current to the coil of the electromagnetic control valve.

16. The hydraulic-pressure control apparatus according to claim 2, wherein the electromagnetic control valve comprises a hydraulic-pressure control valve which controls a hydraulic pressure supplied to a hydraulic brake which includes (a) a rotary member which is rotatable with a wheel of a vehicle, (b) a frictional member, and (c) a brake cylinder which presses, owing to the hydraulic pressure, the frictional member against the rotary member so as to brake a rotation of the wheel, and wherein the operation-characteristic obtaining apparatus further comprises a clearance reducing portion which reduces, before obtaining of the operation characteristic, a clearance between the frictional member and the rotary member, by controlling the hydraulic pressure supplied to the brake cylinder, to a pressure higher than a reference pressure.

17. The hydraulic-pressure control apparatus according to claim 3, wherein the operation-characteristic obtaining portion comprises a correlation-coefficient-dependent operation-characteristic obtaining portion which obtains, based on the sets of data obtained by the data obtaining portion, the operation characteristic of the electromagnetic control valve, when an absolute value of a correlation coefficient of the sets of data is greater than a reference value.

18. A brake apparatus, comprising:
a hydraulic brake which includes (a) a rotary member which is rotatable with a wheel of a vehicle, (b) a frictional member, and (c) a brake cylinder which presses, owing to a hydraulic pressure supplied thereto, the frictional member against the rotary member so as to brake a rotation of the wheel;
the operation-characteristic obtaining apparatus according to claim 1;
an electromagnetic control valve device comprising a plurality of said electromagnetic control valves the respective operation characteristics of which are obtained by the operation-characteristic obtaining apparatus; and
a hydraulic-pressure control device which controls, based on the respective operation characteristics of the electromagnetic control valves, the respective electric currents supplied the respective coils of the electromagnetic control valves, so as to control the hydraulic pressure supplied to the brake cylinder.

19. The brake apparatus according to claim 18, wherein the electromagnetic control valves comprise a normally opened, hydraulic-pressure control valve including a valve seat, a valve member which can be seated on, and be moved away from, the valve seat, and a spring which biases the valve member in a direction to cause the valve member to be moved away the valve seat, and wherein the electromagnetic drive force acts on the valve member in a direction to cause the valve member to be seated on the valve seat.

20. The brake apparatus according to claim 18, wherein the electromagnetic control valves comprise a normally closed, hydraulic-pressure control valve including a valve seat, a valve member which can be seated on, and be moved away from, the valve seat, and a spring which biases the valve member in a direction to cause the valve member to be seated on the valve seat, and wherein the electromagnetic drive force acts on the valve member in a direction to cause the valve member to be moved away from the valve seat.

21. The brake apparatus according to claim 18, wherein the electromagnetic control valves comprise a pressure-increase control valve which is provided between a power hydraulic-pressure source which produces, by using a power, the hydraulic pressure, and the brake cylinder; and a pressure-decrease control valve which is provided between the brake cylinder and a low-pressure source, and wherein the operation-characteristic obtaining portion comprises a pressure-increase-and-decrease-related operation-characteristic obtaining portion which obtains, in a continuous pressure increasing and decreasing operation, the operation characteristic of the pressure-increase control valve while increasing the hydraulic pressure supplied to the brake cylinder, and obtains the operation characteristic of the pressure-decrease control valve while decreasing the hydraulic pressure supplied to the brake cylinder.

* * * * *